Oct. 1, 1963   A. ROTH ET AL   3,105,635
TYPE COMPOSING MACHINE
Filed Feb. 25, 1960   38 Sheets-Sheet 1

INVENTORS
ARTUR ROTH
NICKOLAUS THOMAS

BY *Cushman, Darby & Cushman*

ATTORNEYS

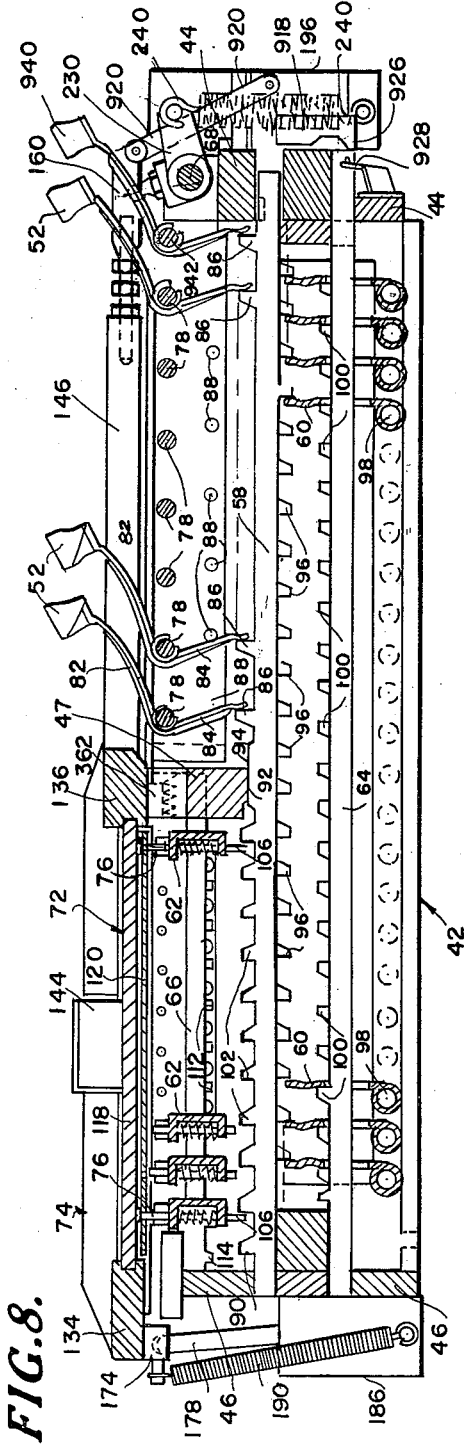
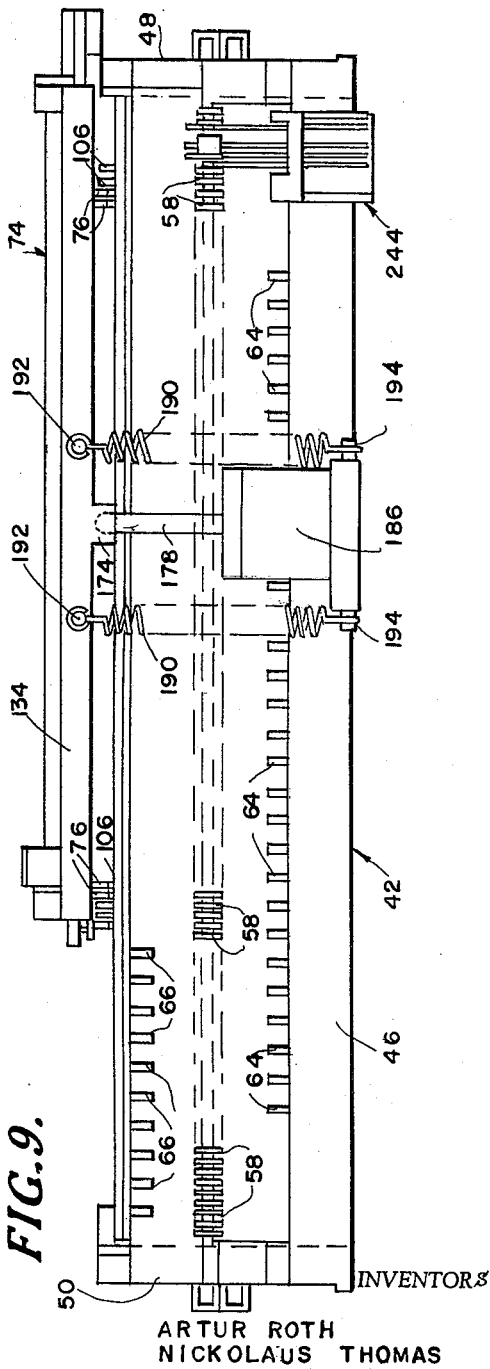
FIG. 8.
FIG. 9.
INVENTORS
ARTUR ROTH
NICKOLAUS THOMAS
BY Cushman, Darby & Cushman
ATTORNEYS

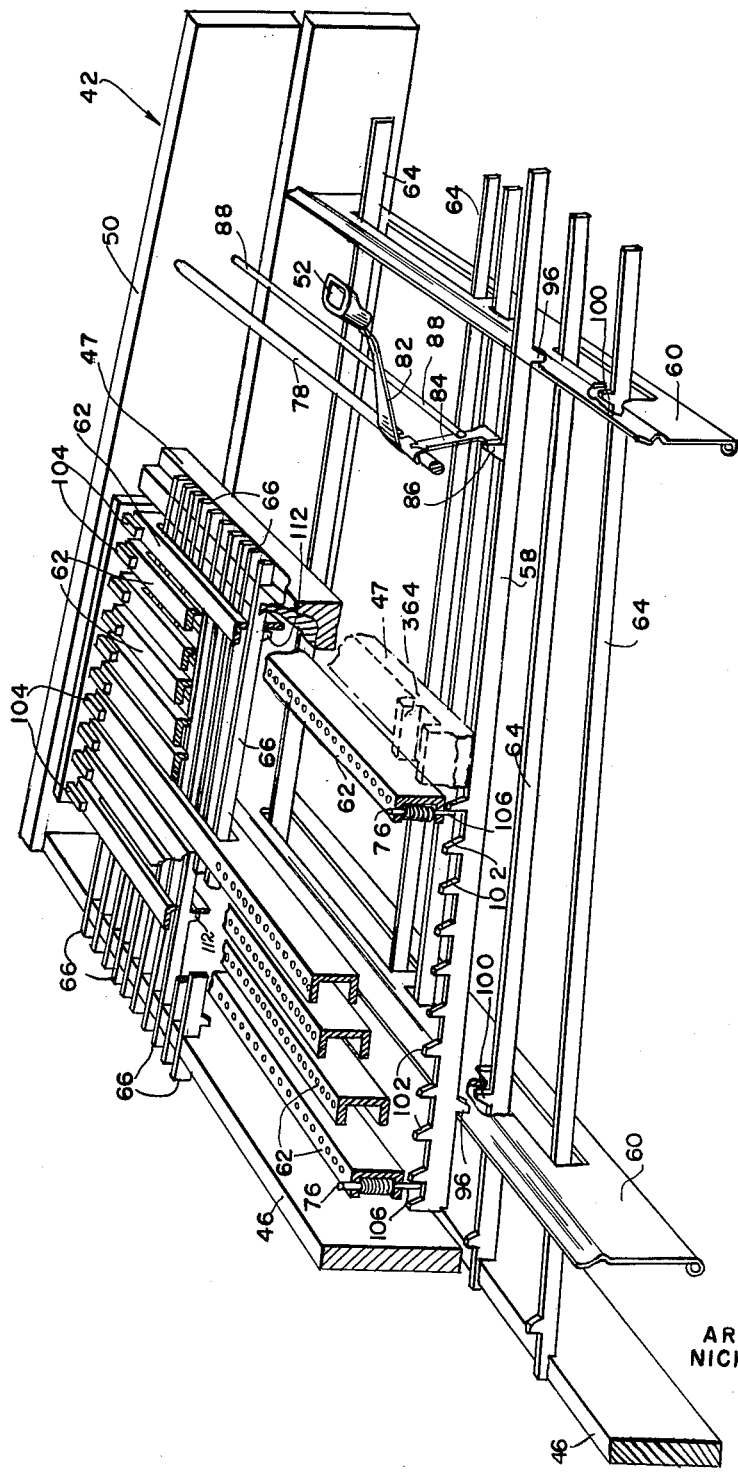

Oct. 1, 1963 A. ROTH ET AL 3,105,635
TYPE COMPOSING MACHINE
Filed Feb. 25, 1960 38 Sheets-Sheet 10
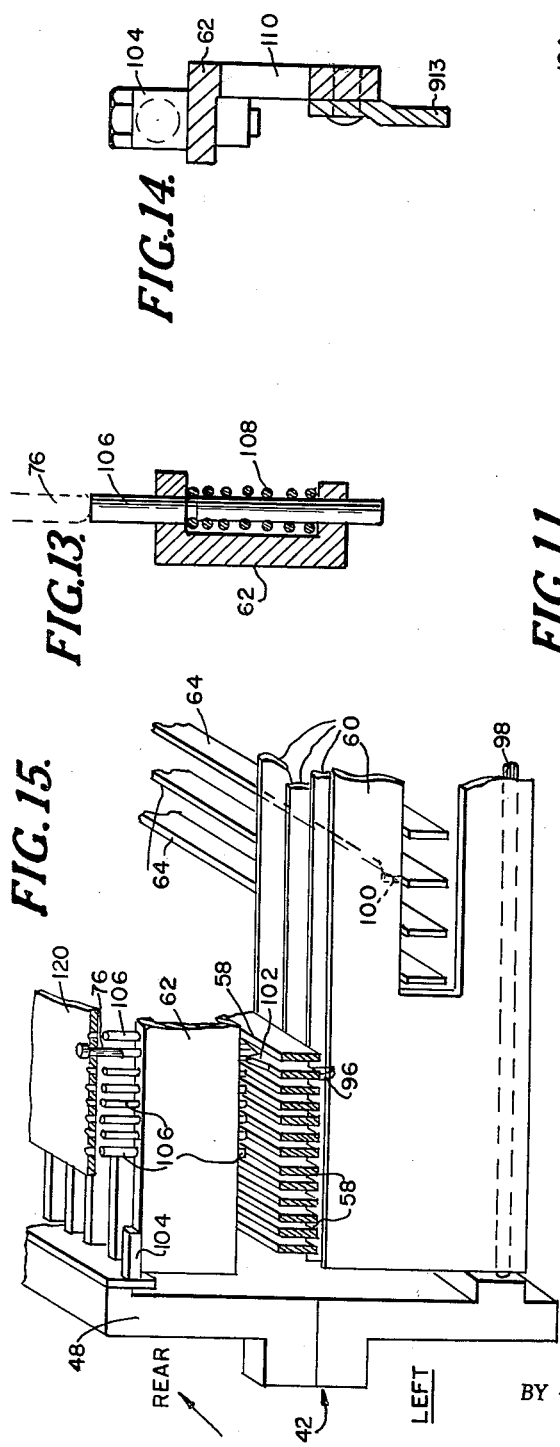
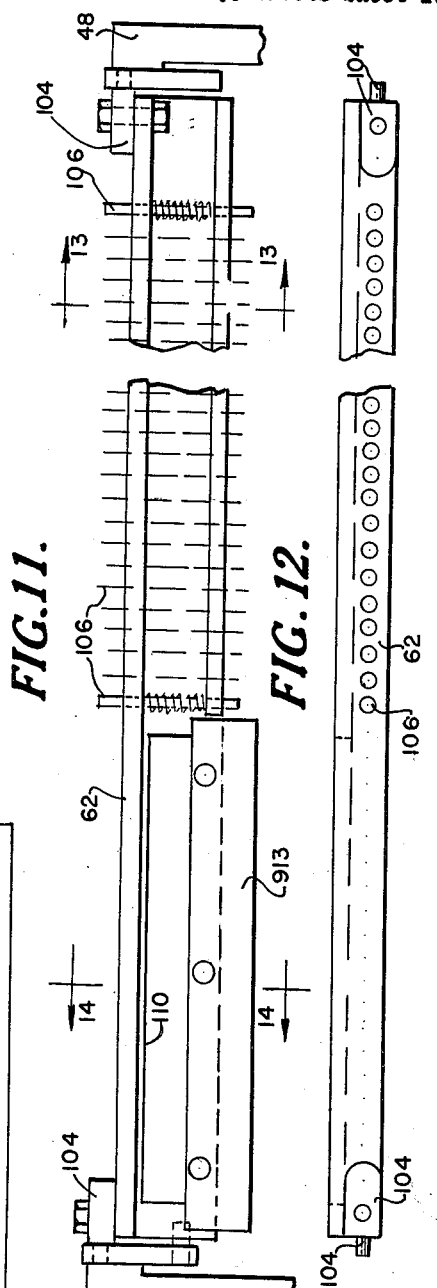
INVENTOR
ARTUR ROTH
NICKOLAUS THOMAS
BY Cushman, Darby & Cushman
ATTORNEYS Oct. 1, 1963   A. ROTH ET AL   3,105,635
TYPE COMPOSING MACHINE
Filed Feb. 25, 1960   38 Sheets-Sheet 11
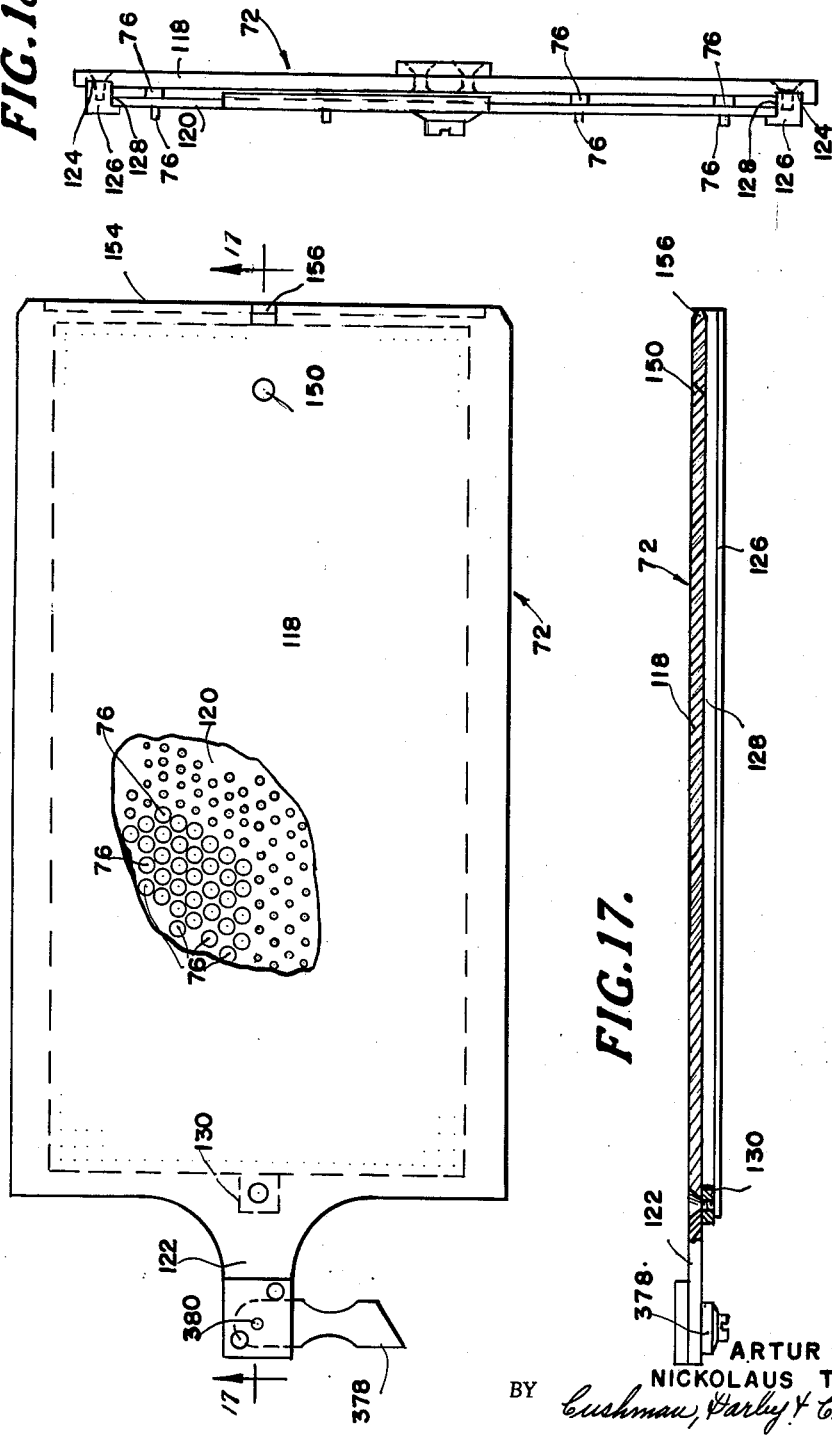
INVENTORS
ARTUR ROTH
NICKOLAUS THOMAS
BY Cushman, Darby & Cushman
ATTORNEYS

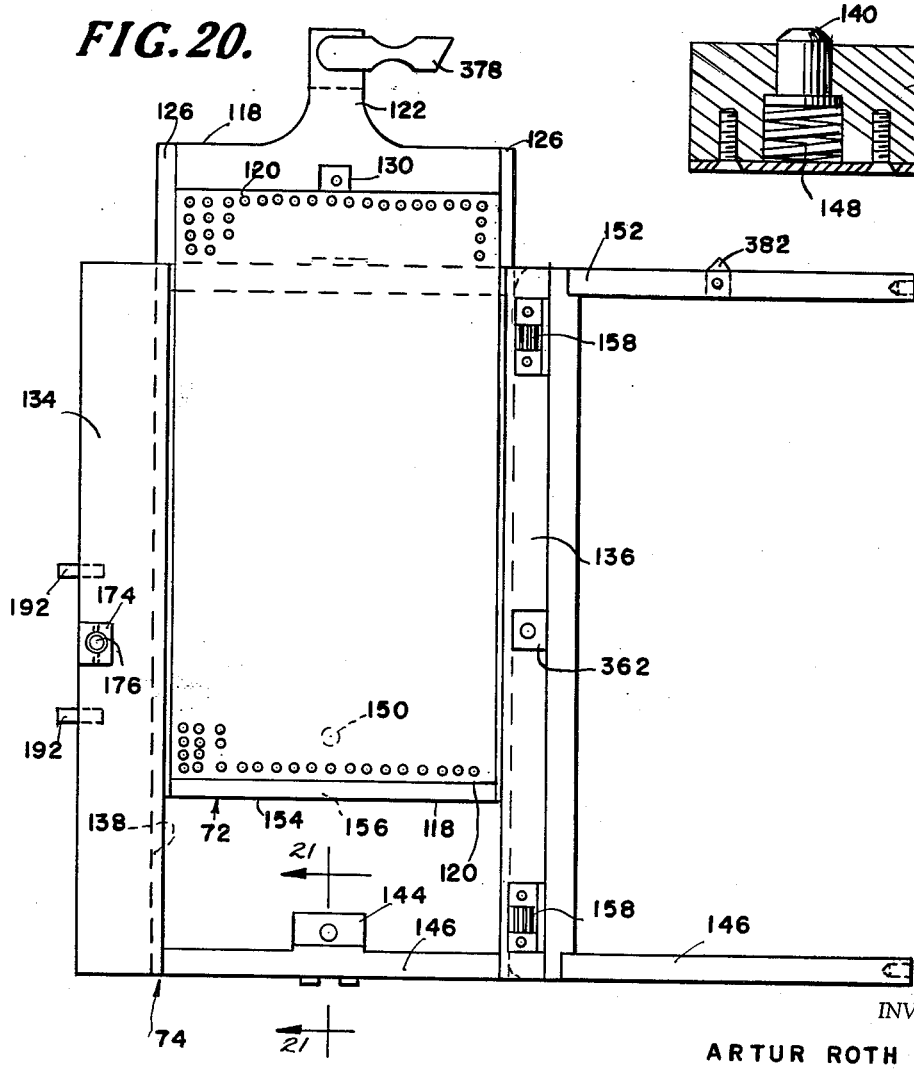

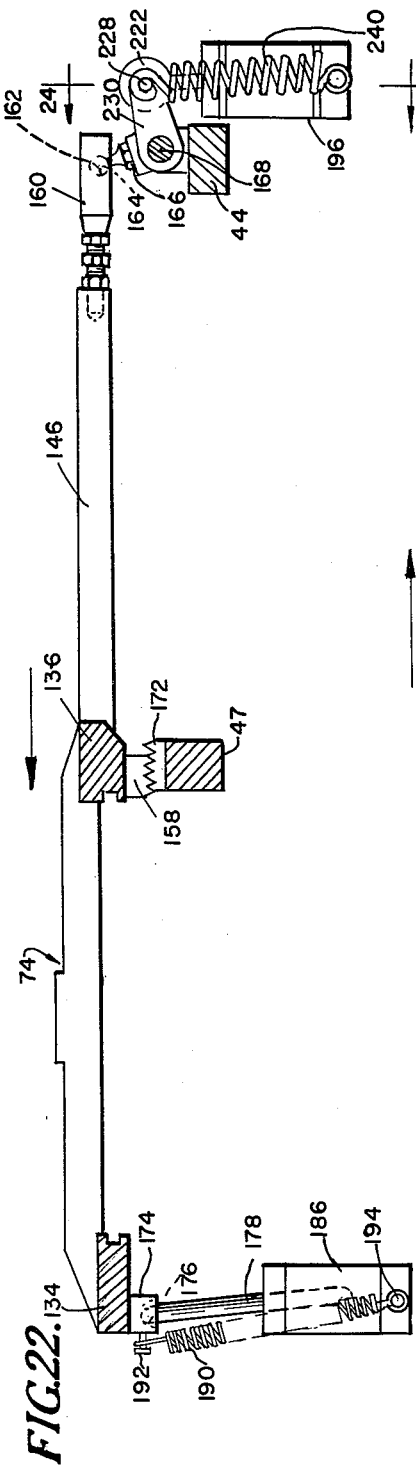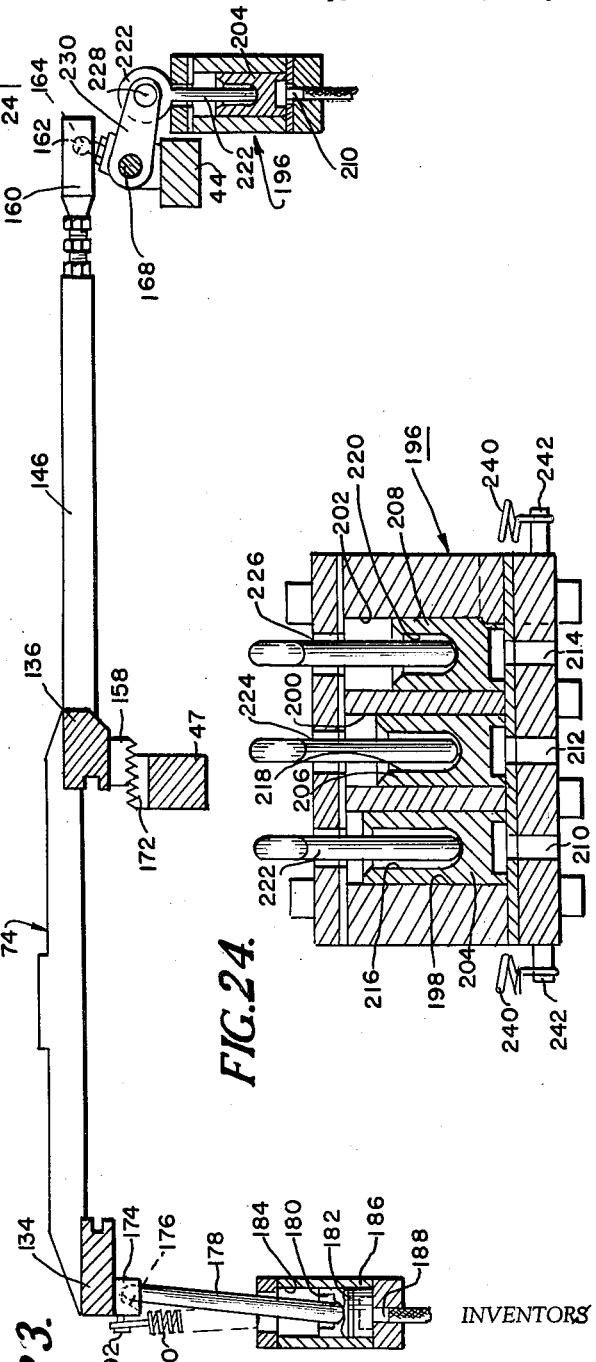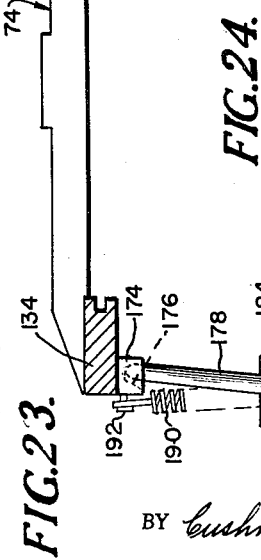

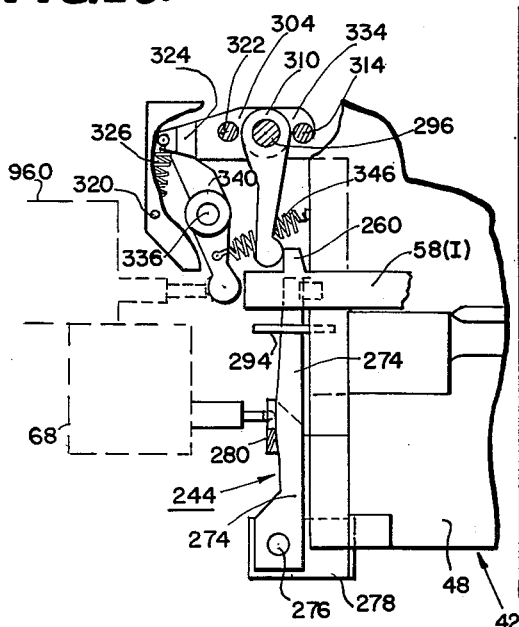
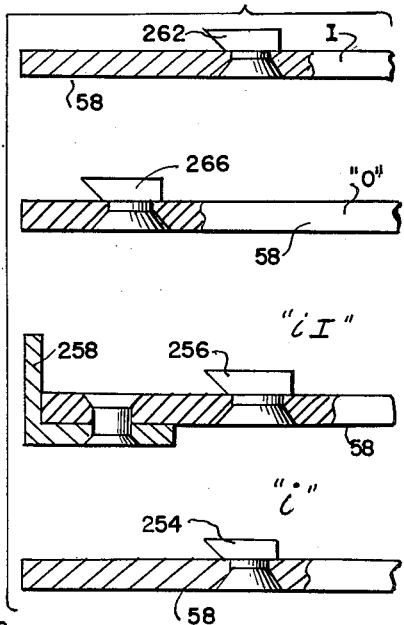
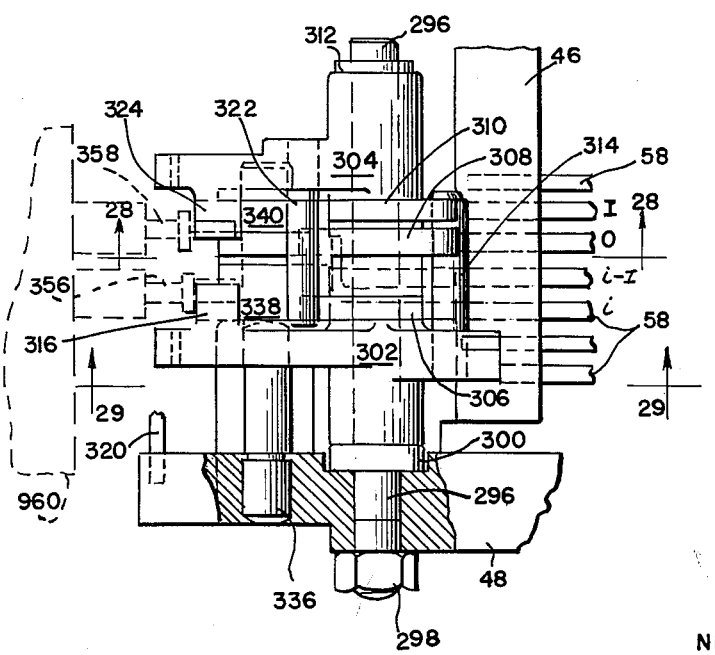

Oct. 1, 1963  A. ROTH ET AL  3,105,635
TYPE COMPOSING MACHINE
Filed Feb. 25, 1960  38 Sheets-Sheet 15

INVENTORS
ARTUR ROTH
NICKOLAUS THOMAS
BY *Cushman, Darby & Cushman*
ATTORNEYS

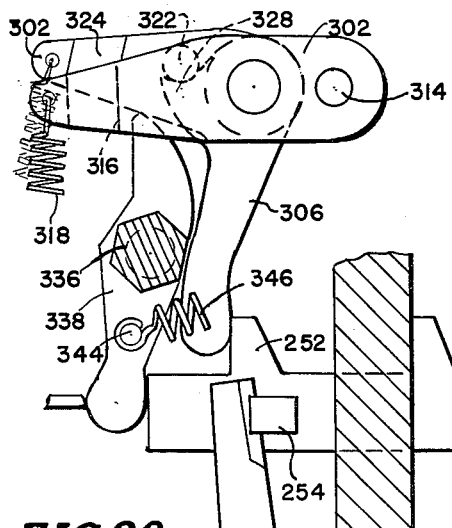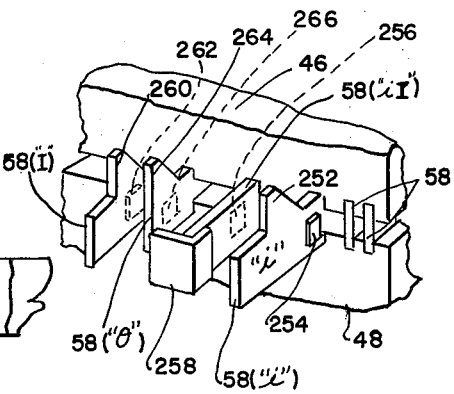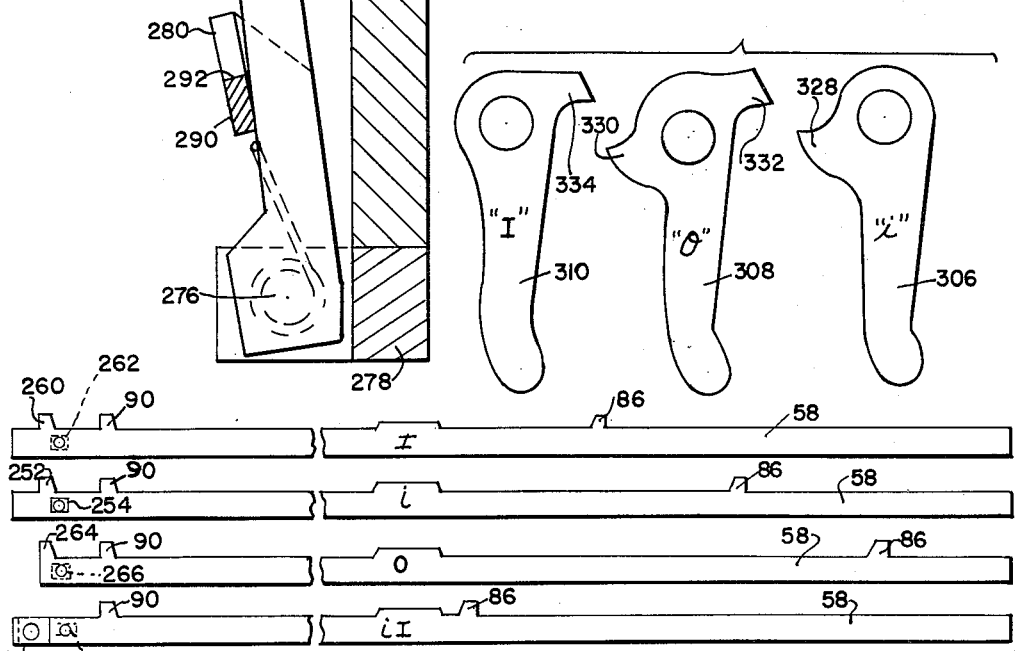

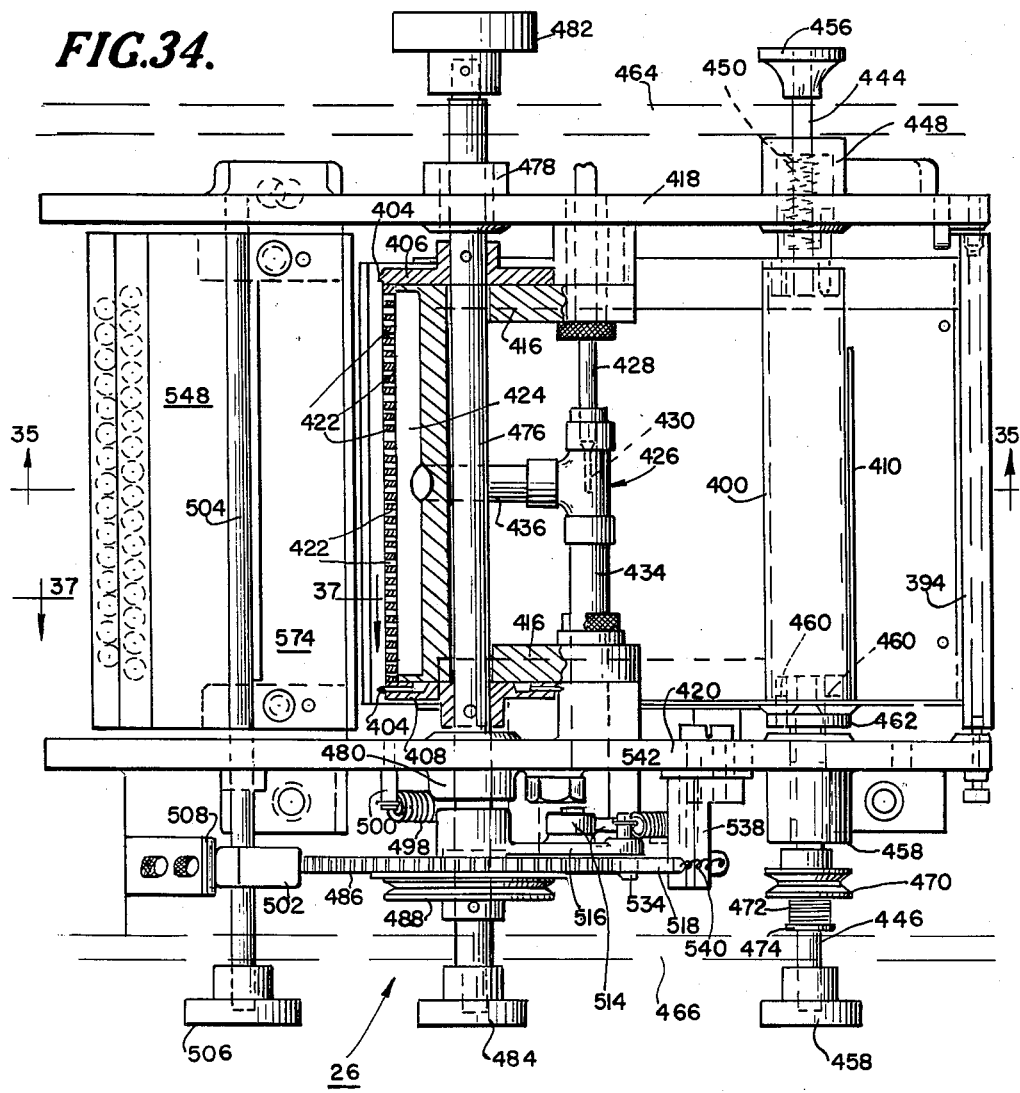

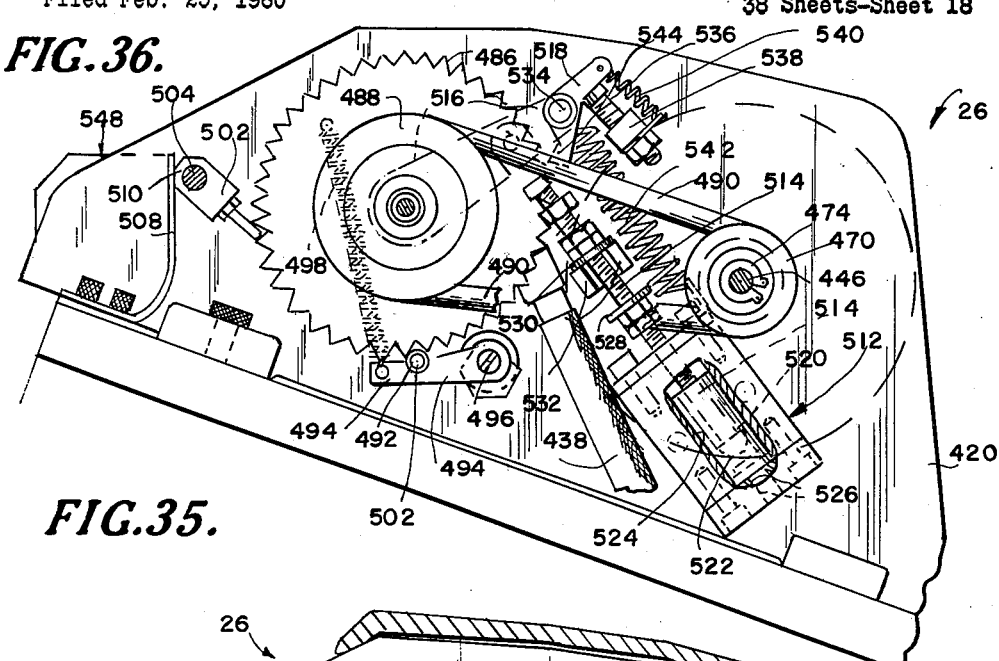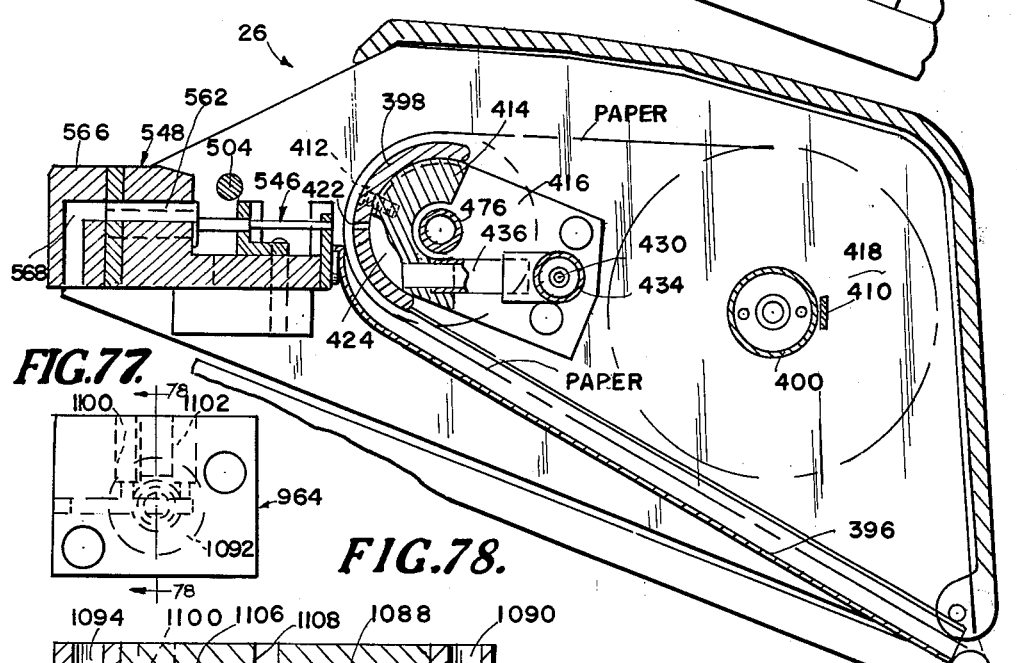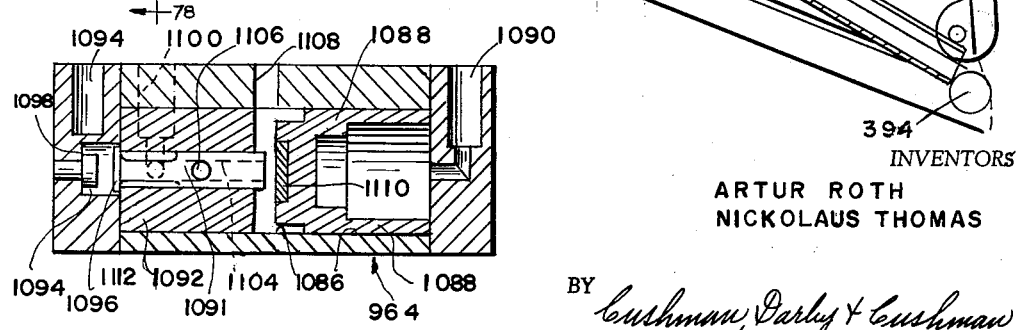

Oct. 1, 1963     A. ROTH ET AL     3,105,635
TYPE COMPOSING MACHINE
Filed Feb. 25, 1960     38 Sheets-Sheet 19
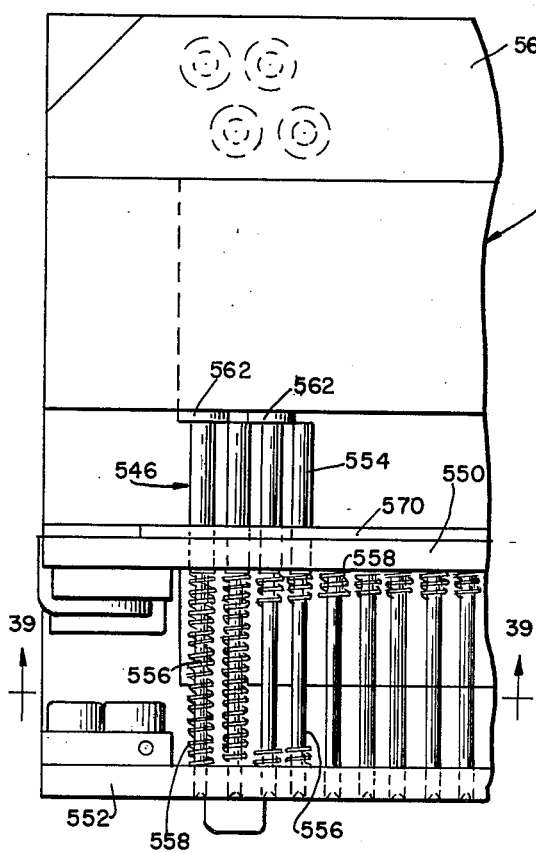
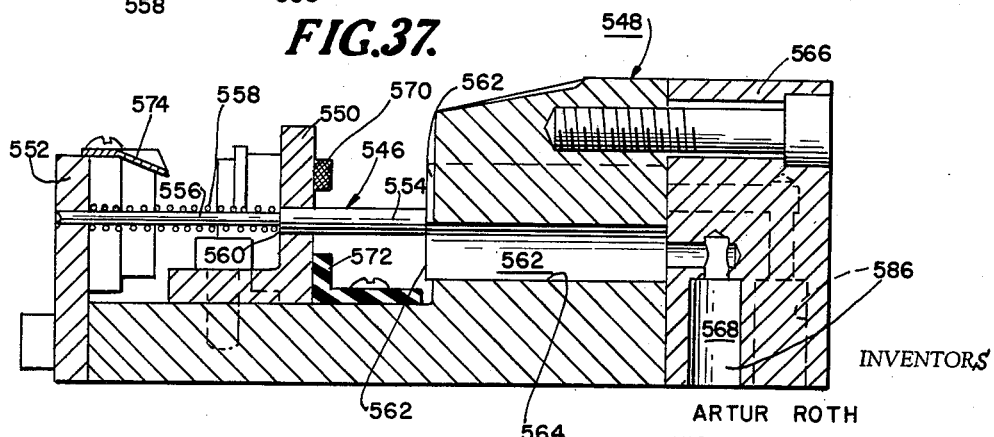
INVENTORS
ARTUR ROTH
NICKOLAUS THOMAS
BY Cushman, Darby & Cushman
ATTORNEYS

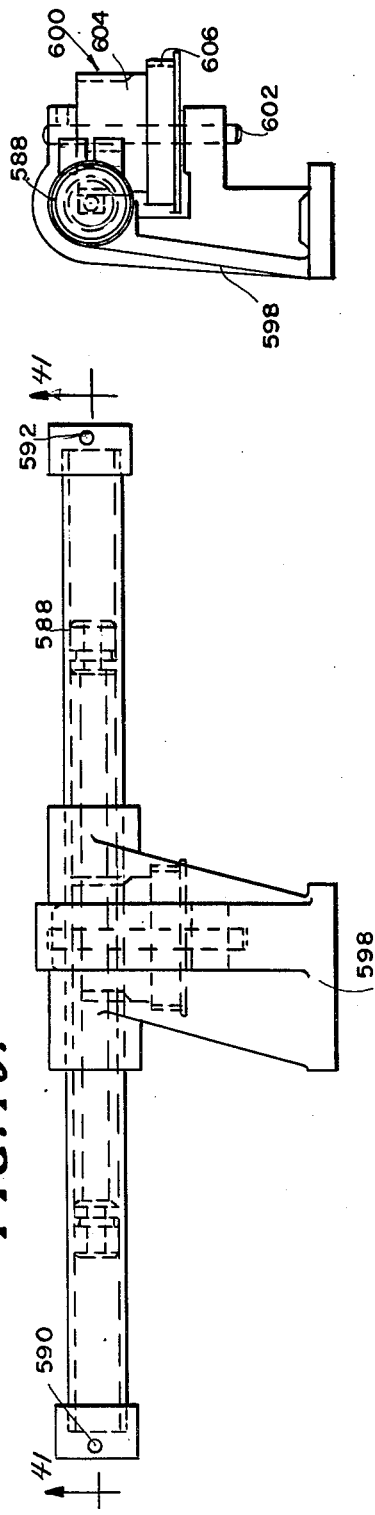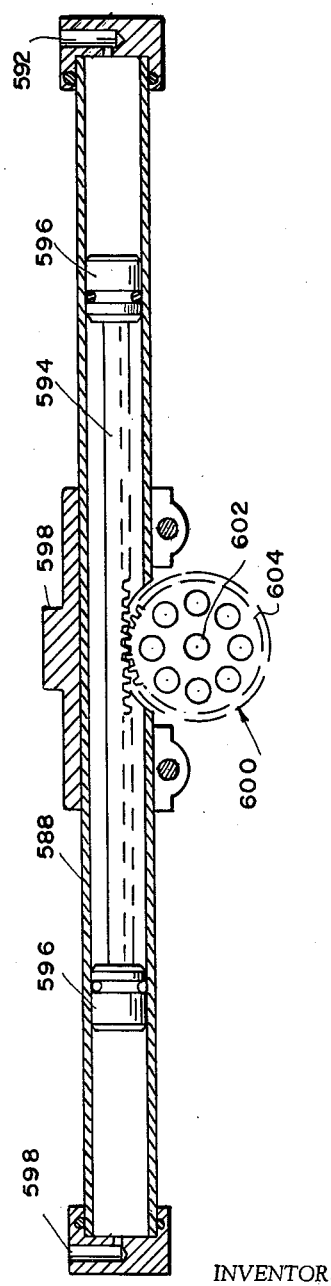

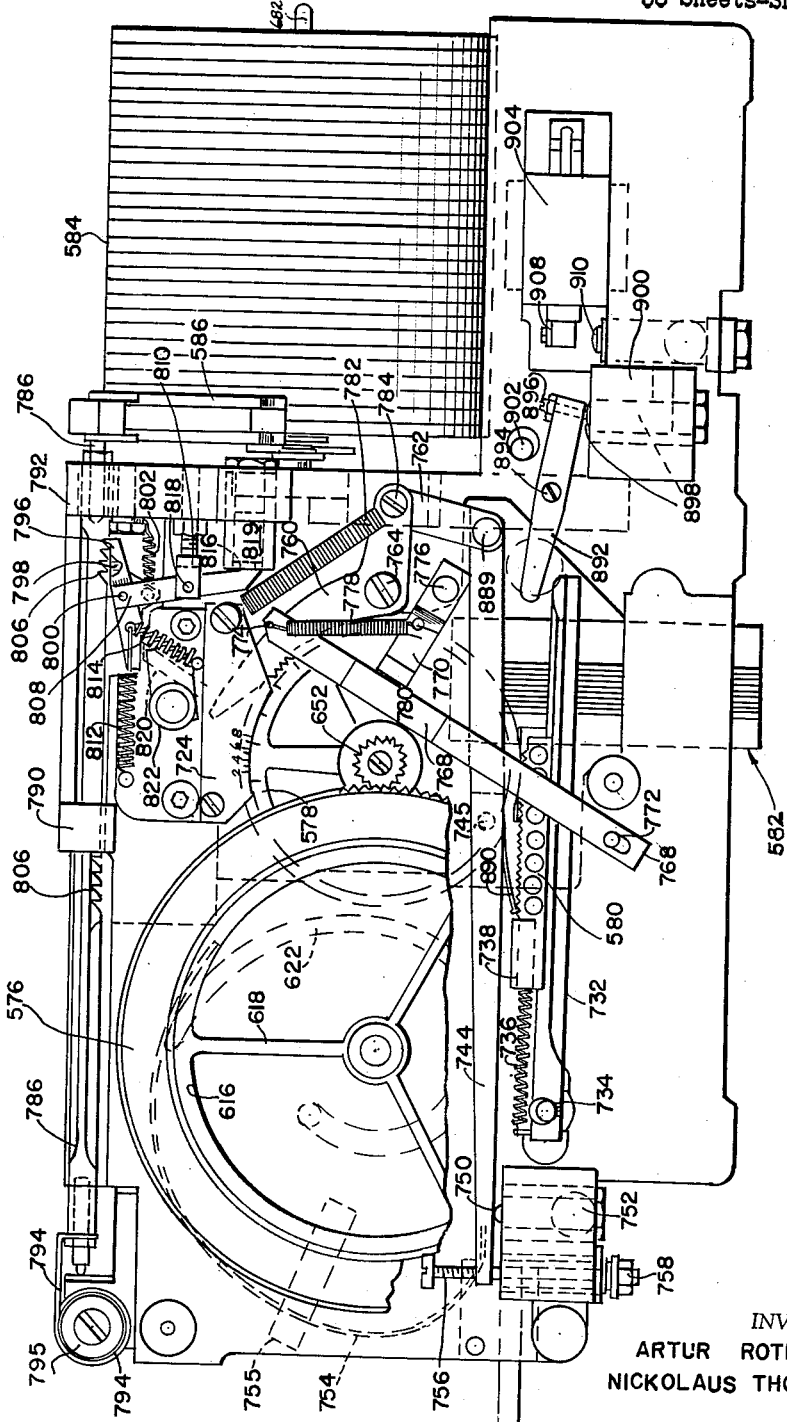

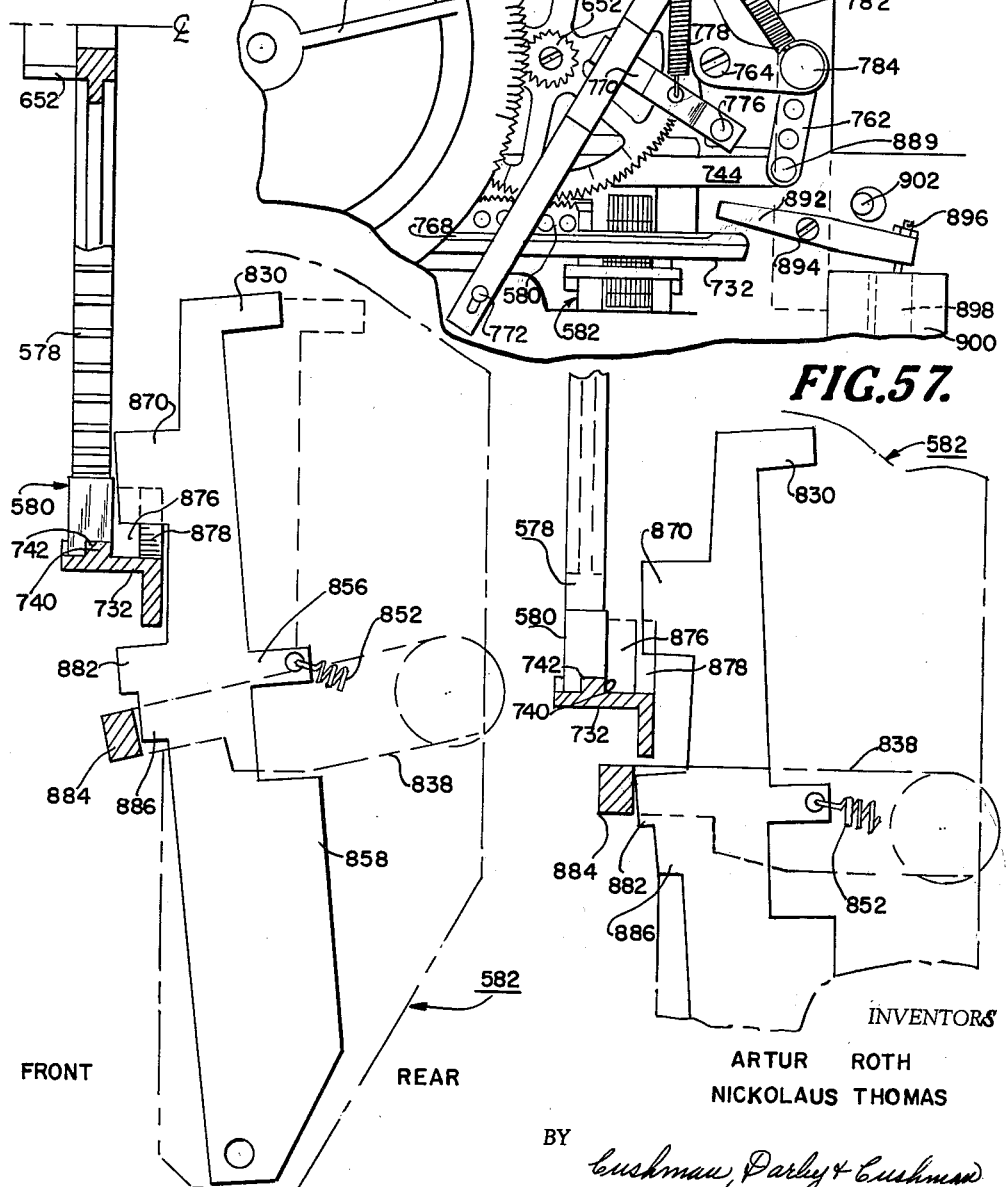

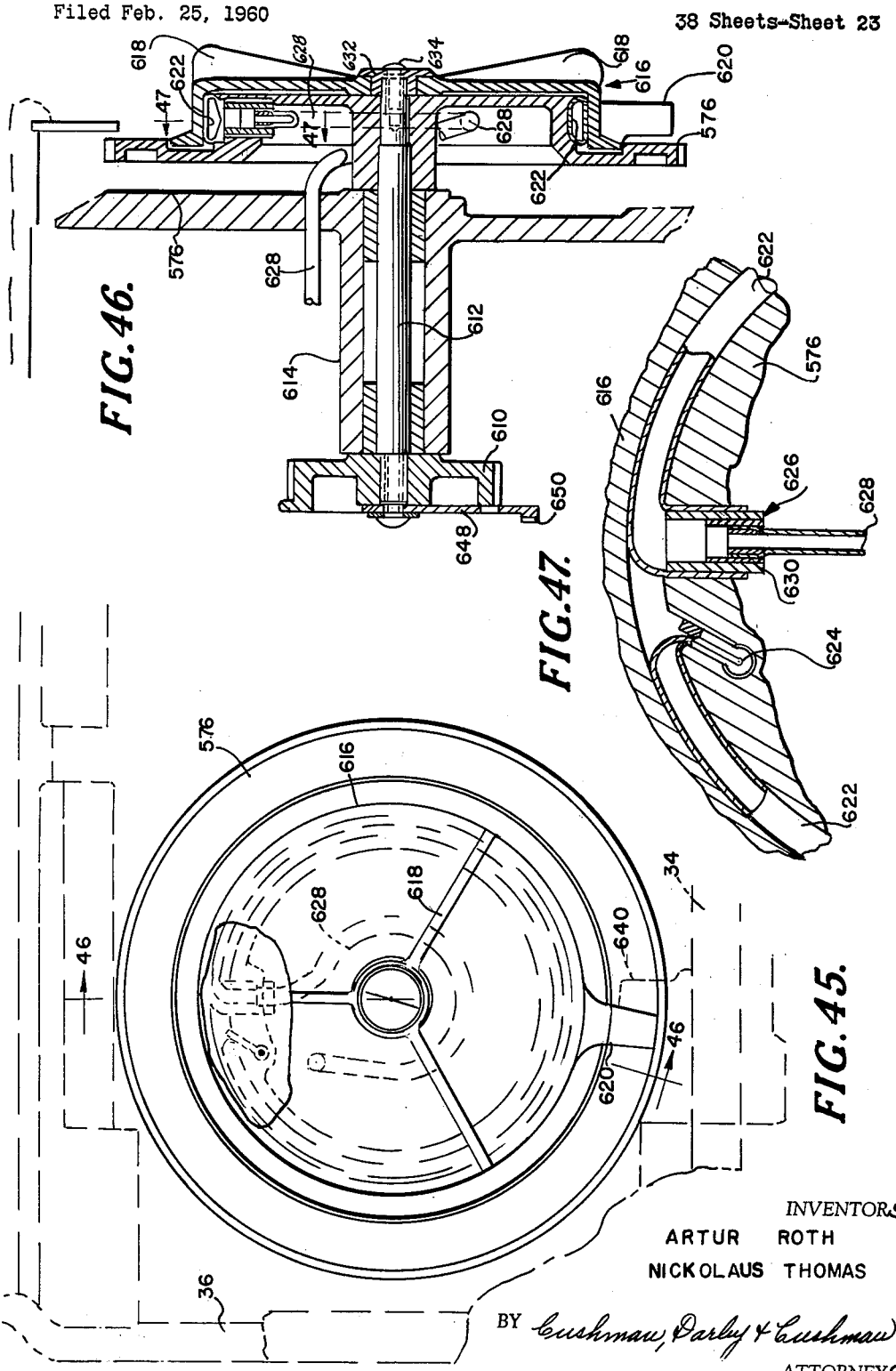

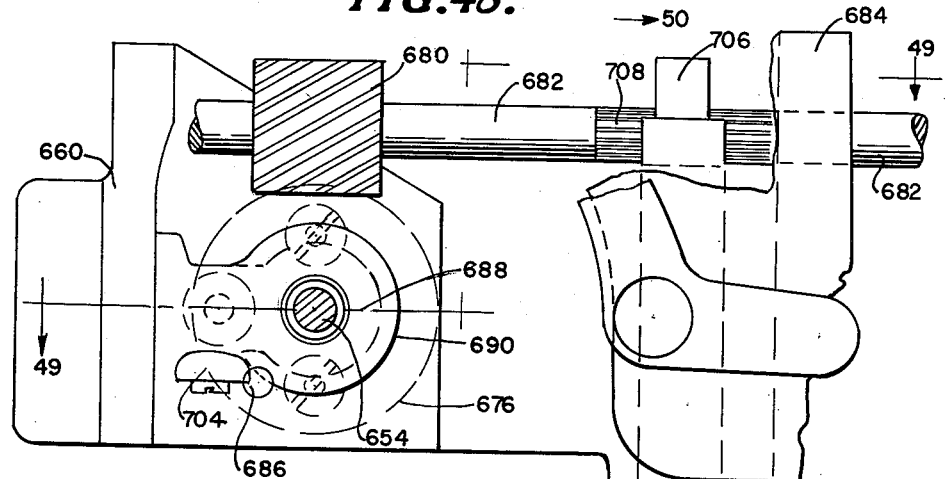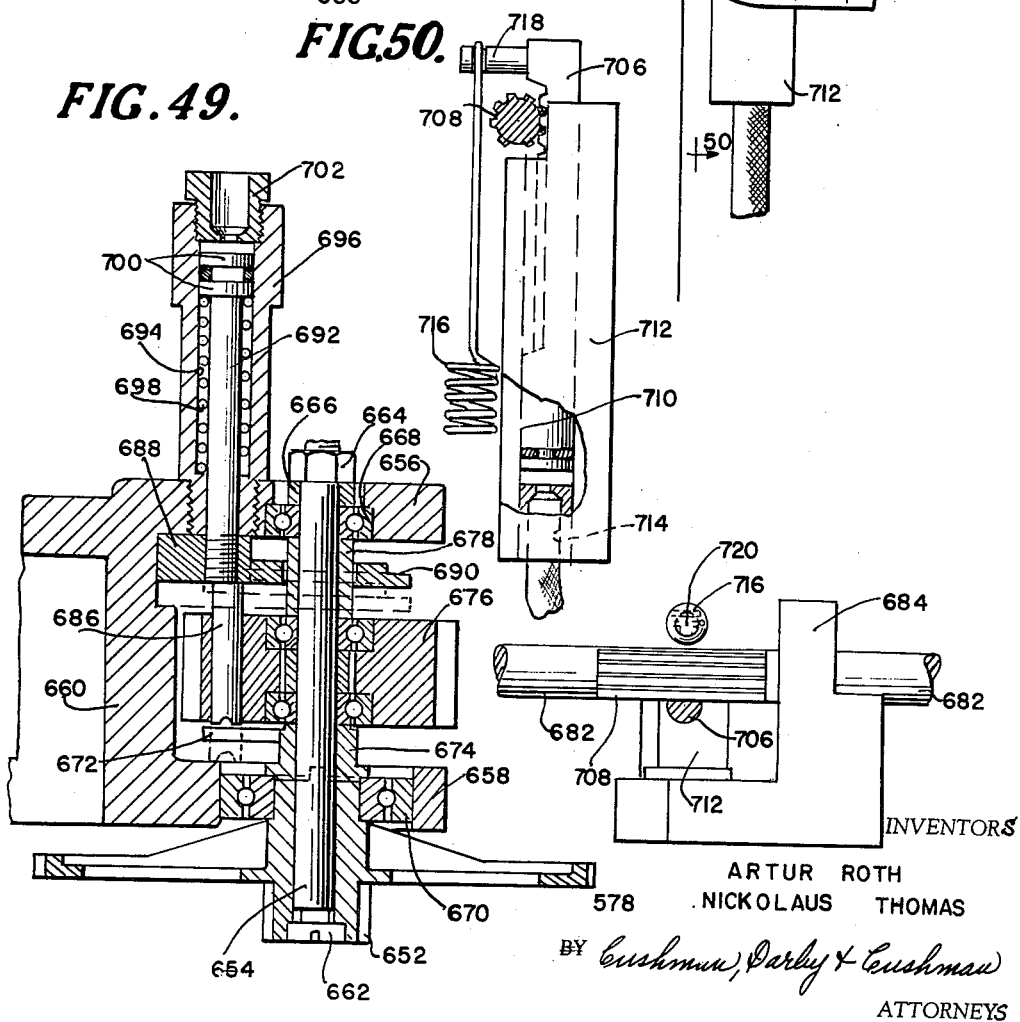

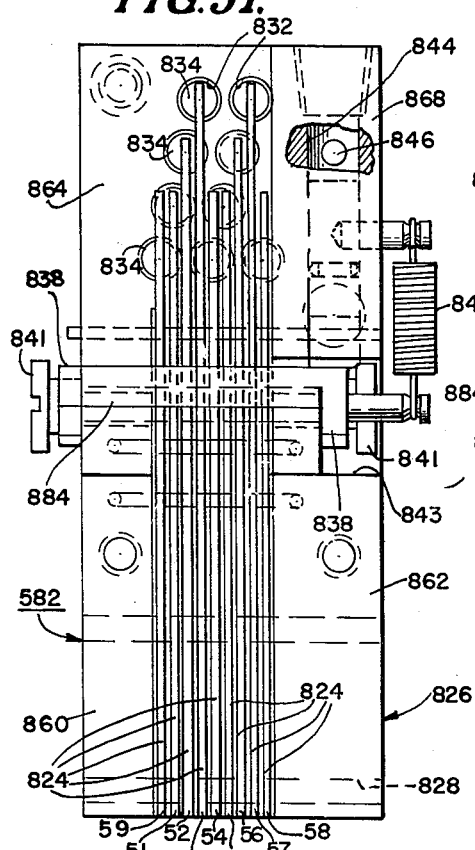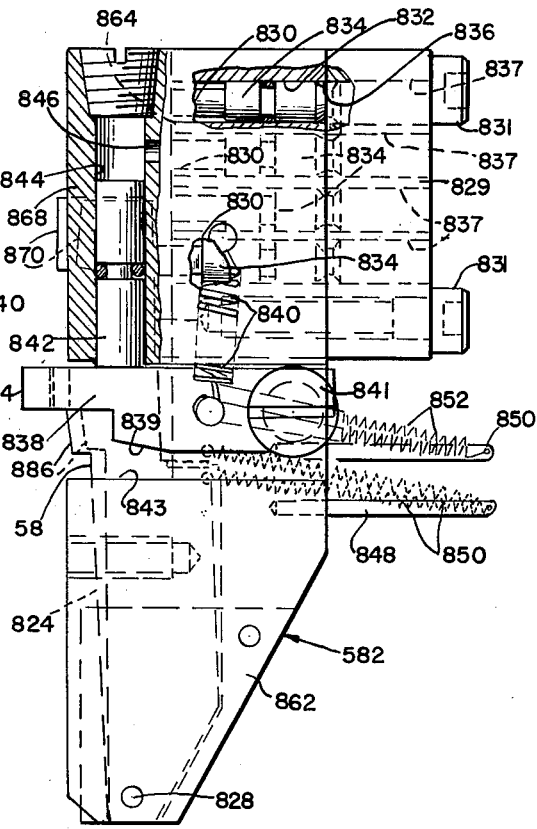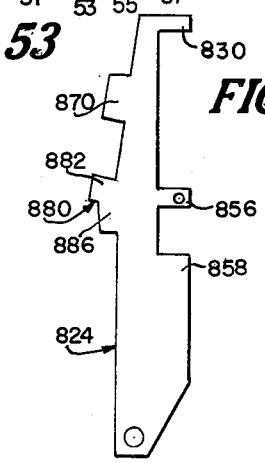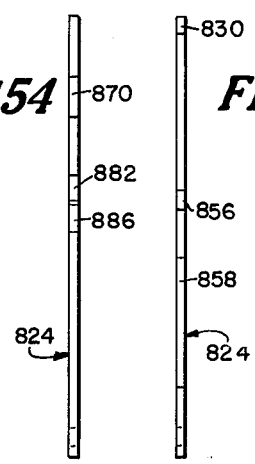

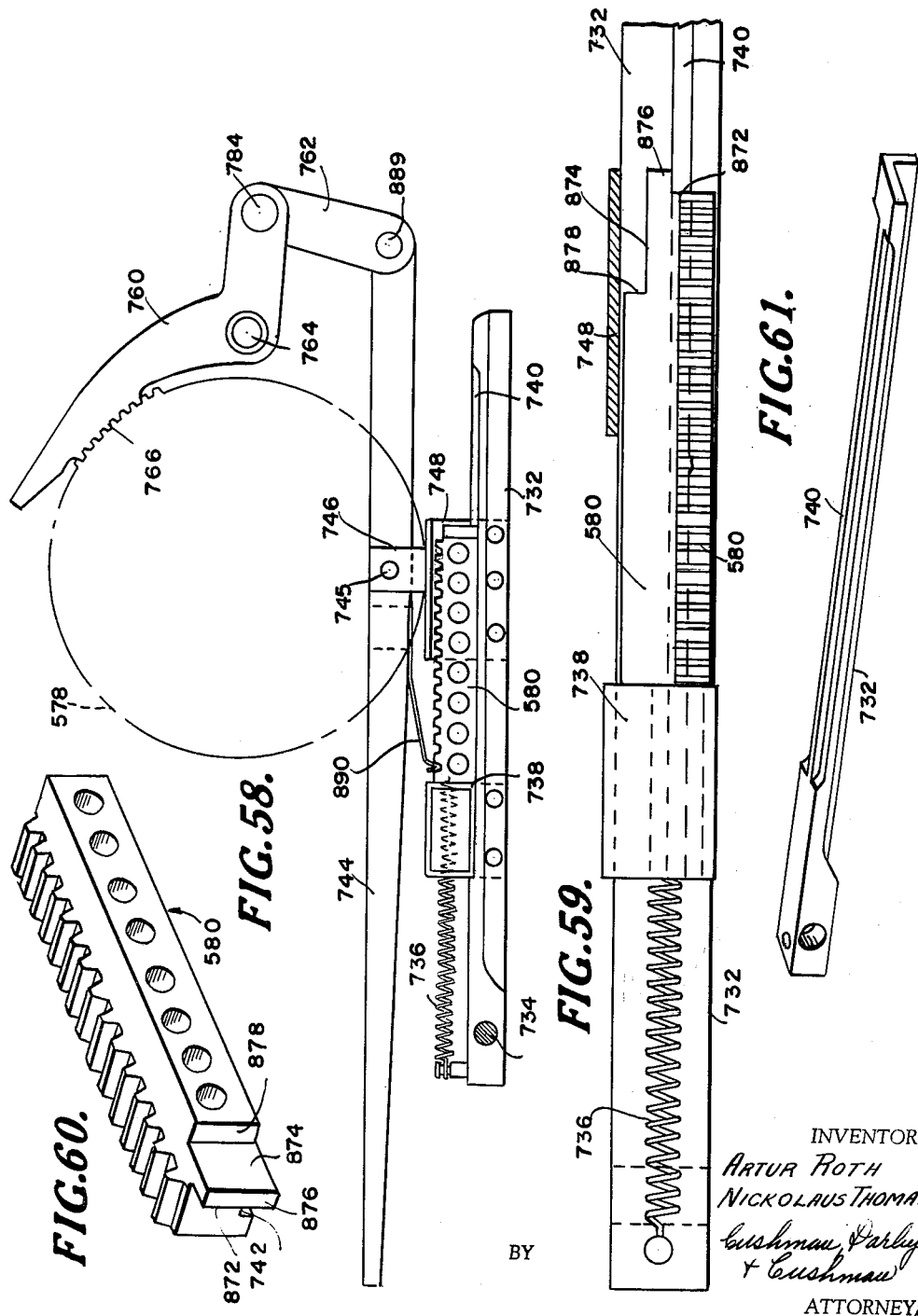

Oct. 1, 1963

A. ROTH ET AL 3,105,635

TYPE COMPOSING MACHINE

Filed Feb. 25, 1960

INVENTORS
ARTUR ROTH
NICKOLAUS THOMAS

BY Cushman, Darby & Cushman
ATTORNEYS

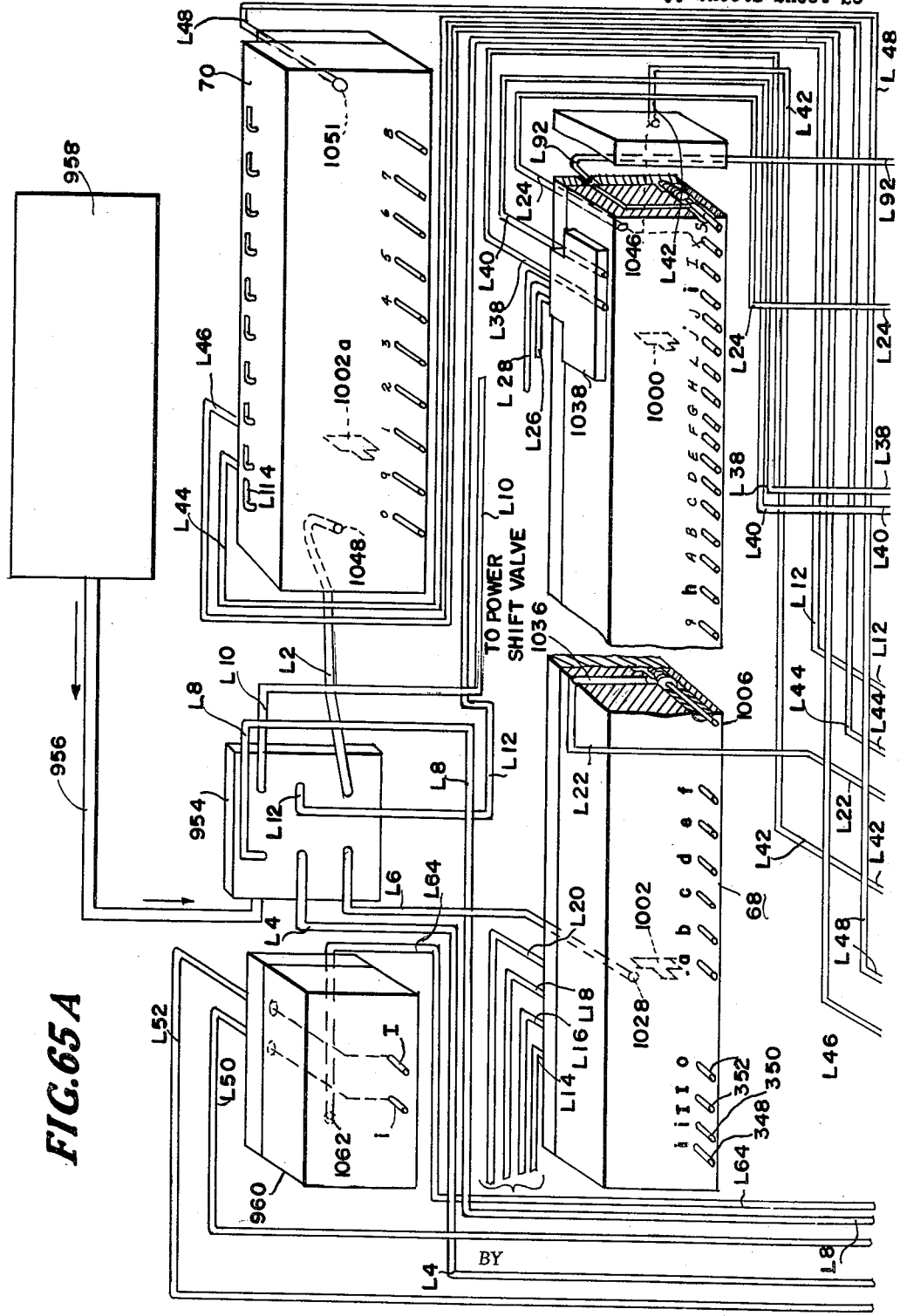

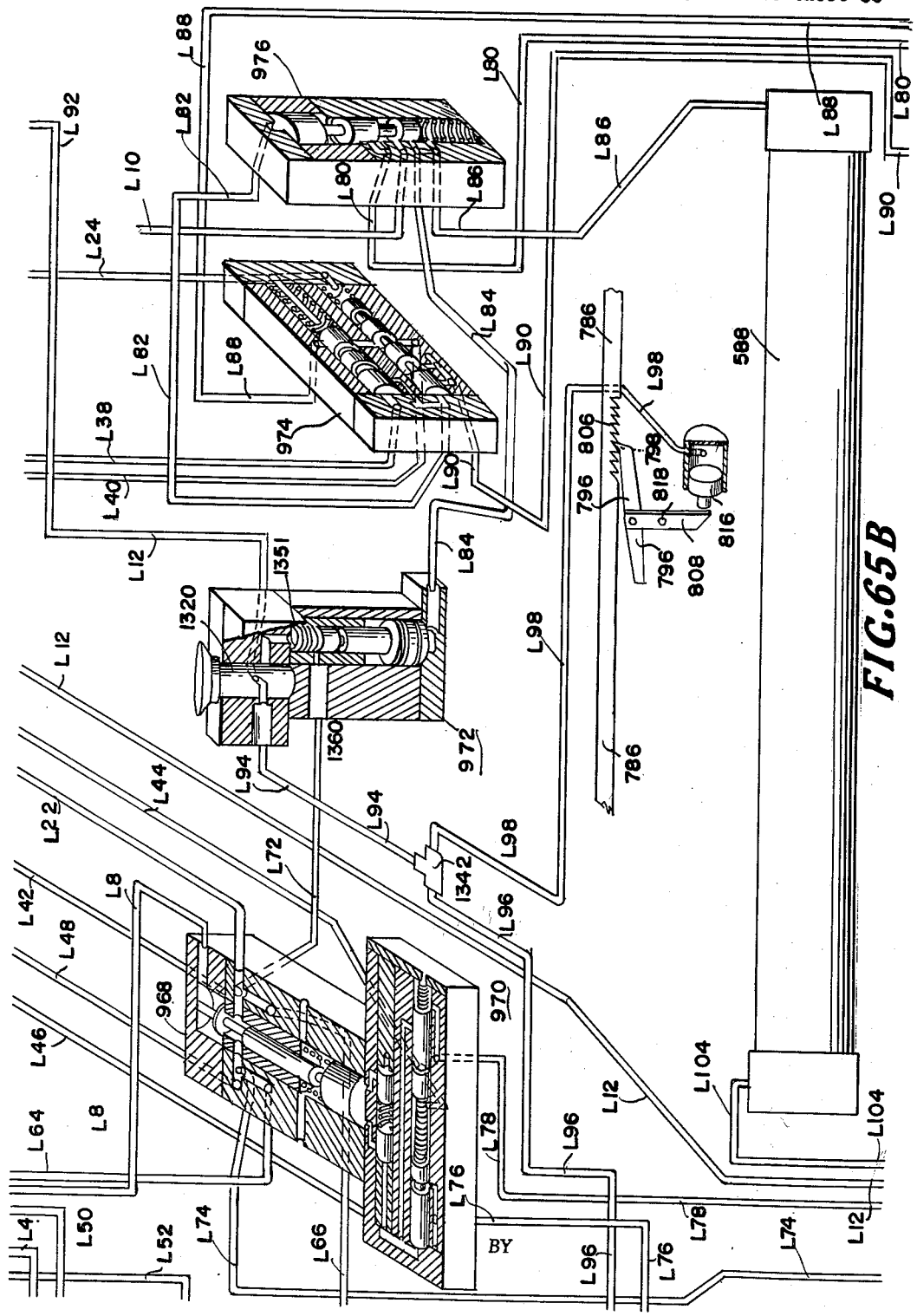

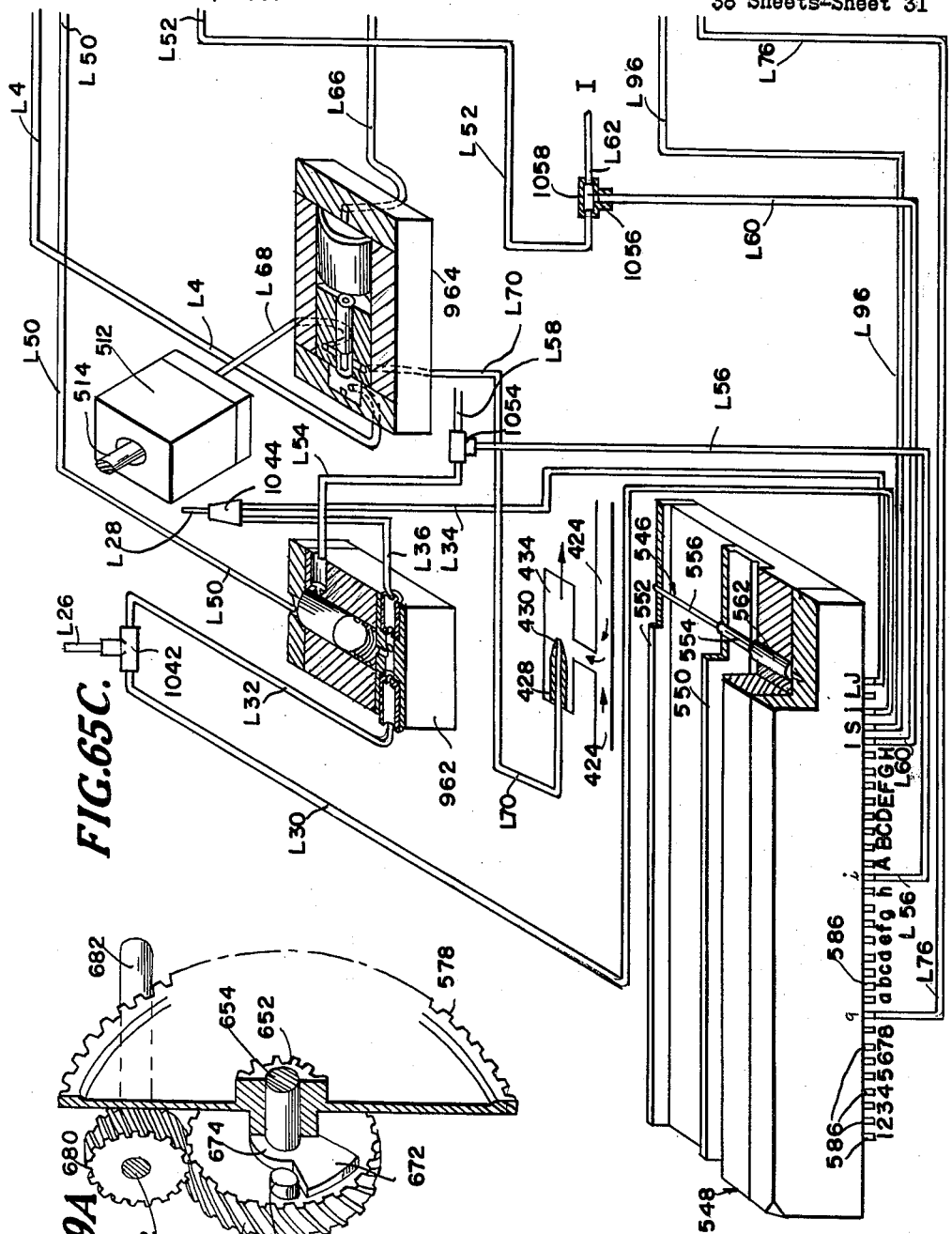

Oct. 1, 1963  A. ROTH ET AL  3,105,635
TYPE COMPOSING MACHINE
Filed Feb. 25, 1960  38 Sheets-Sheet 32

INVENTORS
ARTUR ROTH
NICHOLAUS THOMAS
BY Cushman, Darby &
Cushman
ATTORNEYS

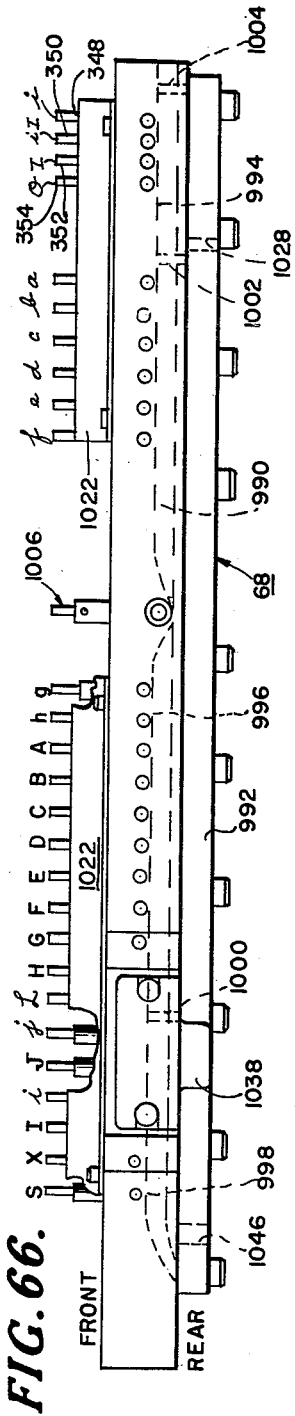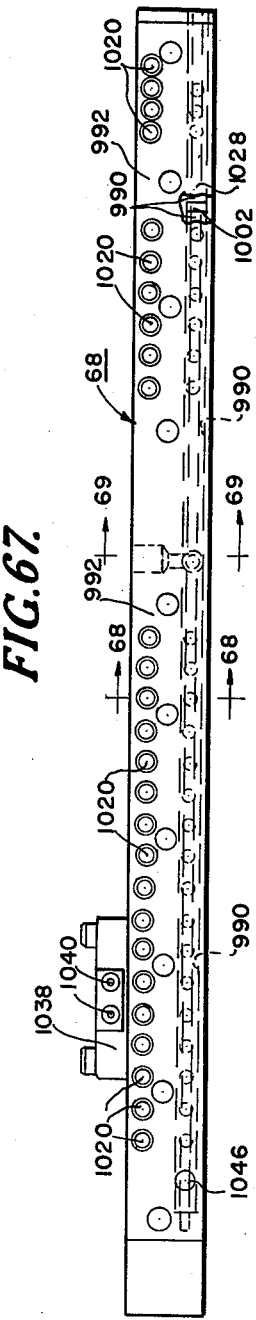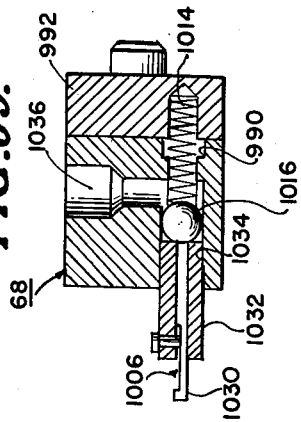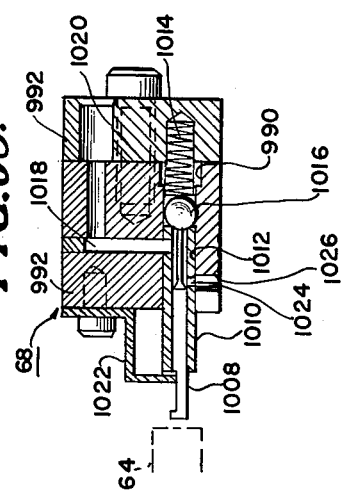

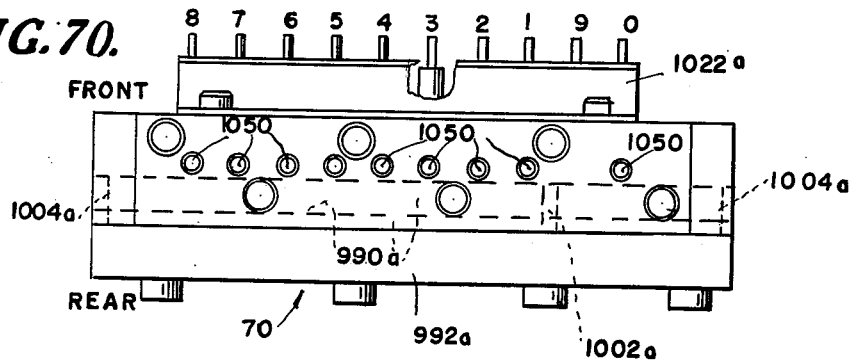
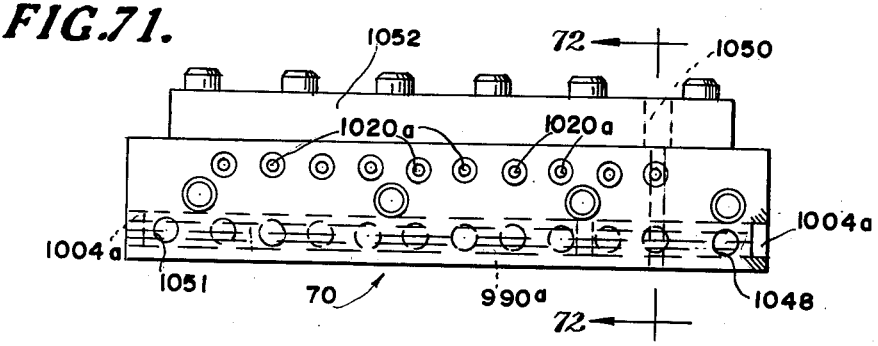
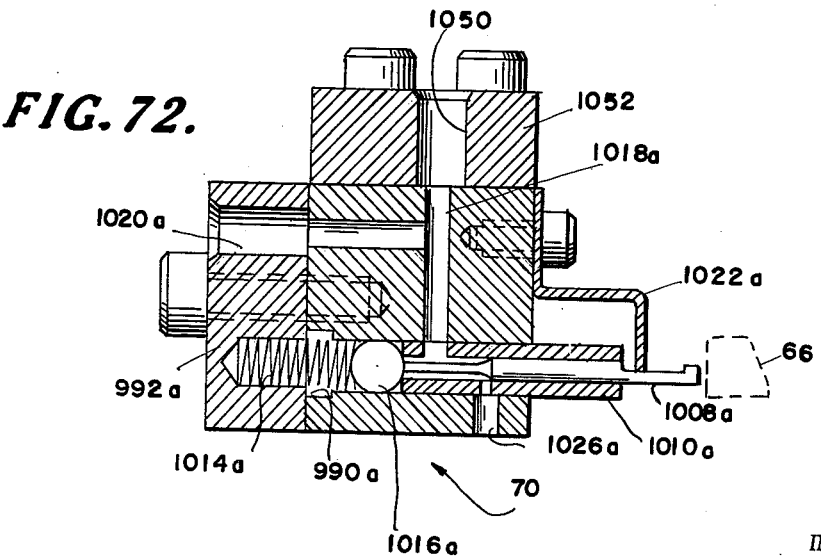

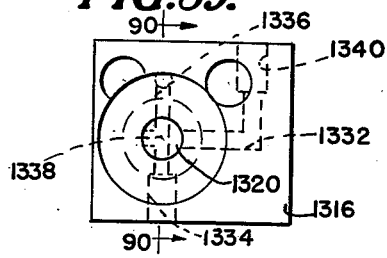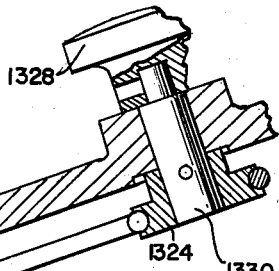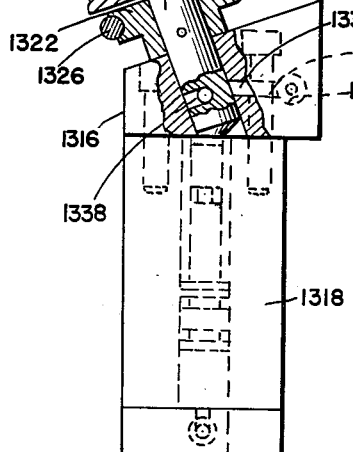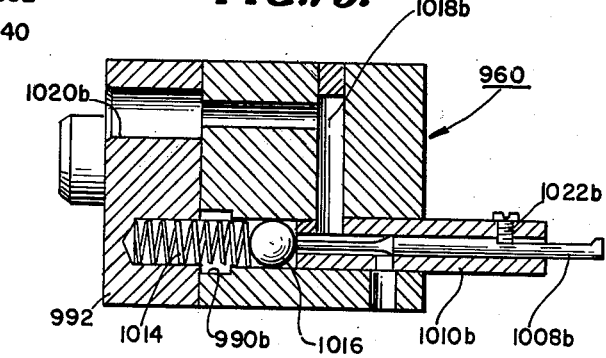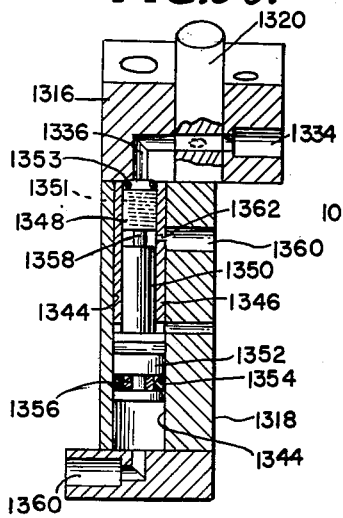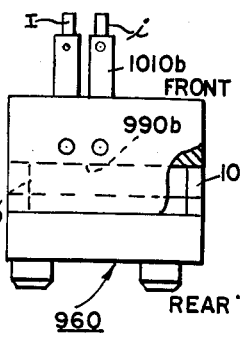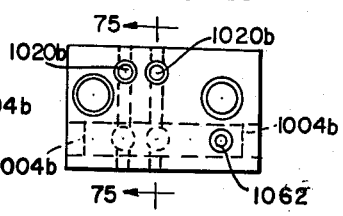

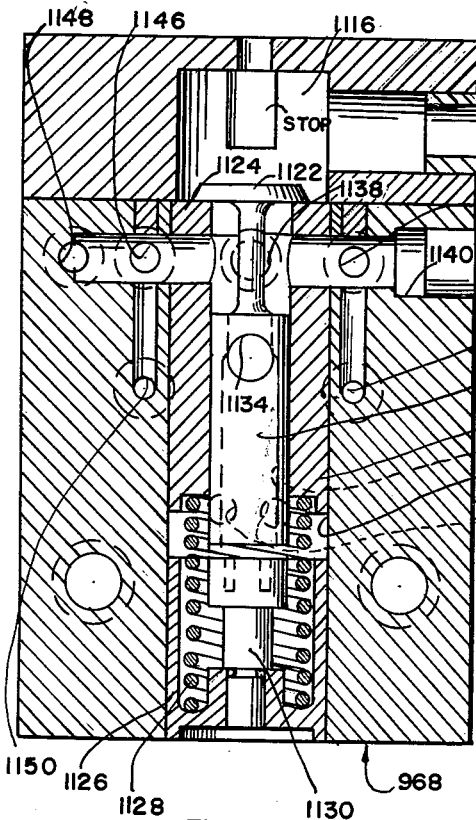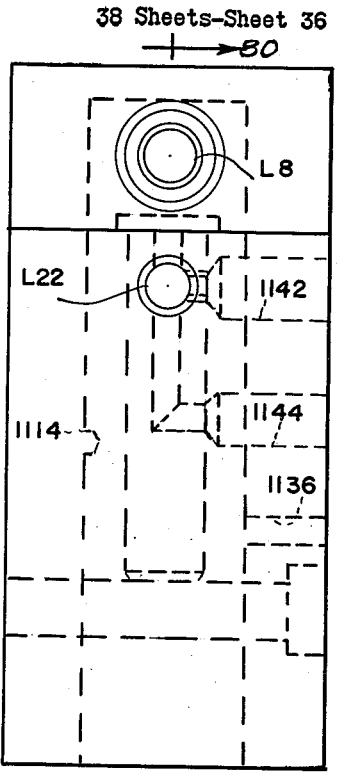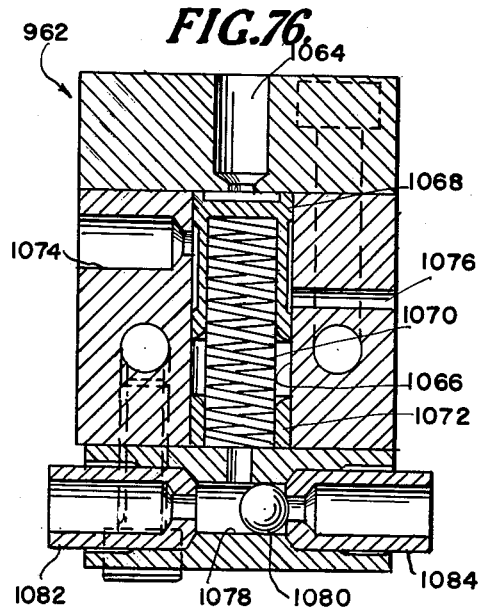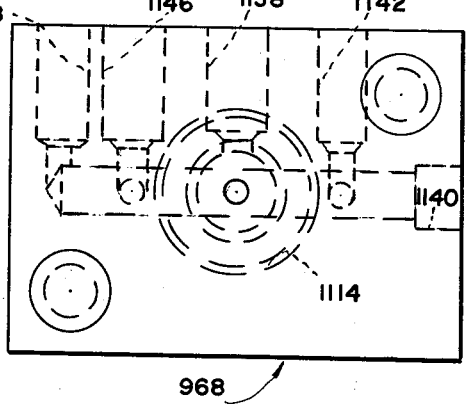

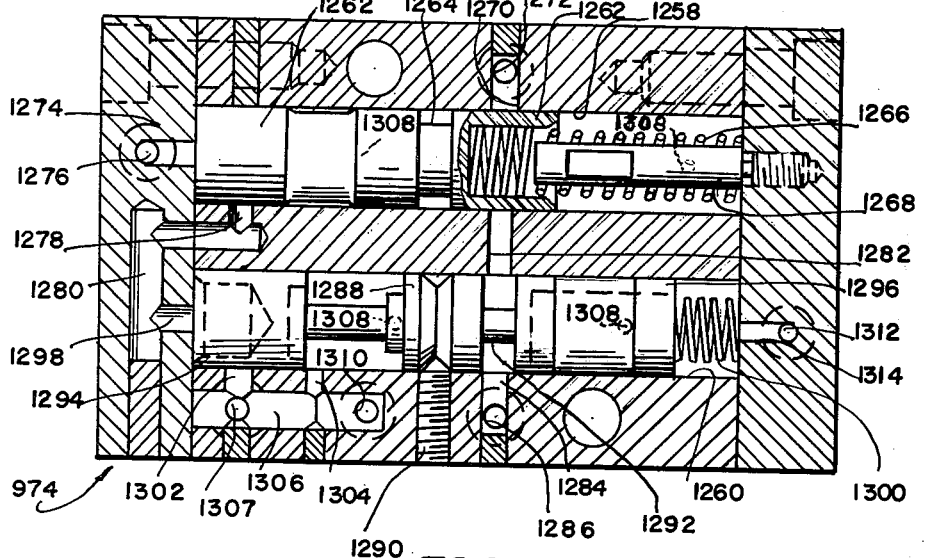
FIG. 87.
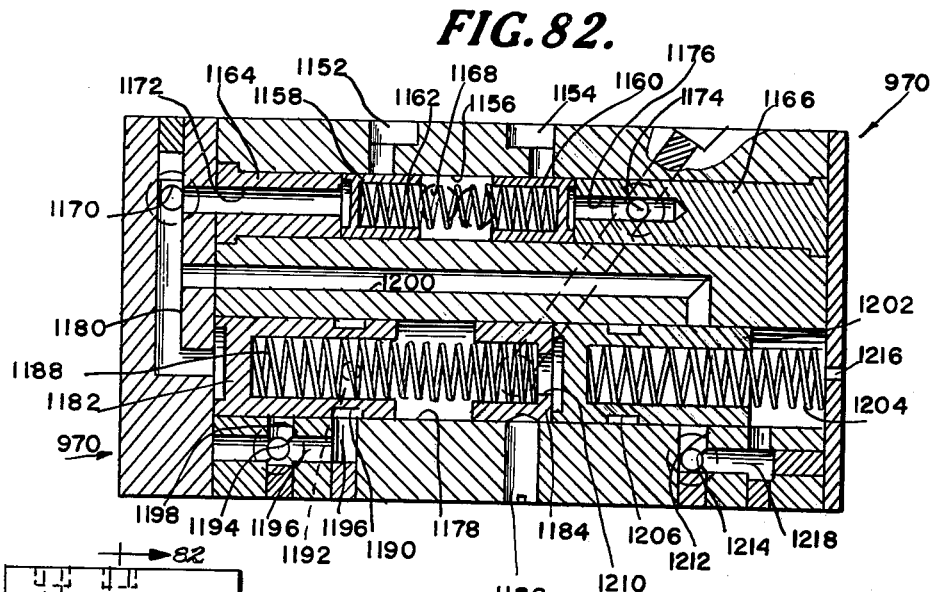
FIG. 82.
FIG. 83.
INVENTORS
ARTUR ROTH
NICKOLAUS THOMAS
BY Cushman, Darby & Cushman
ATTORNEYS Oct. 1, 1963     A. ROTH ET AL     3,105,635
TYPE COMPOSING MACHINE Filed Feb. 25, 1960     38 Sheets-Sheet 38

INVENTORS
ARTUR ROTH
NICKOLAUS THOMAS

BY Cushman, Darby & Cushman
ATTORNEYS

_United States Patent Office_

3,105,635
Patented Oct. 1, 1963

3,105,635
TYPE COMPOSING MACHINE
Artur Roth and Nickolaus Thomas, Philadelphia, Pa., assignors to Lanston Industries, Incorporated, Philadelphia, Pa., a corporation of Virginia
Filed Feb. 25, 1960, Ser. No. 10,981
51 Claims. (Cl. 234—5)

This invention relates to composing machines of the type adapted to produce perforations or punch holes in sheet material. More particularly, the invention relates to manually controlled or keyboard punching machines for the preparation of perforated record strips or controllers designed to be utilized to control other mechanisms, such as type casting machines.

Composing machines of the character referred to are shown and described, for example, in: U.S. Patents Nos. 654,115, 828,449, 871,080, 871,081, 944,405; the book entitled "The Monotype System" published by the Lanston Monotype Machine Co., Philadelphia 1915; "The 'Monotype' Keyboard Operator's Manual" published in 1950 by The National Committee of Monotype Users Associations, London; the pamphlet entitled "Keyboard Adjustments" published in 1949 by Lanston Monotype Machine Co., Philadelphia; and the pamphlet entitled "The Mechanism of the 'Monotype' Keyboard" published in 1937 by Lanston Monotype Machine Co., Philadelphia. To the extent that they assist in understanding the description of the invention to be set forth in detail hereinbelow, the disclosures in these patents, publications and reference works are hereby incorporated herein.

Type casting machines of the character referred to are shown and described in U.S. Patent No. 2,883,038 and the patents, publications and references referred to therein. In the type casting machine disclosed in Patent No. 2,883,038 the dimensioning or sizing of the type is controlled by sizing perforations in the control tape or record sheet, independent of the positioning perforations therein, and the mechanisms for positioning the matrix case over the mold are separate and independent from the mechanisms for controlling the set or normal wedge which regulates the size of the type body being cast.

The present invention has for an object the provision of novel and improved keyboard composing machines, of the type referred to and novel combinations, constructions and arrangement of parts designed especially to produce perforated control tapes or record strips adapted to be used for controlling the operation of casting machines of the type referred to.

As will be apparent from the following description, the illustrative embodiment of the invention is applicable, although not limited, to a so-called 18 x 18 system of type composition and casting, which includes 18 x 18 type casting machines, such as that disclosed in Patent No. 2,883,038, and an 18 x 18 matrix case of matrices used in the casting machine and divided into four quadrants of nine rows and nine columns each. Among other things, this 18 x 18 system of type composition and casting including the present invention, will provide for more efficient and simplified operation, as well as increasing the scope and versatility of the machines relative to the number and types of characters and/or character faces adapted to be used therewith.

The present invention contemplates, among other things, a keyboard composing machine having a group of positioning punches and a separate group of sizing punches, both groups being coupled with the keys by means including a novel permutation mechanism. In the illustrative embodiment of the invention, this novel permutation mechanism is in the form of a sizing plate arranged to couple the regular keys with the sizing punches in a predetermined manner. The positioning punches in the perforator are mechanically and physically independent from the sizing punches, wherefore the positioning punches are independent of and not connected to the width registering stop bars. This construction enables the keys in the keybank to be arranged in the most efficient and advantageous manner, and not, for example, according to the width of the characters corresponding thereto.

As an important feature and object of the invention, the permutation mechanism, referred to, is shiftable or movable in the machine to a different position or positions whereby the connections between the keys and the sizing punches may be conveniently varied without the necessity of removing or replacing any structure in the machine. In the illustrative embodiment of the invention, means including shift keys are provided for changing or shifting the position of the sizing plate in the machine to change the relationship between the regular keys and the sizing punches, whereby depression of the keys will operate to produce perforations or punch holes in the control tape effective to shift the 18 x 18 matrix case in the casting machine between the various quadrants thereof and to simultaneously and independently control the movements of the set or width of the character or cast body in question. The sizing plate, referred to, is mounted for convenient removal from the machine. It is contemplated that this plate may be altered, when so removed from the machine, so that when it is reinstalled, the composing machine will be converted for producing perforated control tapes that may be used with matrix cases having different arrangements of characters, and/or different character faces.

Additional and more specific objects of the invention contributing to a more efficient, precise, improved and superior composing machine include: a novel construction and arrangement of stop bars and a novel structural and operational interconnection thereof with other structure in the machine; a novel construction and arrangement of the measuring and justifying mechanisms and a novel structural and operational interconnection thereof with other structure in the machine; a novel construction and arrangement of the paper feed and paper punching mechanisms and a novel structural and operational interconnection thereof with other structure in the machine; and a novel control system and novel constructions, arrangements and combinations therein in operative connection with the keys and other structure in the machine for effecting the various desired functions and operations. An exemplary pneumatic arrangement will be shown and described for illustrative purposes as part of the control system referred to. Although this pneumatic system has been found to be most efficient, satisfactory and practical, it will be understood that other equivalent systems, such as a hydraulic, mechanical or electrical system may be utilized in lieu of the pneumatic system.

Further objects and advantages of the invention will be in part obvious and in part pointed out hereinafter.

The novel features of the invention may best be made clear from the following description and accompanying drawings, in which:

FIGURE 8 is an enlarged, vertical sectional view taken generally along line 8—8 of FIGURE 7, and with certain structures omitted for purposes of convenience and clarity;

FIGURE 9 is a rear elevational view of the key and sizing frame assembly shown in FIGURE 7;

FIGURE 10 is a skeleton view and perspective of structures in the key and sizing frame assembly showing an exemplary connection between a regular key in the keyboard and the positioning and sizing mechanisms;

FIGURE 11 is a rear elevational view of one of the sizing rockers used in the key and sizing frame assembly;

FIGURE 12 is a top view of a sizing rocker shown in FIGURE 11;

FIGURE 13 is a vertical sectional view taken generally along line 13—13 of FIGURE 11;

FIGURE 14 is a vertical sectional view taken generally along line 14—14 of FIGURE 11;

FIGURE 15 is a fragmentary and perspective view showing certain structures and mechanisms in the key and sizing frame assembly;

FIGURE 16 is an enlarged plan view of the sizing plate, broken away to show certain structures therein;

FIGURE 17 is a sectional view taken generally along line 17—17 of FIGURE 16, and with a certain structure removed;

FIGURE 18 is an enlarged side elevational view of the sizing plate shown in FIGURE 16;

FIGURE 19 is an enlarged side elevational view of the sizing plate frame;

FIGURE 20 is a bottom plan view of the sizing plate frame of FIGURE 19 and showing the sizing plate partially mounted therein;

FIGURE 21 is a sectional view taken along line 21—21 of FIGURE 20;

FIGURE 22 is an elevational and somewhat schematic view showing the sizing plate frame, and some of the structure for shifting and holding same in different operative positions in the composing machine;

FIGURE 23 is a view corresponding to FIGURE 22 and showing the sizing plate frame in a different operative position;

FIGURE 24 is a sectional view of the sliding piston block assembly taken generally along line 24—24 of FIGURE 22;

FIGURE 25 is a fragmentary and partially broken away side elevational view of the shift mechanism mounted at the rear of the key and sizing frame assembly, and with the valves designed to be actuated thereby shown in phantom;

FIGURE 26 is an enlarged and fragmentary plan view of the shift mechanism shown in FIGURE 25;

FIGURE 29 is a sectional view taken generally along line 29—29 of FIGURE 26;

FIGURE 30 is a fragmentary perspective view showing the rear ends of the shift key bar designed to operate the shift mechanism;

FIGURE 31 shows, in side elevation, the shift key bars;

FIGURE 32 shows, in fragmentary, horizontal sectional views, the rear ends of the shift key bars;

FIGURE 33 shows in side elevational views the profiles of the shift selection levers used in the shift mechanism;

FIGURE 34 is an enlarged plan view, partially in horizontal section, of the paper tower, with certain structure being omitted or shown in phantom lines for purposes of clarity and convenience;

FIGURE 35 is a vertical sectional view taken generally along the line 35—35 of FIGURE 34;

FIGURE 36 is an elevational view showing certain structure used in intermittently feeding the paper, and located at the right hand side of the paper tower;

FIGURE 37 is an enlarged vertical sectional view of the paper perforating punch mechanism in the paper tower and taken generally along line 37—37 of FIGURE 34;

FIGURE 38 is an enlarged and fragmentary plan view of the structure shown in FIGURE 37; and FIGURE 39 is a fragmentary sectional view taken generally along the line 39—39 of FIGURE 38;

FIGURE 40 is a plan view of the main driving cylinder and some associated parts;

FIGURE 41 is a vertical sectional view taken generally along line 41—41 of FIGURE 40;

FIGURE 42 is an end elevational view of the structure shown in FIGURE 40.

FIGURE 43 is an enlarged and fragmentary front elevational view of certain structures in the line measuring and justifying mechanisms;

FIGURE 44 is an enlarged and fragmentary front elevational view of a portion of the structure shown in FIGURE 43;

FIGURE 45 is a front elevational view of the Em scale and clutch disc, with certain associated structure shown in phantom;

FIGURE 46 is a vertical sectional view taken generally along line 46—46 of FIGURE 45;

FIGURE 47 is a fragmentary and enlarged vertical sectional view taken generally along line 47—47 of FIGURE 46;

FIGURE 48 is a fragmentary and enlarged front elevational view of the justification scale shaft and some associated structures, with a follower gear shown in phantom lines for clarity of illustration;

FIGURE 49 is a horizontal sectional view taken generally along line 49—49 of FIGURE 48;

FIGURE 49a is an enlarged fragmentary perspective view showing the justification scale shaft and certain structure for controlling the rotation thereof;

FIGURE 50 is an elevational view taken generally in the direction of the arrows 50—50 in FIGURE 48;

FIGURE 51 is an enlarged front elevational view of the stop bar housing and stop bars, partially broken away for clarity of illustration;

FIGURE 52 is a side elevational view of the stop bar housing shown in FIGURE 51, partially broken away for clarity of illustration;

FIGURE 53 is a side elevational view showing an exemplary stop bar profile;

FIGURE 54 is a front elevational view of the stop bar shown in FIGURE 53;

FIGURE 55 is a rear elevational view of the stop bar shown in FIGURE 53;

FIGURE 56 is an enlarged, somewhat schematic view showing a stop bar in a first operative projected position for stopping the movement of the units rack;

FIGURE 57 is a view similar to FIGURE 56 and showing the stop bar in a second operative position for stopping the movement of the units rack;

FIGURE 58 is a schematic view of certain structure in the line measuring mechanism shown in one position relative to the units wheel;

FIGURE 59 is a top plan view of the unit rack carrier and unit rack shown in FIGURE 58;

FIGURE 60 is an enlarged perspective view of the unit rack shown in FIGURE 58;

FIGURE 61 is a perspective view of the unit rack carrier shown in FIGURE 58;

FIGURE 64 is a fragmentary and enlarged perspective view showing the high and low delete keys and structure actuated thereby;

FIGURE 64a is a fragmentary and enlarged perspective view of the spacer bar and exemplary structure shifting the position thereof;

FIGURES 65a, 65b, 65c, 65d are broken schematic views of an exemplary pneumatic system according to the invention. These views will be assembled with FIGURE 65b in the middle, FIGURE 65a directly thereabove, FIGURE 65d directly therebelow, and FIGURE 65c directly to the left of FIGURE 65b, as will be apparent;

FIGURE 66 is an enlarged plan view of the positioning valve block;

FIGURE 67 is a rear elevational view of the positioning valve block;

FIGURE 68 is an enlarged vertical sectional view taken generally through line 68—68 of FIGURE 67;

FIGURE 69 is an enlarged sectional view taken generally along line 69—69 of FIGURE 67;

FIGURE 70 is an enlarged plan view of the sizing valve block;

FIGURE 71 is a rear elevational view of the sizing valve block;

FIGURE 72 is an enlarged vertical sectional view taken generally along line 72—72 in FIGURE 71;

FIGURE 73 is an enlarged plan view of the shift valve;

FIGURE 74 is a rear elevational view of the shift valve;

FIGURE 75 is an enlarged sectional view taken generally along line 75—75 in FIGURE 74;

FIGURE 76 is an enlarged longitudinal sectional view through the shift control valve;

FIGURE 77 is an end elevational view of the power shift valve;

FIGURE 78 is a sectional view taken generally along line 78—78 of FIGURE 77;

FIGURE 79 is an enlarged side elevational view of the timing valve;

FIGURE 80 is a sectional view taken generally along line 80—80 of FIGURE 79;

FIGURE 81 is an end elevational view of the timing valve;

FIGURE 82 is a longitudinal sectional view of the selector valve taken generally along line 82—82 of FIGURE 83;

FIGURE 83 is an end elevational view of the selector valve;

FIGURE 87 is a longitudinal sectional view through the restoring valve;

FIGURE 88 is an enlarged and partially broken away elevational view of the letter spacing valve, shown in operative connection with an actuating knob therefor;

FIGURE 89 is a top plan view of the letter spacing valve;

FIGURE 90 is a sectional view taken generally along line 90—90 of FIGURE 89;

The mechanisms and structures in the illustrative embodiment of the composing machine may be divided into groups to facilitate the description and understanding of the invention. As in the composing machines disclosed in the patents and publications referred to above, the composing machine in the present invention includes the following mechanisms and structures: a keyboard or finger mechanism and coupling means operatively connecting the keys to other mechanisms in the machine to control their movements; a paper feeding mechanism for advancing the control tape or record strip at regular intervals and holding it in position to be perforated; a series of punches arranged transversely of the paper and cooperating with dies to form the signal perforations in the control tape; registering and indicating mechanisms showing the amount of space remaining in the line and the appropriate justification keys to be operated to make a properly justified line; and resetting and restoring mechanisms.

Figure 1:
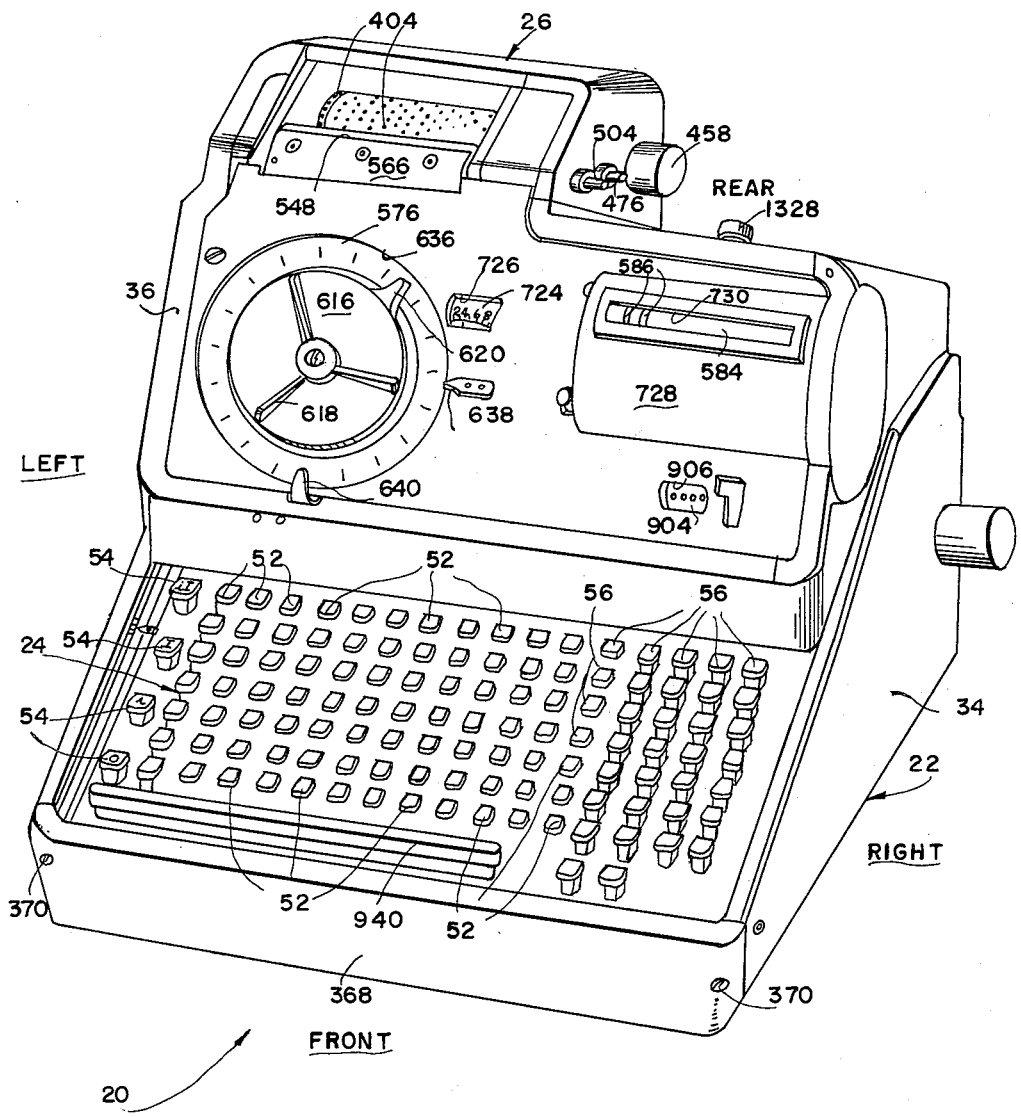
FIGURE 1 is a perspective view of a composing machine embodying the invention.
Figure 2:
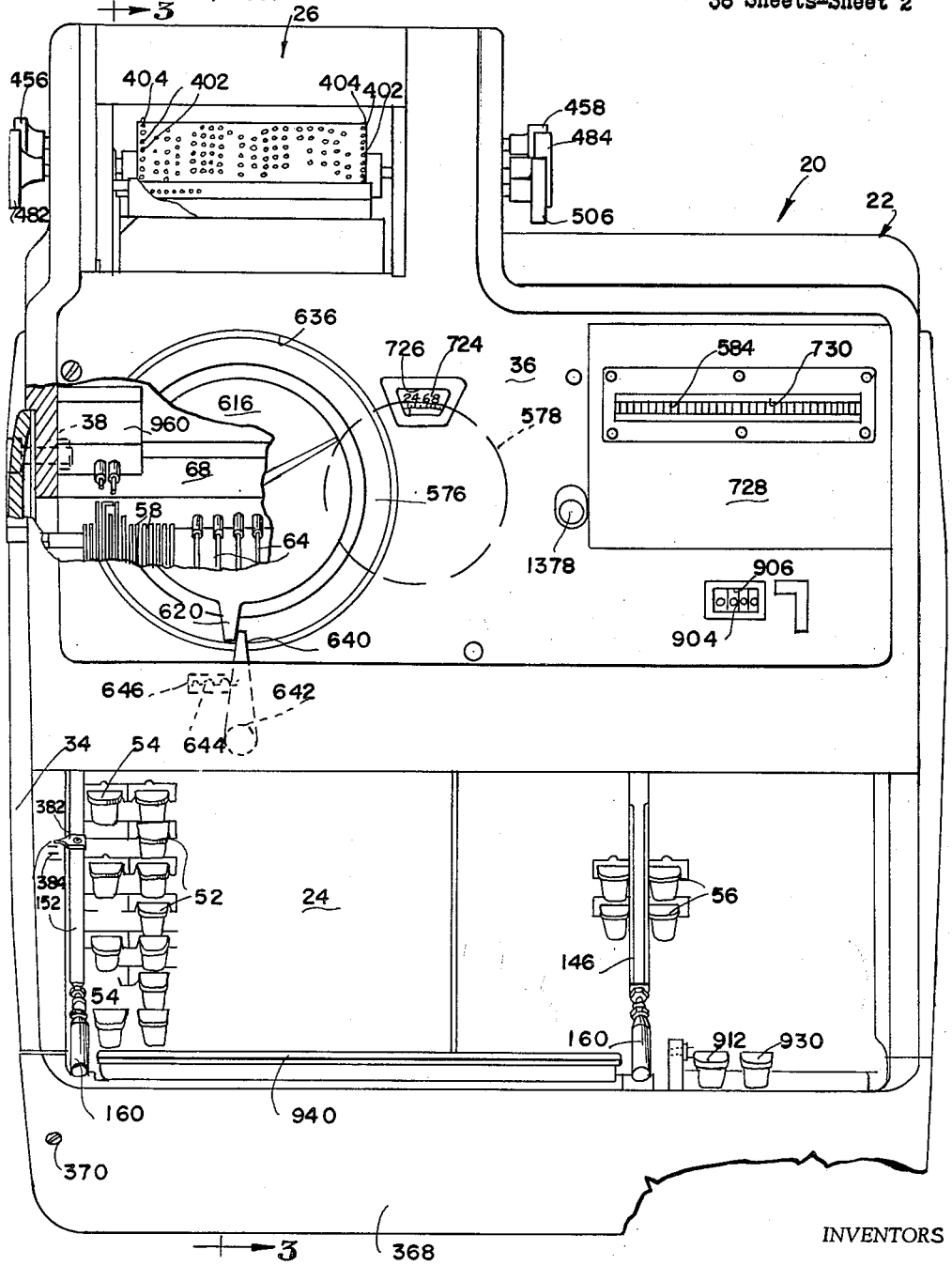
FIGURE 2 is a view looking down at an angle on the machine of FIGURE 1, from the front thereof, and with certain parts and structures broken away or omitted for purposes of clarity and convenience of illustration.
Figure 3:
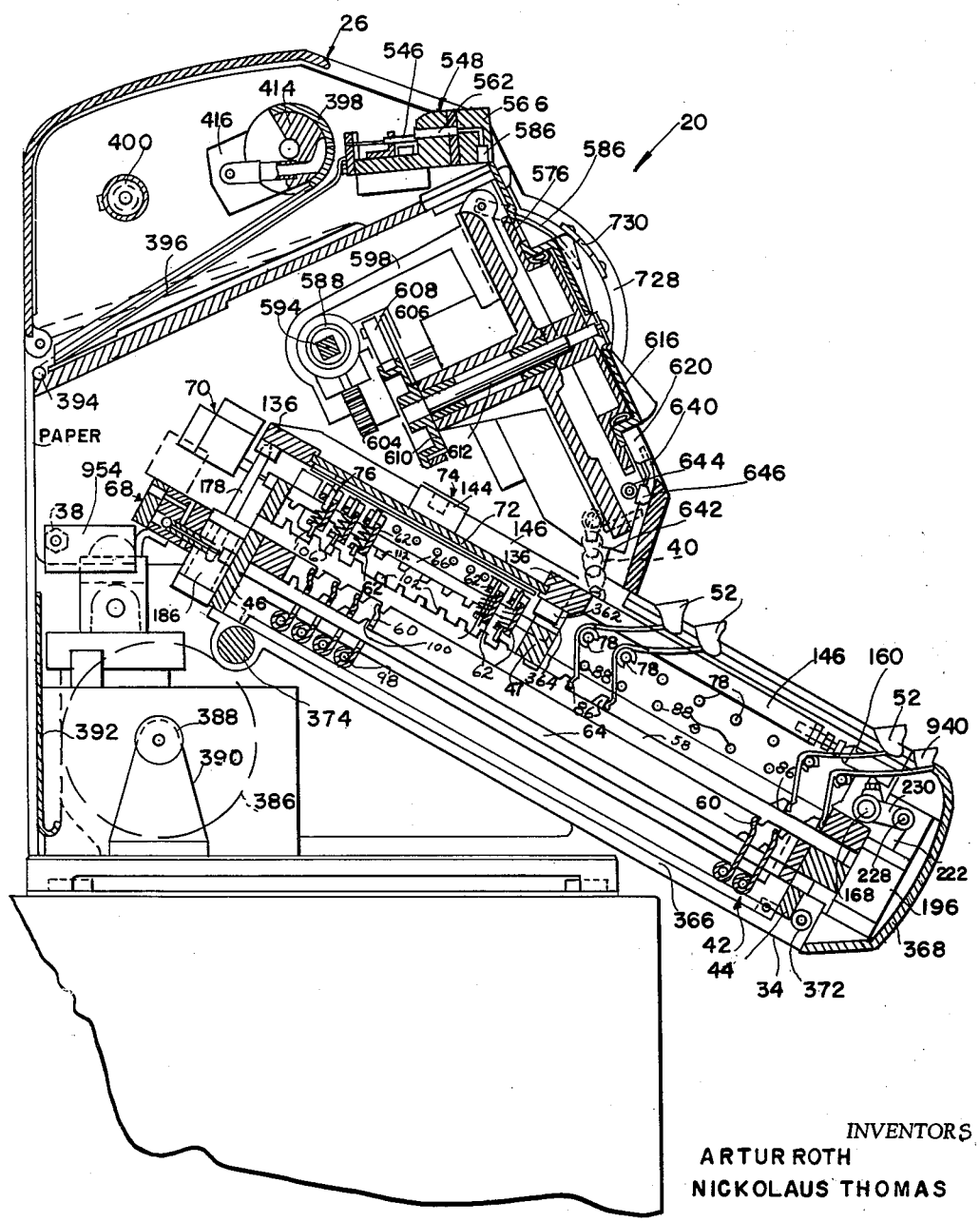
FIGURE 3 is a vertical sectional view taken generally along line 3—3 of FIGURE 2 and with certain parts and structures omitted for purposes of clarity and convenience of illustration.

Referring now to the illustrative embodiment of the invention shown in the drawings, and particularly, FIGURES 1-3, it will be seen that the composing machine, indicated by numeral 20, comprises a housing 22, a bank of keys or keyboard 24, a tower 26, for housing the perforating punches and the paper feeding mechanism, an Em scale 576, a units wheel 578, and a justifying scale 584.

There is provided a group of perforating punches for producing positioning perforations in the control tape, and another and separate group of punches is provided for producing sizing or dimensioning perforations in the control tape. As will become more apparent as the description proceeds, the present invention includes novel structure for coupling the keys to the positioning and sizing punches so that the sizing punches may be conveniently operatively connected to desired keys in the key bank, irrespective of the position of the keys in the key bank, and irrespective of the position in the matrix case (of the casting machine) of the character or characters represented by the keys.

The keys will be depressed in proper order by the operator to produce the desired perforations in the paper or control tape. As the line is thus being composed, the Em scale and justification scale mechanisms will be actuated to indicate, respectively, the number of units left in the line, and the justification necessary.

Figure 5:
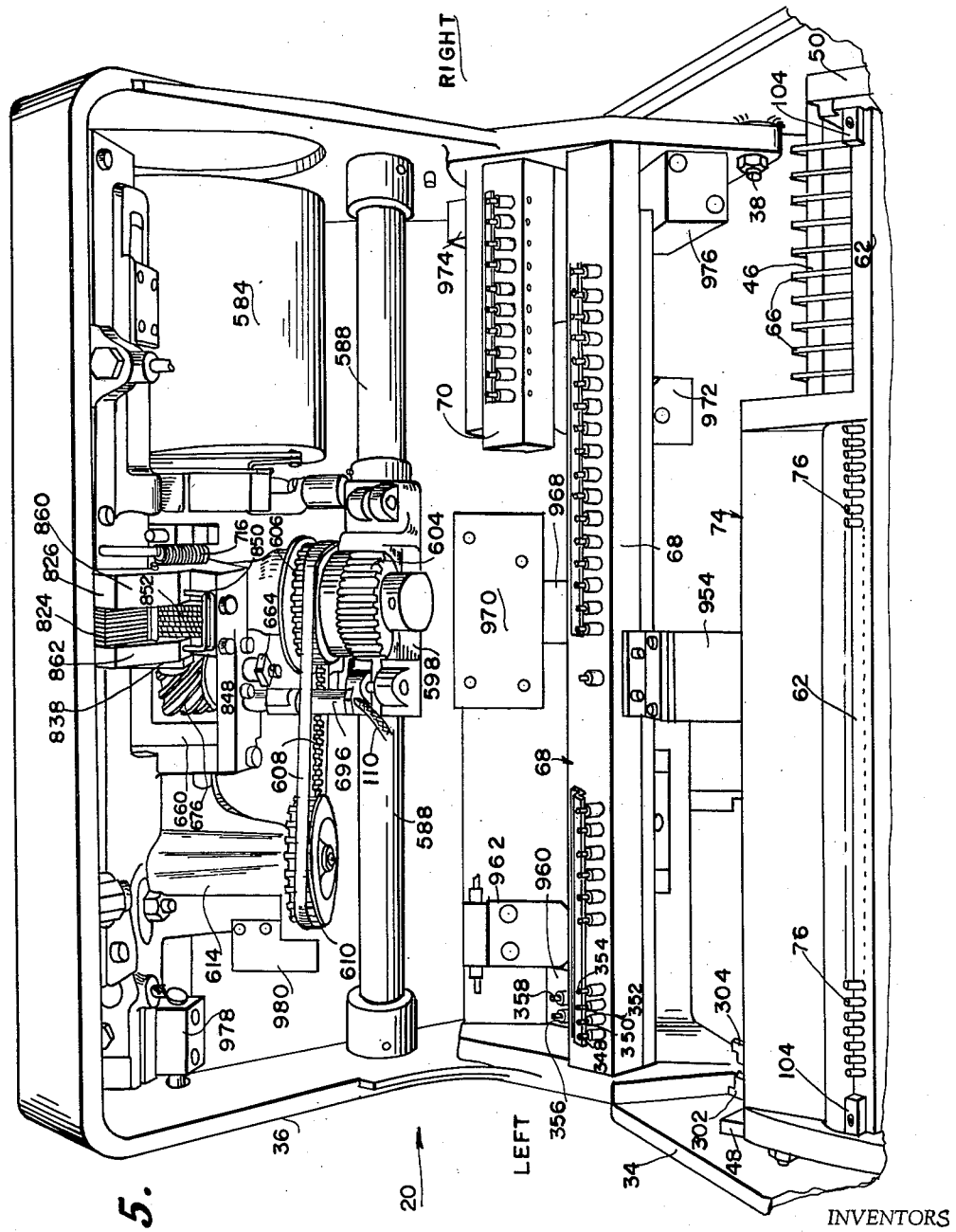
FIGURE 5 is a fragmentary and enlarged perspective view of the machine of FIGURE 1 looking in from the front with the upper housing section pivoted rearwardly and with the fluid conduits connecting various parts in the fluid system not shown, for purpose of clarity of illustration.

The housing 22 is shown as being composed of a lower section 34 and an upper section 36. These sections 34, 36 are shown as being pivotally connected together by means of bolts 38, as best seen in FIGURES 2, 3 and 5, providing pivots whereby the upper housing section 36 may be swung or pivoted upwardly to provide access to the interior of the housing. A chain 40 may be connected between these housing sections to limit the opening movement therebetween, as indicated in FIGURE 3.

Key and Sizing Mechanism

Referring now to FIGURES 3 and 7-33, and particularly to FIGURES 3, and 7-10, it will be seen that the keys are mounted in a key frame assembly 42, the latter being designed to be removably installed in the lower housing section 34. This frame assembly 42 is of generally rectangular configuration including front 44, rear 46, intermediate 47 and left 48 and right 50 sections suitably joined together. The keys may be divided into three groups, namely, the regular keys 52, the shift keys 54, and special keys 56. As will be described in more detail hereinbelow, the regular keys 52 are operatively connected to key bars 58 disposed therebelow, the key bars 58 being constructed to actuate positioning rocker arms 60 and sizing rockers 62 disposed respectively therebelow and thereabove. The positioning rocker arms 60 are arranged to actuate positioning valve bars 64, while the sizing rockers 62 are arranged to actuate sizing valve bars 66. The positioning valve bars 64, when actuated, will operate valves in a positioning valve block 68 to control the flow of fluid pressure to the positioning punches, and the sizing valve bars 66, when actuated, will operate valves in a sizing valve block 70 to control the flow of fluid pressure to the sizing punches, as will be explained in more detail hereinbelow.

The keys 52, key bars 58, positioning rocker arms 60, positioning valve bars 64, sizing rockers 62, and sizing valve bars 66, will be so arranged and interconnected that depression of the regular keys 52, will be effective to cause preselected ones of the positioning valve bars 64 and the sizing valve bars 66 to be actuated whereby predetermined positioning and sizing signals will be transmitted to the paper perforating mechanism to produce positioning and sizing perforations in the control tape or paper corresponding respectively to the position in the matrix case of the character in question, and to its set size or width.

In accordance with the invention, novel means are provided for coupling the key bars 58 to the sizing valve bars 66 in a predetermined order, while permitting such order to be changed without the necessity of removing or replacing any parts from the machine. In the illustrative embodiment of the invention, this means includes a sizing plate 72 mounted in a rectangular sizing frame 74, the latter being shiftably or movably arranged in the machine and the shifting movements thereof being under the control of the shift keys 54, as shown in FIGURES 3 and 7–24. As will be explained in more detail hereinafter, the sizing plate 72 carries pins 76 removably arranged therein and operative when the sizing plate is shifted from one position to another in the machine to couple the sizing rockers 62 with different ones of the key bars 58.

Figure 7:
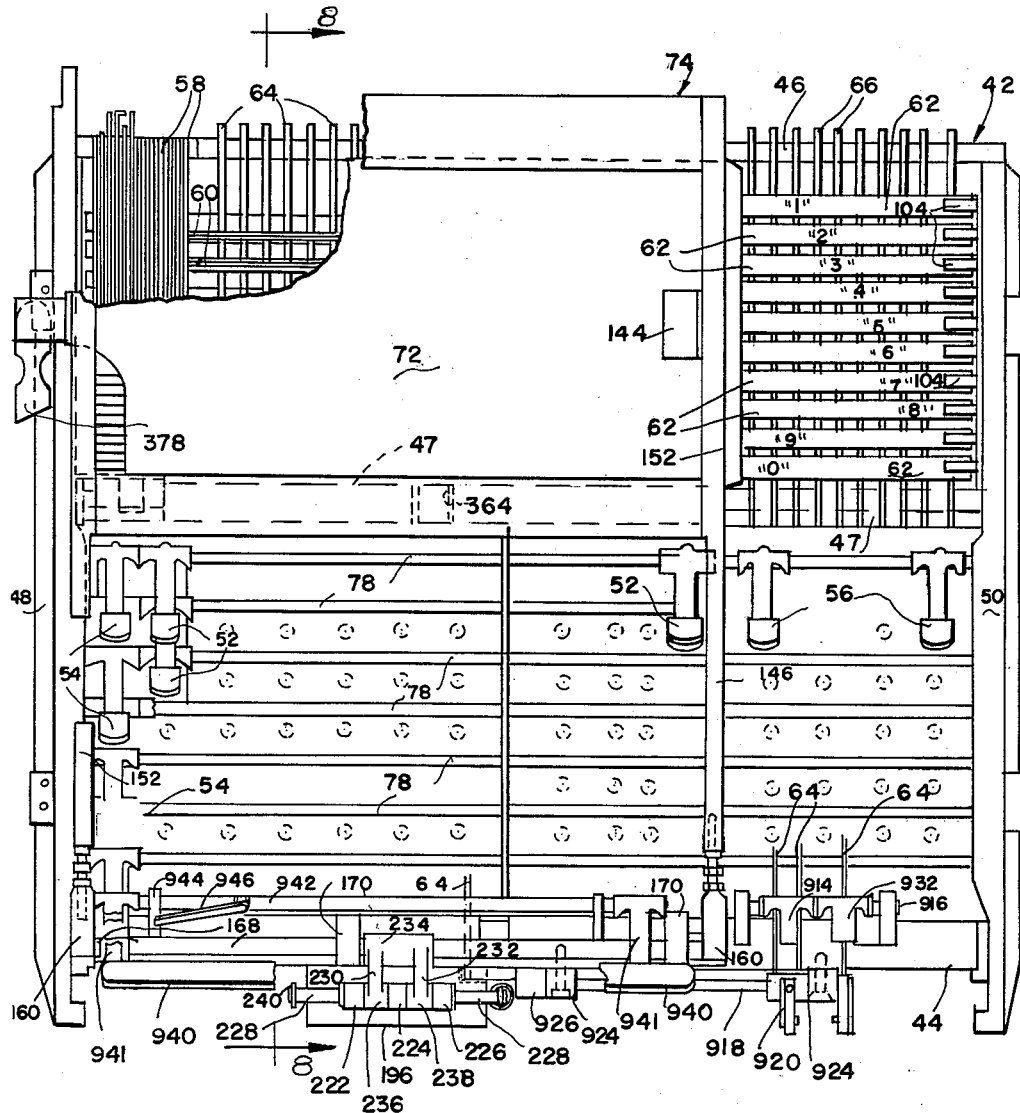
FIGURE 7 is an enlarged plan view of the key and sizing frame assembly, with certain parts and structure broken away and omitted, for purposes of convenience and clarity of illustration.

A plurality of key lever shafts 78 are arranged in spaced parallel relation in the key frame assembly, and may be mounted at either end thereof in the frame side pieces 48, 50, as best seen in FIGURE 7. An intermediate support 80 may be provided for these shafts, as shown. In the illustrative construction shown, there are seven of these shafts 78. The keys are carried on key levers 82 which are pivotally connected to the key lever shafts 78, and include a depending pusher arm 84 adapted to engage against the rear of a lug 86 on the key bar 58. Thus, each key bar is provided with a lug 86 adapted to be actuated by the appropriate regular key 52. As will be appreciated, indicia will be provided for the face of the keys in any appropriate manner, and, suitable means, such as a small tension spring (not shown), may be engaged to each of the key pusher arms 84 to return them to their rest positions, as shown in FIGURES 3 and 7.

The key bars 58 are arranged in the key frame assembly in closely spaced and parallel relation and are shown slidably mounted at each end thereof in the front 44 and rear 46 portions of the frame assembly 42, as best seen in FIGURES 3 and 8. The movement of the key bars 58 to the front or right, as viewed in FIGURE 8, is limited by the provision of key lever stop rods 88 for the key lever arms 82, these rods 88 being mounted in and extending between the sides 48, 50 of the key frame assembly 42 in the manner best shown in FIGURE 8. Movement of the key bars rearwardly or to the left, as viewed in FIGURE 8, will be limited by the provision of a lug 90 on the rear of the key bars and designed to strike against the rear frame portion 46, as will be apparent.

The middle or intermediate frame portion 47 may be provided with grooves 92 in the lower surface thereof designed to slidably receive a raised portion 94 on each of the key bars 58.

Lugs 96 are also provided on the underside of the key bars 58 for engagement to the positioning rocker arms 60. These rocker arms 60 are shown as being pivotally mounted on shafts 98 arranged in parallel relation and extending between and mounted in the sides 48, 50 of the key frame assembly 42. Two lugs 96 preferably are provided on each key bar 58 coupled to a regular key 52, whereby upon depression of a regular key 52, the appropriate key bar therefor will be moved to the rear, actuating two of the rocker arms 60. This effects actuation of two of the valve bars 64 since each rocker arm 60 is arranged to engage a lug 100 on each positioning valve bar 64. Each positioning valve bar is shown as including only one lug 100 thereon for actuation by one rocker arm 60. Each of the rocker arms 60 may be constructed as indicated in FIGURE 10, so that the positioning valve bars extend through slots therein. As previously indicated, positioning valve bars 64 will operate to open valves in the positioning valve block 68 whereby fluid under pressure may be transmitted to the appropriate perforating punch to actuate same in a manner that will be described more fully hereinbelow.

Each key bar 58 is also provided with a plurality of lugs 102 thereon disposed below the sizing rockers 62. In the illustrative arrangement, there are provided ten sizing rockers 62 and ten lugs 102, each of the lugs 102 normally being disposed beneath one of the rockers 62. The sizing rockers 62 are shown as being in the form of somewhat U-shaped channel members, as shown in FIGURES 3, 8 and 11–15. These rockers extend between the sides 48, 50 of the key frame assembly and are suitably mounted for pivotal movement, as by means of rocker arms 104 suitably pivotally or rotatably engaged in the frame sides 48, 50 to define a horizontal pivotal axis for each sizing rocker 62 extending through the rocker arms 104 at each end of each rocker 62. A plurality of plungers 106 are reciprocably mounted in each sizing rocker 62, as best seen in FIGURES 3, 8 and 13. A compression spring 108 encircles each of these plungers 106 and is suitably engaged to the plunger and the bottom of the rocker to continuously urge the plungers upwardly to a position above the tops of the lugs 102 on the key bars 58. There will be plungers 106 on the sizing rockers 62 for each of the lugs 102 of the key bars therebeneath.

Due to the manner in which the sizing rockers 62 and plungers 106 are constructed and arranged for pivoting movement on horizontal axes extending through the rocker arms 104, each of the sizing rockers 62 will normally be urged to pivot in a clockwise direction, as viewed in FIGURE 3, to move the plungers 106 away from engagement with the rear edge of the lugs 102. Thus, the rockers 62 will be continuously urged to positions where the plungers 106 therein will be out of engagement with the rear edge on lugs 102 of the key bars 58, and this will be the position for the rockers 62 and plungers 106 prior to engagement of the pins 76 in the sizing plate with the plungers 106.

Each of the rockers 62 is provided with a longitudinal slot 110 therein adjacent the right hand side 50 of the key frame assembly 42, as shown in FIGURES 7 and 10. These elongated slots slidably receive the sizing valve bars 66. In the illustrative arrangement, ten such valve bars 66 are provided, and they are slidably mounted in the intermediate 47 and rear 46 portions of the key frame assembly 42 for front to rear reciprocation. Each of these sizing valve bars is provided with one lug 112 along its underside for engagement to and actuation by one of the sizing rockers 62. A second lug 114 is also provided on each of the sizing valve bars 66 adjacent the rear frame portion 46 for arresting the movements of the sizing valve bars in the rearward direction.

The plurality of removable pins 76 are disposed in the sizing plate 72 in a predetermined order for engagement with appropriate ones of the plungers 106 in the sizing rockers 62, whereby when the sizing plate is arranged in one of its different operative positions in the machine, preselected ones of the plungers 106 will be depressed by the pins 76. The depressed plungers 106 will then be in engagement with the rear edge of the respective key bar lugs 102. Normally, two of the ten lugs 102 on each key bar 58 will be engaged by a plunger 106 in each of two of the sizing rockers 62, when the sizing plate is in one of its operative positions. Thus, when a regular key 52 is depressed to move rearwardly the key bar 58 coupled thereto, two of the sizing rockers 62, will be pivoted or rocked in a clockwise direction, as viewed in FIGURES 3 and 8, by reason of the engagement of two of the plungers 106 with two of the lugs 102 on that key bar. When so rocked or pivoted, the actuated sizing rockers 62 will push the sizing valve bar lugs 112, engaged thereto, in a rearward direction, to cause the respective sizing valve bars 66 to move rearwardly and actuate valves in the sizing valve block 70.

Thus, it will be seen that during normal operation, when a regular key 52 is depressed, two of the positioning valve bars 64 will normally be actuated, and two of the sizing valve bars 66 will also normally be actuated.

In the illustrative embodiment thereof, as best seen in FIGURES 3, 7, 8, 9, 10 and 15–24, the sizing plate 72 includes planar members 118, 120 of generally elongated, rectangular configuration. A lug 122 projects from one of the short sides of member 118, and parallel grooves 124 are formed adjacent the long sides thereof. Member 120 is perforated and is mounted to the member 118, as by means of guide rails 126 disposed in the grooves 124 and suitably held therein, as by screws. A groove 128 is provided in these guides 126 for engagement to the edges of the perforated plate 120, as will be evident. The perforations or holes in the plate 120 will receive the pins 76 in the proper order. These pins 76, as shown in FIGURE 18, include enlarged heads disposed between the perforated plate 120 and plate 118 whereby they will be held against any movement. Any suitable means may be provided for locating the perforated plate 120 in proper position in the plate 118. For example, a square nut 130 may be arranged on the plate 118 in a position designed to abut against one of the shorter sides of the perforated plate 120 when the latter is in proper position on the plate 118. If desired, the perforated plate 120 may be removed by sliding same outwardly, or to the right, as viewed in FIGURE 16, away from the plate 118, whereafter the arrangement of pins therein may be varied, as desired. The perforated plate 120 may be remounted in the plate 118 by sliding it in the channels or grooves in rails 126. The screws fastening the rails 126 to the plate 118 may be loosened when either removing or installing the perforated plate 120 and thereafter tightened, if desired.

The arrangement of the pins 76 in the perforated plate 120 carried by the plate 118 will determine the operative connection between the regular keys and the sizing valve bars 66 when the sizing plate 72 is in any of its operative positions in the machine. And the arrangement or order of pins 76 in the perforated plate 120 may be varied when the sizing plate is removed from the machine, as stated.

The rear 134 and intermediate 136 portions of the sizing plate frame 74 are formed with longitudinal grooves 138 therein designed to slidably receive the sizing plate 72, as indicated in FIGURES 3, 8, 19, 20, 22 and 23. Suitable means are provided for detachably retaining the sizing plate in proper position within the frame 74. For example, as best seen in FIGURES 20 and 21, a detent 140 may be provided in a block 144 secured to the right side portion 146 of the sizing plate frame 74, and urged outwardly by compression spring 148, for releasable locking engagement in a recess 150 in member 118 of sizing plate 72, as shown in FIGURES 16 and 20. Thus, as the sizing plate 72 is slid into the sizing plate frame grooves 138 and from left frame portion 152 toward right frame portion 146, the side 154 of the sizing plate member 118 will pass under the detent 140, and the latter will automatically releasably lock in the recess 150, when the latter is in alignment therewith to assure proper position of the sizing plate 72 in frame 74. An inclined groove 156 is shown as being provided adjacent the side 154 of the sizing plate frame 74, in alignment with the recess 150, in order to permit this side of the sizing plate to pass under the detent, as will be evident.

The sizing plate frame, as stated above, is shiftably mounted on the key frame assembly 42. In the illustrative arrangement, and as best seen in FIGURES 19, 20, 22 and 23, the sizing plate frame 74 is provided with two rows of teeth 158, on the underside of the intermediate frame portion 136, and adjacent the side frame portions 146, 152. The free ends of these side frame portions are provided with adjustable extensions 160, having threaded portions screwed into the ends of these frame portions 146, 152, as best seen in FIGURES 3, 7, 8, 22 and 23. These extensions 160 are each provided with a socket 162 therein receiving a ball 164 provided on the end of levers 166. These levers 166 and balls 164 are fixedly secured to a shaft 168 suitably journalled in the key frame assembly 42, as by being journalled in blocks 170 carried by the front portion 44 of the key frame assembly. The rows of teeth 158 on the intermediate frame portion 136 of the sizing plate frame 74 will be engaged with corresponding rows of teeth 172 arranged thereunder on the intermediate frame portion 47 of the key frame assembly 42, as best seen in FIGURES 3, 7, 8, 22 and 23.

A lug 174 having a socket 176 therein is arranged underneath the rear portion 134 of the sizing plate frame 74, as shown in FIGURES 3, 8, 19, 20, 22 and 23, and a plunger or rod 178 is loosely mounted at one end in this socket 176 and at the other end this rod is loosely mounted in a socket 180 formed in a piston 182, as best seen in FIGURES 3, 8, 22 and 23. Piston 182 is reciprocably mounted in a cylinder 184 formed in a lifting cylinder block 186 secured to the rear portion 46 of the key frame assembly 42, and constructed as shown. An air inlet 188 is formed in the bottom of this block 186 for the introduction of air into the cylinder 184 to lift the piston 182. Two tension springs 190 are shown as being connected at one end to pins 192 on the rear portion 134 of the sizing plate frame 74, and at the other ends thereof, these springs are connected to pins 194 extending from opposite ends of the base of lifting block 186, as best seen in FIGURES 8, 22, 23.

A sliding piston block 196 is secured to the front frame portion 44 of the key frame assembly, and as best seen in FIGURE 24, this block 196 is formed with three cylinders 198, 200, 202 therein. Pistons 204, 206, 208 are arranged for sliding movement in each of these cylinders, and inlets 210, 212, 214 respectively communicate with the bottoms of these cylinders for the introduction of fluid under pressure thereinto. Each of the pistons 204, 206, 208 is of a different size or height, as shown, and sockets 216, 218, 220, respectively are formed therein, as shown. Piston rods 222, 224, 226 are loosely disposed at one end thereof in the sockets 216, 218, 220 respectively and extend upwardly through enlarged apertures in the sliding block 196, as shown. The upper ends of these piston rods are provided with apertures therein, and each of the rods is of the same height so that when the pistons 204, 206, 208 are retracted, the apertures in the upper ends of the piston rods will be coaxial. A shaft section 228 extends through and is journalled in the piston rod apertures and a pair of levers 230, 232 extend from a collar 234 to apertured sleeves 236, 238 disposed between the piston rods 222, 224, 226, as best seen in FIGURE 7, and in alignment therewith. The shaft section 228 also extends through and is journalled in these sleeves 236, 238. The collar 234 at the opposite end of the levers 230, 232 is fixedly secured to the shaft 168.

Tension springs 240 are connected to each end of the shaft section 228 and extend downwardly therefrom for connection to pins 242 carried by the sliding piston block 196, whereby the shaft section 228 and the piston rods 222, 224, 226 and levers 230, 232 will be continuously urged downwardly.

In accordance with the invention, the shifting movements of the sizing plate frame 74 and the sizing plate 72 carried thereby are under the control of the shift keys 54. For convenience, these shift keys 54 have been also identified as "iI," "I," "i" and "O." Each shift key corresponds to a different quadrant in the matrix case in the casting machine. In the exemplary 18 x 18 system of type composing and casting referred to above, there will be four quadrants in the matrix case, each quadrant including nine rows and nine columns and being identified respectively as the "iI," "I," "i" and "O" quadrants, as will be referred to again hereinafter. In addition to effecting the shifting movements of the sizing plate and sizing plate frame in the composing machine, depression of the shift keys 54 will also control the movements in the casting machine of the matrix case between quadrants, as will be understood as the description proceeds. Inasmuch as the arrangement or type of characters in each quadrant in the matrix case may be different from the arrangement of characters in the other quadrants in the matrix case, it is contemplated that the shifting movements of the sizing plate under the action of the shift keys will effect a change in the relationship between the regular keys 52 and the sizing valve bars 66 actuated thereby, whereby the dimensioning or set size for the character in the same relative position in each of the four quadrants may be varied. This feature will become more apparent as the description proceeds.

Each of the shift keys 54 is coupled to a key bar 58 for actuating a shift mechanism 244 located adjacent the rear frame portion 46 of the key frame assembly 42. The shift mechanism includes a shift lever assembly 246, a shift latch assembly 248 and a shift lock assembly 250 designed to be operated by the shift keys through the shift key levers to actuate valves to control the flow of fluid under pressure to the lifting cylinder block 186 and the sliding piston block 196, and also to certain punches in the paper perforating tower 26, as will be explained.

The shift mechanism 244 and the shift key bars 58 are best seen in FIGURES 2, 7, 9 and 25-32. The shift key bars each include a lug 86 for engagement by the lower end of the respective shift key lever pusher arms 84, and a rear lug 90 for limiting the rearward movement of the key bars. These lugs 90 will strike against the rear frame portion 46 when the key bars are moved rearwardly after their respective shift keys have been depressed.

The "i" shift key bar 58 further includes a lug 252 disposed rearwardly or on the outside of the rear frame portion 46, and a lateral pusher lug 254 is formed on this key bar adjacent to lug 252, as best seen in FIGURES 30, 31.

The "iI" shift key bar 58 also includes a pusher lug 256 thereon outwardly of the rear frame portion 46 and an angle piece 258 is shown as being secured to the outer end of this key bar.

The "I" key bar 58 also includes a lug 260 and a pusher lug 262 thereon outwardly of the rear frame portion 46.

The "i," "I," and "iI" shift key bars are all shown as being of substantially the same length while the "O" key bar 58 is of a somewhat shorter length, terminating at its rearward end in a lug 264, disposed outwardly or rearwardly of the rear frame portion 46, and a pusher lug 266 is also secured to this key bar outwardly of the rear frame portion.

Figure 27:
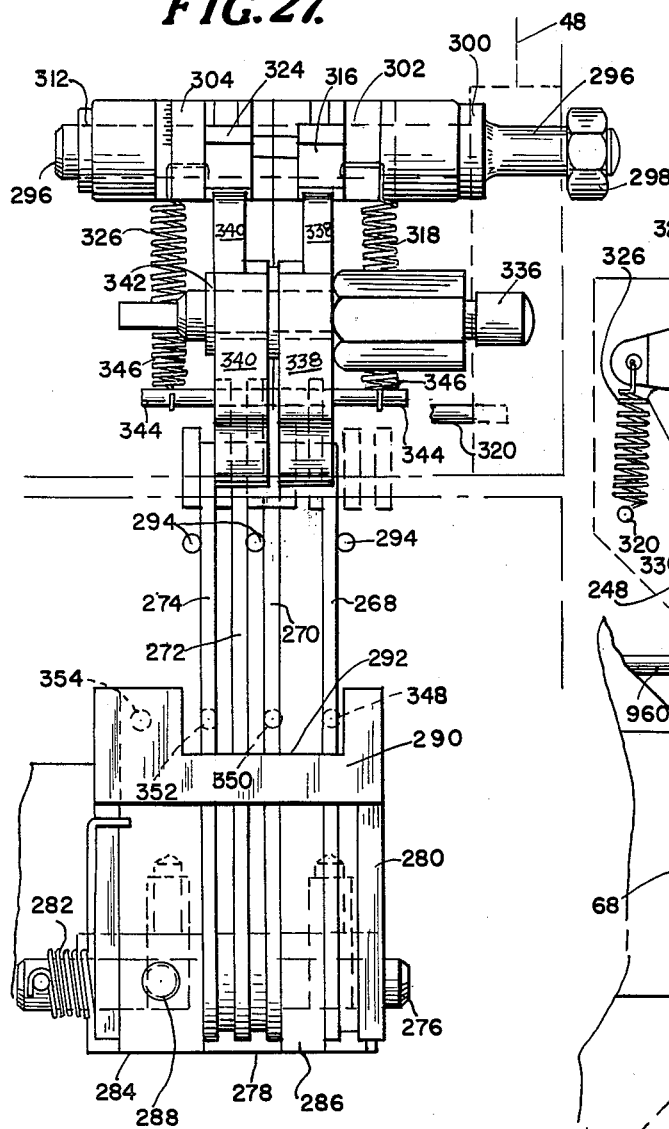
FIGURE 27 is an enlarged rear elevational view of the shift mechanism illustrated in FIGURE 25, and with certain structures being shown in phantom lines.

The rear ends of the shift key bars are shown as being of this special construction to effect desired operations of the shift mechanism 244. As best seen in FIGURES 25-29, the shift lever assembly 246 includes four levers 268, 270, 272 and 274, pivoted on a shift rocker arm shaft 276 carried by bracket 278, secured to the rear frame portion 46. A shift rocker arm 280 of inverted generally U-shaped configuration is also pivotally mounted on the shaft 276, and a torsional spring 282 is arranged on shaft 276 with an end thereof pressing against shift rocker arm 280 and with the other end thereof being engaged to a post on the shaft 276, as shown in FIGURE 27. The shaft 276 extends through blocks 284, 286 of the bracket 278, and a set screw 288 is shown as being screwed into the block 286 and against shaft 276.

The transverse portion 290 of the rocker arm 280 is provided with a cut-out portion 292 therein for a purpose that will be apparent as the description proceeds.

Figure 28:
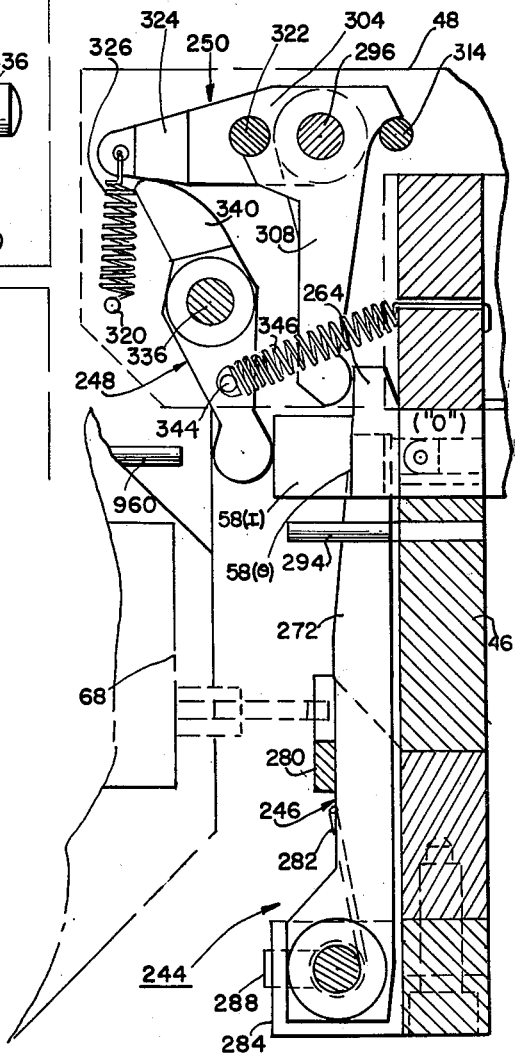
FIGURE 28 is a sectional view taken generally along line 28—28 of FIGURE 26.

The upper ends of each of the levers 268, 270, 272, 274 are in engagement with the shift key bar pusher lugs 254, 256, 266 and 262, respectively. Thus, there is a shift lever for each of the shift key bars. The spring 282 will continuously urge the rocker arm 280 and the shift levers to pivot in a clockwise direction, as viewed in FIGURE 28. In this position, the shift levers 268, 270, 272 and 274 will be in engagement with their respective lugs 254, 256, 266 and 262 on the shift key bars, and the shift key bars will be in their retracted positions. Whenever a shift key is depressed, its respective shift key bar will be actuated or moved rearwardly, which in turn will cause the shift lever, engaged to the pusher lug thereon, to pivot away from the rear frame portion 46 and against the action of the spring 282. This pivotal movement of the shift lever about the axis of shaft 276 will also produce a corresponding pivotal movement of the rocker arm 280 about the shaft 276. Guide pins 294 are shown in FIGURES 27, 28 as being provided adjacent the upper ends of shift levers 268, 270, 272 and 274 for guiding the movements thereof. The spring 282 will operate to urge the shift levers 268, 270, 272 and 274, and their respective shift key bars back to their normal retracted positions.

The shift lock assembly 250 is arranged adjacent the upper end of the rear frame portion 46, and includes a shaft 296 mounted in an extension of the side frame portion 48 of the key frame assembly, as shown in FIGURES 26 and 27. A nut 298 and collar 300 are provided to secure the shaft 296 in the position shown. Mounted on this shaft 296 in axially spaced positions are two shift locks 302, 304 and arranged for rotation on the shaft 296 between these shift locks are three shift selection levers 306, 308, 310. The shift selection levers and the shift locks are rotatable or pivotable on the shaft 296, and spacer rings are shown as being provided therebetween. A grip ring 312 is shown as being provided on the opposite end of the shaft 296 from the nut 298.

The shift lock 302 is shown as including a hub having a forward radial extension and a rearward extension. A pin 314 is mounted in the forward extension and extensions laterally toward the shift lock 304 in parallelism with the shaft 296. The rearward extension of lock 302 includes a laterally extending lug 316 and a tension spring 318 is connected at one end to the rear end of lock 302 and is suitably anchored at the other end, as, for example, to a pin 320 (see FIGURES 25, 28) carried by the side frame portion 48 of the key frame assembly. The other shift lock 304 also includes a hub having a rearward extension. A pin 322 is secured to this extension and extends laterally toward the shift lock 302 in parallelism with the shaft 296. The rearward extension of the shift lock 304 includes a laterally extending lug 324 and a tension spring 326 is connected at one end to the rear of lock 304 and is anchored at the other end to pin 320.

The shift selection lever 306 is designed to be actuated by the lug 252 on the "i" shift key bar 58, and it includes a curved projection 328 disposed below and in engagement with the pin 322 carried by the shift lock 304, as best seen in FIGURE 29. The shift selection lever 308 is designed to be actuated by the lug 264 on the "O" shift key bar 58 and includes generally oppositely extending projections 330, 332 designed to be disposed under pin 322 on shaft lock 304, and over the pin 314 of shift lock 302, respectively, as best seen in FIGURE 28. The shift selection lever 310 is designed to be actuated by the lug 260 on the "I" shift key bar 58 and includes a curved projection 334 disposed above and in engagement with the pin 314 carried by the shift lock 302.

The shift latch assembly 248 of the shift mechanism 244 includes shaft 336 mounted in an extension of the left side frame portion 48 of the key frame assembly 42, and extending parallel to the shaft 296 of the shift lock assembly 250. Rotatably mounted on this shaft 336 are two shift latches 338, 340. A spacer ring is provided on shaft 336 between these latches, and a grip ring 342 is arranged on the shaft adjacent to the shift latch 340, as best seen in FIGURE 27. The profiles of the shift latches 338, 340 are shown as being the same.

A pin 344 is mounted in each shift latch 338, 340 and tension springs 346 are anchored at one end to these pins and to the rear frame portion 46 at the other end thereof, as best seen in FIGURES 25, 27 and 28. Thus, these latches 338, 340 are continuously urged to pivot in a counterclockwise direction about the axis of shaft 336, as viewed in FIGURES 25, 28 and 29.

The lower portion of shift latch 338 is designed to be actuated by either the "i" or the "iI" shift key bars 58, and the lower portion of the shift latch 340 is designed to be actuated by either the "iI" or "I" shift key bars. The upper ends of these shift latches are designed to be individually locked behind the lugs 316, 324, respectively, of the shift locks 302, 304.

In their normal position, the shift levers 268, 270, 272, 274, the shift latches 338, 340, and the shift locks 302, 304 will be disposed in the positions thereof indicated in FIGURES 25–28. The "i," "iI" and "I" shift levers 268, 270 and 274, respectively, are arranged to actuate three valves 348, 350, 352 in the left end of positioning valve block, as shown in FIGURE 5, such valves being indicated in phantom lines in FIGURES 25, 27 and 28. Another valve 354 in the left end of positioning valve block 68 is arranged to be actuated by the rocker arm 280. The position of this valve is indicated in phantom in FIGURE 27. This valve will also be designated the "O" valve, and it is connected to the lifting cylinder inlet 188. The "i," "I" and "iI" valves 348, 350, 352, respectively, are connected, respectively, to the inlets 210, 212, 214 in the sliding piston block assembly 196. Thus, fluid under pressure will be delivered to the lifting cylinder assembly 186 and the cylinders 198, 200, 202 in the sliding piston block 196 for moving the sizing plate frame 74, as will be described. The construction of these valves, their arrangement in the fluid system, and their operative connections to the lifting cylinder block 186 and sliding piston block 196 will become apparent as the description proceeds.

The shift latches 338, 340, when actuated by their respective shift key bars, will actuate shift valves 356, 358 in the fluid system for delivering air to appropriate punches in the paper perforator tower 26, as will be explained in more detail hereinafter. These valves are shown in FIGURES 5, 25 and 28 above the valves 348, 350, 352, 354 in positioning valve block, and are mounted in a shift valve 960. Valves 356, 358 will also be designated the "i" shift valve and the "I" shift valve, respectively, for convenience.

The operation of the shift keys and shift mechanism to control the position of the sizing plate and shift the latter in the composing machine will now be described.

Considering first the "O" shift key 54, and referring to FIGURES 22, 23, 24, 26, 28 and 30, it will be observed that when this shift key is depressed, the "O" shift key bar 58 will be moved thereby to the rear. In this movement of the shift key bar, the pusher lug 266 thereon will pivot the "O" shift lever 272 in a counterclockwise direction, as viewed in FIGURE 28. This pivotal movement of the shift lever will cause the rocker arm 280 to undergo a similar pivotal movement to effect actuation of the "O" valve 354 in the positioning valve block. As indicated in FIGURE 27, this valve 354 will be actuated by the transverse part 290 of the rocker arm 280, whereby fluid under pressure will be delivered to the cylinder 184 in the lifting cylinder block 186 causing the piston 182 to be raised therein. The plunger 178 will be lifted by the piston to raise the rear end of the sizing plate frame 74 against the action of the springs 190. At this time, there will be no air pressure in the cylinders 198, 200 and 202 in the sliding piston block assembly 196, and hence, the springs 240 will operate through the shaft section 228 to dispose all of the piston plungers 222, 224 and 226 in their lowermost positions. The shaft 168 and levers 230, 232 thereon will be rotated by the springs 240 in returning the piston plungers 222, 224 and 226 to their lowermost positions (in the event any of these piston plungers had previously been actuated), to bring the sizing plate 72 to its forwardmost position, for example, as indicated in FIGURE 23. It will be noted that when the rear end of the sizing plate frame is lifted by the air pressure in the cylinder 184 in the lifting cylinder block acting through the piston and plunger therein, the rows of teeth 158 on the sizing plate frame will be lifted out of engagement with the rows of teeth 172 on the intermediate frame portion 47 of the key frame assembly so that the action of the springs 240 will operate to pull the sizing plate frame forwardly, as indicated in FIGURE 23, until the piston plungers 222, 224, 226 are seated in their respective pistons and in their lowermost position, at which time the rows of teeth 158 on the sizing plate frame will be above and in a position to engage the teeth in the rows of teeth 172, in a different position and be locked therein. In this new position, the pins 76 carried by the sizing plate 72 will be in position to be brought down into engagement with different ones of the plungers 106 carried by the sizing rockers 62, whereby the coupling relationship between the regular keys 52 and the sizing valve bars 66 will be varied.

Due to the fact that the "O" shift key bar 58 is of a shorter length than the other shift key bars, it will not strike the shift latch 340 when it is actuated by the "O" shift key. Thus, if either or both of the shift latches 338, 340 had previously been in locked engagement with the lugs 316, 324 on the shift locks 302, 304, these latches will be released since the rearward movement of the "O" shift key bar will cause the lug 264 thereon to pivot the "O" shift selection lever 308 in a clockwise direction, as viewed in FIGURE 28, whereby both of the shift locks 302, 304 will be also pivoted in a clockwise direction about the axis of shaft 296, and against the action of the springs 318, 326. The springs 346 will assure that the shift latches 338, 340 are brought to and held in the positions thereof indicated in FIGURES 27 and 28 when the "O" shift key bar is returned to its normal or retracted position. In this position of the latches 338, 340, the shift lock lugs 316, 324 are adapted to rest thereon, as indicated.

When the operator removes his finger from the "O" shift key, the torsional spring 282 in the shift lever assembly will return the rocker arm 280, the "O" shift lever 272 and the "O" shift key to their normal, unactuated positions. At this time, the springs 318, 326 will return the shift locks 302, 304 and the "O" shift selection lever 308 to their normal positions, as indicated in FIGURE 28. Also, the "O" valve 354 in the positioning valve block 68 will be automatically closed, and the fluid pressure in the lifting cylinder 184 will be vented whereby the springs 190 will bring the rear end of the sizing plate frame 74 down to its normal level wherein the rows of teeth 158 therein will be engaged to the rows of teeth 172 of the intermediate frame portion 47 of the key frame assembly, for example, in the position thereof indicated in FIGURE 23. During this downward movement of the rear end of the sizing plate frame, the pins 76 carried by the sizing plate 72 will be brought down into engagement with the plungers 106 of the sizing rockers 62 in a different order or arrangement to vary the coupling relation between the regular keys 52 and the sizing valve bars 66.

Considering now the "i" shift key 54, and referring to FIGURES 26, 27, 29 and 30, it will be observed that when this shift key is depressed, the "i" shift key bar 58 will be moved thereby to the rear. In this movement of the shift key bar, the pusher lug 254 thereon will pivot the "i" shift lever 268 in a counterclockwise direction, as viewed in FIGURE 29, and to the position shown in that figure. This pivotal movement of the shift lever causes the rocker arm 280 to undergo a similar pivotal movement to effect actuation of the "O" valve 354 in the positioning valve block, whereby fluid under pressure will be delivered to the cylinder in the lifting cylinder block 186 causing the piston to be raised therein. The plunger 178 will be lifted by the piston to raise the rear end of the sizing plate 72 against the action of the springs 190. As the "i" shift lever is pivoted by the "i" shift key bar, it will engage and actuate the "i" valve 348 in the positioning valve block whereby fluid under pressure will be delivered to the cylinder 198 in the sliding piston block 196 to elevate the piston therein and raise the plunger 222 engaged thereto. This positioning of the plungers 178 and 222 will be effective to lift the rows of teeth 158 on the sizing plate frame from the rows of teeth 172 and to move the rows of teeth 158 to a different position above the rows of teeth 172, for example, to the rear or left of the position thereof shown in FIGURE 23, whereby when the fluid under pressure is released from the cylinders 184, 198, the springs 190, 240 will draw the sizing plate down so that the rows of teeth 158 will be in engagement with the rows of teeth 172 in a different or shifted position, for example, one tooth to the rear or left as viewed in FIGURE 23.

When the "i" shift key bar is actuated or moved rearwardly, the lug 252 thereon will pivot the "i" shift selection lever 306 in a clockwise direction about the axis of shaft 296, as viewed in FIGURE 29, whereby the pin 322 and shift lock 304 will be elevated or pivoted about the axis of shaft 296 in a clockwise direction. This action will cause the shift latch 340 to be under the action of the spring 346 to be moved to and/or held in the position thereof shown in FIGURE 28. Thus, if this shift latch 340 had previously been locked against and to the right of the lug 324 on the shift lock 304, actuation of the "i" shift key bar will raise shift lock 304 and the lug 324 thereon to a sufficient height to release shift latch 340 from lug 324 and enable latch 340 to be pivoted by its spring 346 in a counterclockwise direction as viewed in FIGURE 28 and to the normal position thereof shown in this figure.

The rear end of the "i" shift key bar, when the latter is actuated, will pivot the shift latch 338 in a clockwise direction about the axis of shaft 336, as viewed in FIGURE 29, and against the action of its spring 346. This movement of the latch 338 will cause the curved upper surface thereof to ride under the lug 316 on the shift lock 302, whereby the straight upper surface of the shift latch 338 will be locked against the forward or right side of lug 316, as indicated in FIGURE 29. In other words, the curved upper surface of the shift latch 338 will engage the lug 316 and cause a slight pivoting of shift lock 302 in a clockwise direction, as viewed in FIGURE 29, until such curved surface rides off the lug 316, whereupon the spring 318 will return the shift lock 302 to the position thereof shown in FIGURE 29 wherein the straight upper surface of the shift latch 338 will be adapted to lock or latch against the lug 316, and the shift latch 338 will be held in this locked position until the "I" or "O" shift key is actuated. When the latch 338 is so pivoted by the actuation of the "i" shift key bar, the lower end of this latch 338 will actuate the "i" shift valve 356, and open this valve. This valve 356 will be connected to a perforating punch in the paper perforating tower 26, and other structure, as will become apparent as the description proceeds.

When the "i" shift key is released, the torsional spring 282 on the rocker arm 280 will return the "i" shift lever 268, the "i" shift key bar 58 and the "i" shift key to their normal positions. However, it will be noted that the shift latch 338 will remain in the latched or locked position thereof shown in FIGURE 29 by reason of being locked against the lug 316 of the shift lock 302. Thus, the "i" shift valve 356 will remain actuated or open, while the "i" valve 348 and the "O" valve 354 in the positioning valve block will be returned to their normal or closed positions wherein the fluid pressures in the cylinders 184, 198 of the lifting cylinder block and the sliding piston block will be vented, and the springs 190, 240 will bring the sizing plate frame down to seat and lock the rows of teeth 158 thereon in a different or shifted position in the rows of teeth 172, as stated.

Considering now the "I" shift key, and referring to FIGURES 25, 26, 27 and 30, it will be observed that when this shift key is depressed, the "I" shift key bar 58 will be moved thereby to the rear, whereby the "I" shift lever 274, the rocker arm 280, the shift latch 340 and the "I" shift selection lever 310 will be actuated by the lugs 260, 262 on this key bar, and also by the rear end thereof. The "I" shift lever 274 and rocker arm 280 will pivot in a counterclockwise direction, as viewed in FIGURE 25, whereby the "I" valve 352 and the "O" valve 354 in the positioning valve block 68 will be actuated by the lever 274 and arm 280, respectively, to deliver fluid under pressure, respectively, to the cylinder 200 in the sliding piston block 196 and to the cylinder 184 in the lifting cylinder block 186. Thus, the plungers 224 and 178 will be lifted and positioned by the movements of their pistons so that the sizing plate frame 74 will be raised to position the rows of teeth 158 thereon in a different location above the rows of teeth 172. In this connection, it will be noted that the length of piston 206 is shorter than the length of piston 204, whereby the plunger 224 will be moved to a higher position under the action of piston 206, than the plunger 222 under the action of piston 204, when the latter is actuated.

The shift selection lever 310 and the shift latch 340 will be pivoted in a clockwise direction about their respective shafts, as viewed in FIGURE 25, when the "I" shift key bar is actuated, whereby the shift selection lever 310 will cause the shift lock 302 to be pivoted in a clockwise direction about the axis of shaft 296 to permit the spring 346 on the shift latch 338 to assure that the shift latch 338 is in the unactuated or rest position thereof, wherein the "i" shift valve 356 is not actuated. It will be apparent that the pivotal movement of the shift lock 302 due to the actuation of the shift selection lever 310 will be sufficient to lift the shift lock lug 316 high enough so that if the shift latch 338 had previously been locked thereagainst (as by having been previously actuated by the "i" shift key bar), the latch 338 be released from the lug 316 and returned by means of spring 346 to its normal position, which corresponds to the relative angular position of shift latch 340 shown in FIGURE 28.

The actuation of the shift latch 340 by the "I" shift key bar will operate to dispose the upper end of this latch behind the lug 324 on the shift lock 304, in locked engagement thereto. The rearward movement of the lower end of this shift latch 340 will actuate the "I" shift valve 358.

When the operator releases his finger from the "I" shift key 54, the torsional spring 282 will return the rocker arm 280 and "I" shift lever 274 to their normal positions, and the shift lock 302 and "I" shift selection lever 310 will be returned to their normal positions by the spring 318 on the shift lock 302. (It will be noted that springs 318, 326 on shift locks 302, 304 will return the shift locks and shift selection levers to their normal positions shown in FIGURE 27 after either the "O" or "i" shift key is depressed and then released.) The shift latch 340 will now be locked in its actuated position by being engaged behind the shift lock lug 324. The "I" valve 350 and the "O" valve 354 in the positioning valve block 68 will thus be returned to their normal, closed positions wherein the fluid pressure in the cylinders 184, 200 will be relieved or vented, and the springs 190, 240 will then operate to bring the rows of teeth 158 on the sizing plate frame down into engagement with the rows of teeth 172 on the intermediate frame portion 47 of the key frame assembly in a different or shifted position, for example, two teeth to the left, as viewed in FIGURE 23.

Considering now the "iI" shift key, and referring to FIGURES 27 and 30, it will be observed that when this shift key is depressed, the "iI" shift key bar 58 will be moved thereby to the rear, actuating the "iI" shift lever 270, the rocker arm 280, both of the shift latches 338, 340. It will be noted that the angle piece 258 on the "iI" key bar will span both latches 338, 340 to actuate same. Actuation of the shift lever 270 and rocker arm 280 will operate to actuate or open the "iI" valve 350 and the "O" valve 354 in the positioning valve block 68 whereby fluid under pressure will be delivered to the delivered to the cylinder 184 of the lifting cylinder block and to the cylinder 202 in the sliding piston block. This will effect elevation of the piston plungers 178, 226 to lift the rows of teeth 158 on the sizing plate frame above the rows of teeth 172 and shift the sizing plate frame so that the rows of teeth thereon will be in a different or shifted position above the rows of teeth 172. When the "iI" shift key is released, the rocker arm 280 and lever 270 will be returned to their retracted positions whereby the "iI" valve 350 and the "O" valve 354 in the positioning valve block will be closed to vent the pressure in the cylinders 184, 202 and permit the springs 190, 240 to bring the rows of teeth 158 on the sizing plate frame down into engagement with the rows of teeth 172 in a different and shifted position, for example, the position shown in FIGURE 22. It will be noted that the piston 208 in the sliding piston block 196 is of a smaller height than the pistons 204, 206 therein whereby the plunger 226 and shaft section 228 will be lifted by piston 208 to a higher position, when actuated, than when the pistons 204 or 206 are actuated.

As indicated above, angle piece 258 at the rear end of the "iI" shift key bar engages the lower ends of both of the shift latches 338, 340 when the "iI" shift key is depressed, to cause these latches to be pivoted in a clockwise direction about shaft 336, as viewed in FIGURE 28, and to be locked against the shift lock lugs 316, 324. This movement of the shift latches 338, 340 will operate to open both the "i" shift valve 356 and the "I" shift valve 358, and these valves will remain in opened position so long as the shift latches 338, 340 are locked against the shift lock lugs 316, 324, as will be appreciated.

Suitable additional means may be provided for preventing any lateral movement of the sizing plate frame 74 during the shifting movements thereof under the control of the shift keys. For example, a depending lug 362 may be provided on the underside of the intermediate portion 136 of the sizing plate frame 74, and slidably mounted in a suitable channel 364 arranged on the intermediate frame portion 47 therebeneath.

The key frame assembly 42 is adapted to be removably mounted in the lower housing portion 34, and in a position wherein the positioning valve bars 64 and sizing valve bars 66 will be disposed to actuate valves in the positioning valve block 68 and sizing valve block 70, respectively. An inclined track or guide 366 is shown arranged along each side of the housing portion 34, on the inside thereof (see FIGURES 3 and 4) and the side frame portions 48, 50 of the key frame assembly 42 are slidably engaged on these guides. The front lower section 368 of the lower housing 34 is removably attached to permit convenient installation and removal of the key frame assembly 42. Any suitable means may be provided for detachably connecting the section 368 of the lower housing 34 to the sides thereof, such as screws 370. And, suitable means will be provided for detachably retaining the key frame assembly 42 in its operative position in the lower housing 34. For example, the lower end of each of the guides 366 may be provided with a stop surface 372 to engage against the front portion 44 of the key frame assembly 42, as best seen in FIGURE 3. This stop 372 may be in the form of a transverse bar extending between the guides or tracks 366. Set screws may also be screwed into the side frames 48, 50 of the key frame assembly, extending through the sides of the lower housing portion 34, and into suitable threaded holes in the side frame portions 48, 50 to retain the key frame assembly 42 in proper position.

Figure 4:
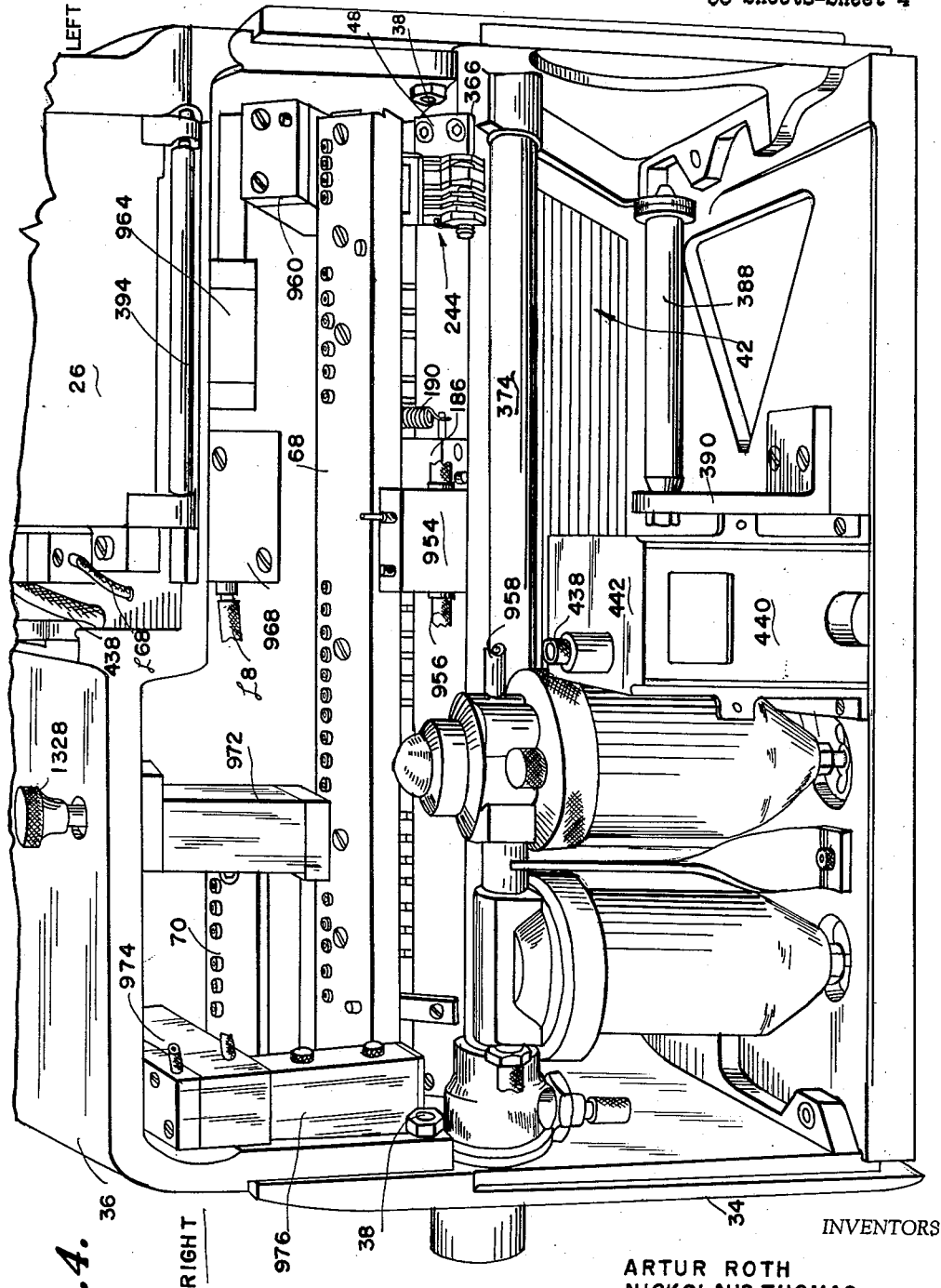
FIGURE 4 is a fragmentary and enlarged perspective view looking into the rear of the machine of FIGURE 1 and with the fluid conduits connecting various parts in the fluid system not shown, for purpose of clarity of illustration.

A transverse support bar 374 extends between the guides 366 adjacent the upper ends thereof, as best seen in FIGURES 3 and 4.

Figure 6:
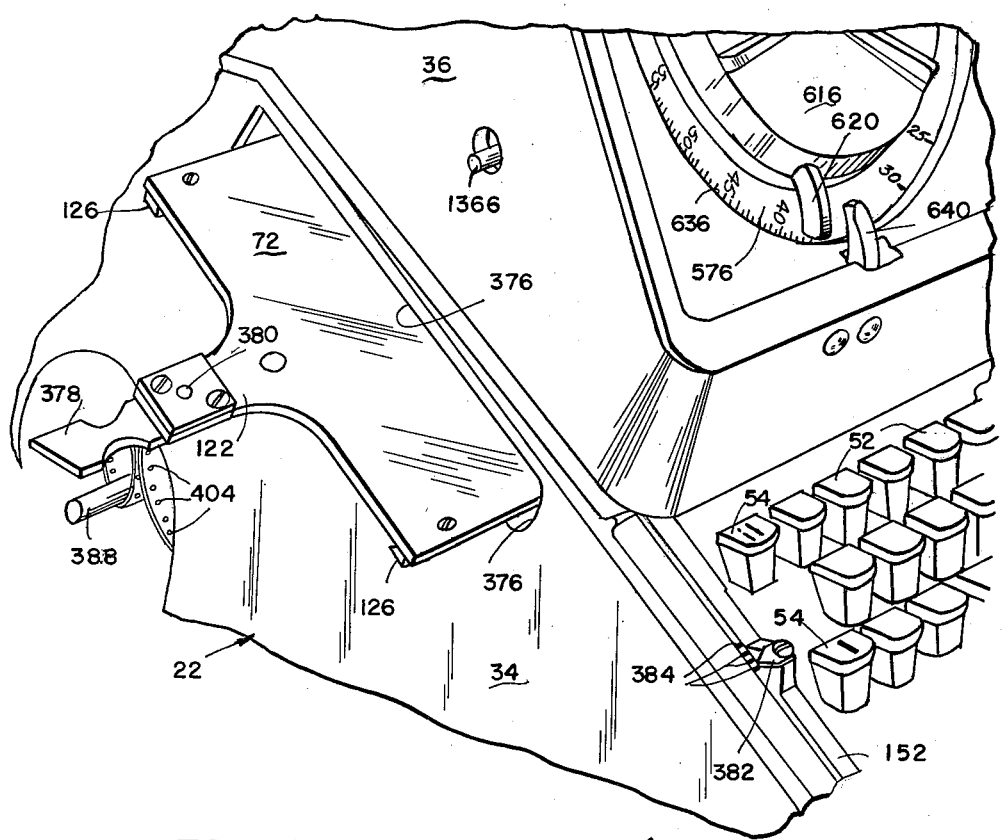
FIGURE 6 is a fragmentary and enlarged perspective view of a portion of the machine of FIGURE 1 and showing the sizing plate partially out of the machine.

Referring to FIGURE 6, an elongated slot or opening 376 is formed in the left side wall of the lower housing portion 34 to permit access to the sizing plate 72, in connection with installing and removing same. Thus, the sizing plate may be removed from its frame 74 in the composing machine or reinstalled therein by sliding the sizing plate through the opening 376, as indicated, for example, in FIGURE 6. A finger engageable member 378 is shown as being pivoted to the lug 122 on the sizing plate 72 by means of pin 380 to facilitate manipulation by the operator. In order to install or remove the sizing plate, one of the shift keys 54 may be depressed and kept depressed while the operator removes or installs the sizing plate from the composing machine. Depressing one of the shift keys and keeping it depressed will have the effect of lifting the pins 76 on the sizing plate out of engagement with the plungers 106 on the sizing rockers 62, as will be evident.

A pointer 382 is shown as being provided on the left side piece 152 of the sizing plate frame 74, and markings or indicia 384 may be provided, as shown in FIGURE 6, to indicate to the operator the quadrant for which the sizing plate is set. That is to say, the pointer 382 will be pointing to one of the four markings 384 and will thereby indicate the particular shifted position of the sizing plate and sizing plate frame, as effected by the last shift key depressed.

*Paper Feeding and Perforating Mechanisms*

The paper to be perforated and constitute the control tape, referred to above, is shown in FIGURES 3 and 4 as being mounted in the form of a supply roll 386 on a spindle or shaft 388 mounted on a bracket 390 carried by the lower housing section 34 adjacent the rear, left hand side thereof. The paper is unwound from this roll underneath a guide member 392 carried by rear of the lower housing 34, and the paper then enters into the paper perforating tower 26. As best seen in FIGURES 3, 4, 34, 35 and 36, the paper passes over a guide roller 394 at the rear of the tower 26 and then enters into an upwardly and forwardly inclined guide 396. The paper then passes over a circularly arcuately curved perforating die 398, and then to the take-up roll 400. The paper is formed with spaced, feeding perforations 402 along its outer edges, as shown in FIGURE 2. These perforations are designed to be engaged by projections 404 on the left and right hand feed wheels 406, 408, as will be understood. The paper will be progressively wound on the take-up spool or roll 400 during operation of the machine. Any suitable means, such as the strip 410 may be carried by the take-up spool 400 anchoring the end of the paper thereto. If desired, a tension roller (not shown) may be yieldably mounted in the paper tower to resiliently press down against the paper as it leaves the perforating die 398, on its way to the take-up roll 400.

The perforating die 398 is shown as being secured, as by screw 412 to a bracket 414 having rearward extensions 416 thereon secured respectively to the left 418 and right 420 stands, as shown. The die 398 is formed with a plurality of transversely spaced apertures 422 therein, disposed in a horizontal plane, and in alignment with the perforating punches, as will be referred to again hereinbelow. A cavity 424 is formed between the bracket 414 and the die 398, to the rear of these apertures 422, and this cavity is in communication with a T-shaped pipe section 426 for the removal of the chips of paper entering the cavity 424. An inlet 428 for fluid under pressure enters this T-section 426 and terminates in an outlet 430 disposed to direct fluid under pressure through the conduit 434 of the T-section, whereby a vacuum will be created in the stem conduit 436 and the cavity 424, as will be evident. The inlet 428 is shown as being suitably mounted in the left extension 416 of bracket 414, and in the left stand 418, and it communicates with a source of fluid under pressure, as will be described in more detail hereinbelow.

The conduit section 434 of the T-section 426 is shown as being mounted in the right extension 416 of the bracket 414 and extends through the right stand 420 for communication with a conduit or tube 438, leading to a receptacle 440 disposed at the rear of the lower housing section 34, as best seen in FIGURE 4, whereby paper chips will be conveyed to this receptacle 440 during operation, as will be evident. This receptacle may be mounted for convenient sliding removal from its housing 442.

The take-up spool 400 is shown removably mounted in the tower 26, as by being detachably engaged to shaft sections 444, 446 mounted respectively in the left 418 and right 420 stands. The shaft 444 is shown as being slidably mounted in a bearing 48, and a spring 450 may be provided for urging the inner end of the shaft section 444 inwardly toward the spool 400. Thus, the operator may move this shaft section outwardly against the action of the spring by pulling the knob 456 thereon. The inner end of this shaft section 444 and the adjacent end of the spool 400 may be of any suitable construction for providing a detachable engagement therebetween, as will be understood. The shaft section 446 is mounted in a bearing 458 carried by the right stand 420, and the inner end of this shaft section and the adjacent portion of the spool 400 will be suitably constructed to be detachably, drivingly engaged to each other. For example, the shaft section 446 may include a plurality of pins 460 arranged on a disc 462 and designed to be disposed in holes or recesses in the end of the spool 400, as best seen in FIGURE 34. The inner end of the shaft section 444 and the opposite end of the spool 400 may be similarly constructed. The shaft sections 444, 446 are shown as extending through the paper tower sides 464, 466 with the knobs 456, 468 thereon being disposed externally.

A pulley 470 is journalled on or rotatably connected to the shaft section 446, and a one-way clutch spring 472 is loosely coiled around this shaft section with one end of this spring being connected to the pulley 470, and the other end thereof being free. A grip ring 474 is arranged on the shaft section 446 between the spring 472 and the right side 466 of the tower 26.

The right 408 and left 406 paper feed wheels are shown as being drivingly connected to a shaft 476 extending through bearings 478, 480 in the left 418 and right 420 stands, and also extending through the left 464 and right 466 sides of the paper tower, with knobs 482, 484 being attached to the ends thereof, externally of the tower. This shaft 476 also extends through holes in the extensions 416 of the bracket 414, as shown.

A ratchet wheel 486 is drivingly connected to the shaft 476, between the right stand 420 and the right tower side 466, and a pulley 488 is also drivingly connected to the shaft 476 adjacent the ratchet wheel, as shown in FIGURES 34 and 36. A suitable resilient belt 490 is trained around the pulleys 470, 488 for establishing a resilient driving connection therebetween. This belt 490 may be made of an elastic material, such as rubber, or it may be in the form of an endless length of small coiled spring, such as is used in movie film projectors, as will be understood, whereby as the thickness of the paper being wound on the take-up spool 400 increases, there will be no danger of the paper being wound on the spool faster than it is being delivered thereto.

A stop roller 492 is shown in FIGURE 36 as being carried by a lever 494 pivotally mounted at its right hand end to the right stand 420, as by the screw or pin 496, and continuously urged upwardly at the other end thereof, as by the tension spring 498 connected at its upper end to a spring post 500 on the stand 420, and at its lower end to the left end of lever 494, as shown. Thus, the roller 492 will be yieldably disposed between adjacent teeth in the ratchet wheel 486, as shown. This roller 492 preferably is journalled on a pin 502 carried by the lever 494 whereby the teeth of the ratchet wheel 486 may successively pass thereover, and the roller will operate to releasably hold the ratchet wheel in position between the intermittent feeding movements thereof, as will be apparent.

A ratchet wheel locking pin 502 is shown in FIGURE 36 as being fixed to a shaft 504 journalled in the left 418 and right 420 stands (see FIGURE 34) and a extending through the right side frame 466. A knob 506 is secured to the outer end of this shaft externally of the tower whereby the pin 502 may be moved into engagement with one of the teeth on the ratchet wheel 486, or moved downwardly out of engagement with the teeth, as will be apparent. A leaf spring 508 is mounted in the tower 26 and is designed to releasably hold the pin 502 in either of these two positions. In this connection, it will be noted that the left or forward end of the pin 502, as seen in FIGURE 36, includes a beveled surface 510 against which the spring 508 will abut when the pin 502 is in engagement with a tooth of the ratchet wheel 486 to releasably hold the pin in this position, and when the pin is moved downwardly out of engagement with the ratchet wheel, the spring 508 will act on the pin to hold it in this position, as should be evident. This latter position is the position the pin 502 will be in during normal composing operations.

The structure for intermittently feeding the paper across the paper perforating die 398 and onto the take-up spool 400 is so designed that the paper will not be fed until a predetermined delay period has elapsed after a punching or perforating operation, assuring that the active or actuated punches have been fully and completely retracted from the apertures 422 in the paper perforating die 398, whereby there will be no danger of the paper being fed across the die while an active punch or punches remains or remain in any of the apertures 422. Hence, there is no possibility that the paper will be torn by being fed while punches are still in their die apertures. This structure includes a feed cylinder block 512, a plunger 514 reciprocably mounted therein, a pawl lever 516, and a ratchet pawl 518. The lower end of the plunger 514 is loosely mounted in a socket 520 in a piston 522, the latter being reciprocable in the cylinder 524. An inlet 526 communicates with the bottom of the cylinder 524 for delivering fluid under pressure thereto. Adjustable stops 528, 530 are carried in axially spaced position on the plunger 514, on opposite sides of a bracket 532. These stops 528, 530 may be in the form of washers and nuts, as shown, and the bracket 532 is secured to the right stand 420, extending outwardly thereof, and terminating in a U-shaped free end straddling the plunger 514, as indicated. The feed cylinder block 512 is shown as being secured in stationary position to the right stand 420.

The pawl lever 516 is journalled or rotatably mounted on the shaft 476, extending radially outwardly therefrom. The upper end of the plunger 514 is pivoted to this lever 516 inwardly of the outer or free end of the lever, and the ratchet pawl 518 is pivoted by pin 534 adjacent the end of this lever 516, as shown. A stop in the form of a screw 536 is provided for the ratchet pawl 518. This screw 536 is shown as being threadedly connected to a bracket 538 secured to the right stand 420, and a tension spring 540 is connected to the pawl 518, and to stationary structure on the bracket 538, as shown in FIGURE 36. A tension spring 542 is anchored at one end to the feed cylinder block 512, and at the other end thereof to the outer end of the lever 516 whereby, when there is no fluid pressure in the cylinder 524, the spring 542 will operate to draw the lever 516 down until the plunger 514 and piston 522 reach their lowermost position. In this position, the screw stop 536 will be engaged to the ratchet pawl 518, and the ratchet pawl will be in the position thereof shown in FIGURE 36 with the spring 540 in an extended and tensioned condition. When fluid under pressure enters the bottom of cylinder 524 through inlet 526, the piston 522 and plunger 514 will be moved upwardly to rotate the lever 516 in a counterclockwise direction about shaft 476, as viewed in FIGURE 36, and against the action of spring 542. During this movement of the lever 516, the pin 534 thereon pivoting the ratchet pawl 518 thereto will move or carry the tooth 544 of the pawl 518 in a counterclockwise direction around the ratchet wheel 486 until this tooth 544 enters into a space between adjacent teeth on the ratchet wheel 486. In other words, as the lever 516 is so moved by the actuated plunger 514, the pivot pin 534 for the pawl 518 will be moved away from the screw stop 536 whereby the tension spring 540 will operate to firmly engage and hold the pawl tooth 544 in a space between adjacent teeth on the ratchet wheel 486. When the fluid pressure in cylinder 524 is released or vented, the tension spring 542 which had been extended during the actuation of the piston 522, plunger 514 and lever 516 will operate to return these parts to the normal positions thereof shown in FIGURE 36. During this return movement, the tooth 544 on the pawl 518 will operate to drive or rotate the ratchet wheel 486 a predetermined amount, for example, an amount equal to the pitch length of the teeth thereon, and in a clockwise direction as viewed in FIGURE 36. The pawl tooth 544 will be in engagement with the ratchet wheel 486 long enough to effect this movement, after which the pawl 518 will be brought back into engagement with the adjustable screw stop 536, and further downward movement of the plunger 514 and lever 516 will cause the pawl tooth 544 to be moved away from the ratchet wheel 486 and to the position thereof shown in FIGURE 36. The stop roller 492 will hold the ratchet wheel 486 in this new position, while permitting it to be periodically rotated by the pawl tooth 544 in the manner described.

This intermittent feeding or rotating movement of the ratchet wheel 486 will produce corresponding intermittent rotation of the shaft 476 to which it is drivingly connected, the paper feed wheels 406, 408, and the pulley 488. The projections 404 on the wheels 406, 408 will thus be moved to intermittently feed the paper across the perforating die 398, and the rotation of the pulley 488 will produce rotation of the pulley 470 through the resilient driving belt 490. As previously stated, the pulley 470 is journalled on the shaft section 446, and the winding or coiling of the clutch spring 472 is such that it will be compressed or coiled into driving engagement with the shaft 446 when the pulley 470 is so rotated by belt 490 in a clockwise direction, as viewed in FIGURE 36. As stated, the ratchet wheel 486 and pulley 488 are both intermittently rotated in clockwise direction, as viewed in FIGURE 36, by the pawl tooth 544 whereby the pulley 470 is intermittently rotated through the pulley 488 and belt 490 to compress the clutch spring 472 and thereby effect intermittent rotation of the take-up spool 400.

Considering now the paper perforating mechanism, and referring to FIGURES 2, 3 and 34–39, it will be observed that a plurality of punches 546 are arranged in horizontally and transversely spaced position, in a horizontal plane, in a block 548, the latter being suitably mounted in stationary position in the tower 26. These punches 546 will be in direct alignment with the apertures 422 of the paper perforating die 398, and will normally be disposed in a retracted position spaced outwardly or forwardly of these apertures 422.

The punches 546 are reciprocably mounted in front 550 and rear 552 plates, the latter being secured to the rear of the block 548, and the former being shown as an angle bracket secured to the block 548 forwardly of the plate 552. The punches 546 are shown as being of identical configuration including two portions 554, 556 of different diameter, whereby an intermediate radial shoulder 560 is provided. A compression spring 558 is arranged in encircling relation on each of the punch portions 556 abutting at one end against the shoulder 560 and at the other end against the rear plate 552. The free end of punch portions 556 may be suitably shaped, as shown, for forming the holes in the paper. The free or forward end of each of the punch portions 554 is engaged by a piston 562 mounted in a cylinder 564 in the block 548. The axes of these cylinders and pistons are disposed in staggered relationship in two vertically spaced horizontal rows, one above, and one below the row of punches 546, as best seen in FIGURE 39. The upper row of pistons 562 engage every other punch 546, and the axes of these pistons are shown in vertically spaced and parallel relation to the axes of the respective punches which they engage. It will be noted that each piston 562 in the upper row of pistons only engages a single punch 546, and the punch is engaged only by the lower portion of the piston. In the lower row of pistons 562, each piston likewise engages only one punch 546, and the axes of the pistons in the lower row are also in vertically spaced and parallel relation to the axes of the respective punches engaged by these pistons. The pistons 562 in the lower row are also in engagement with every other punch, with only the upper portion of these pistons being in engagement with the punches and with the axes of these lower pistons being offset or in staggered relation to the axes of the upper pistons.

The pistons 562 are shown as being of a somewhat greater length than the length of the cylinders 564 in which they are slidably mounted, and the compression springs 558 on each of the punches operate to continuously urge and normally maintain the punches 546 and the pistons 562 to and in the retracted positions thereof shown in FIGURE 37.

A cover 566 is secured to the front end of the block 548, and a plurality of fluid passageways 568 are provided in this cover 566, as best seen in FIGURE 37. Each of these passageways 568 communicates at its upper end with the forward end of one of the cylinders 564, as indicated, and the lower ends of these passageways are in communication with a source of fluid under pressure through valves which will be actuated when the keys are depressed, as will be explained in more detail hereinbelow. Flexible tubings may be utilized in connecting these passageways 568 in the fluid system. A very advantageous method and structure for coupling such tubing in a fluid-tight joint in the passageways 568 and in other parts of the fluid system are disclosed in the copending application Serial No. 789,402, the disclosure of which is hereby incorporated herein for that purpose.

As will be appreciated, when fluid under pressure is delivered through the passageways 568 to the cylinders 564, the pistons 562 in such cylinders will be actuated or driven rearwardly to drive the punches 546 engaged thereto through the paper and into the corresponding apertures 422 in the perforating die 398. When the pressure in the activated passageways 568 and cylinders 564 is relieved or vented, the springs 558 will drive the active punches and pistons forwardly to their retracted or normal positions. Pads 570, 572 are shown as being provided, extending across the guide plate 550 and in position to be struck by the upper and lower rows of pistons 526 when the latter are actuated. These pads may be made of rubber or other suitable shock absorbing material.

A signal index plate 574 is shown in FIGURES 34 and 37 as being provided above the portions 556 of the punches 546, adjacent the rear of the perforating block 548. This index plate 574 may be provided with letters and/or numbers in alignment with the punches 546 to identify the respective punches.

*Line Measuring and Justifying Mechanisms*

As in the composing machines disclosed in the prior patents and publications referred to above, the composing machine 20 of the present invention is equipped with a line measuring means and justification mechanism including an Em scale 576, a units wheel 578, a unit rack 580, a stop bar assembly 582, a justification scale 584, a justification scale pointer 586, and a main power or driving cylinder 588. However, the present invention contemplates novel structures in this part of the composing machine, as will be apparent as the description proceeds.

The main air cylinder 588, as best seen in FIGURES 5, 40, 41 and 42 is of elongated form, and is secured to the right and left sides of the upper housing section 36. Inlets 590, 592 open into each end of this cylinder, and a rack 594 is mounted for sliding, reciprocating movement therein. A piston head 596 is carried by the rack 594, at either end thereof, and a fluid sealing ring is mounted on these heads 596 in sealing engagement with the cylinder, as shown. The inlet 590 will be in communication with a source of fluid under pressure during normal operation of the machine, while the inlet 592 will only be in communication with the fluid pressure source during restoring operations, and tubings or conduits will connect these inlets with the fluid pressure source, as will become apparent. Thus, the rack 594 will be continuously urged to the right, as viewed in FIGURE 41, during normal composing operations, and it will be returned to the left during restoring. A forwardly extending bracket 598 is secured to the cylinder 588 adjacent the center thereof, and a gear means 600 is journalled on a shaft 602 in this bracket below the air cylinder 588. Gear means 600 includes a first gear section 604 in meshing engagement with the rack 594 through an opening in the bottom of the air cylinder, as shown in FIGURES 41 and 42. Gear means 600 is shown as having a second and larger gear 606 thereon, and a toothed pulley belt 608 is trained around this gear 606, and also around a gear 610, as shown in FIGURES 3 and 5. As best seen in FIGURES 3 and 46, gear 610 is drivingly secured to a shaft 612 mounted in a bracket member 614 secured in stationary position in the upper housing section 36 and extending rearwardly therefrom.

The Em scale 576 is shown as being circular having spaced teeth along its periphery, and scale markings extending radially inwardly from the periphery, as indicated in FIGURES 1 and 6. The Em scale 576 is drivingly connected to shaft 612, and a clutch disc 616 is rotatably mounted over a cup-shaped portion of the Em scale, as best seen in FIG. 46. This clutch disc 616 is also shown as being of somewhat cup-shaped configuration including radially extending finger engageable portions 618, and a radially projecting lug 620. A tubing 622 made of a soft, flexible material, such as rubber or plastic, is interposed between the opposed cylindrical faces of the cup-shaped portions of the disc 616 and the Em scale 576, being sealed at one end 624 in the Em scale 576, and opening at the other end into an inlet construction 626 also formed in the Em scale, as best seen in FIGURE 47. A tubing or conduit 628 also made of a soft, flexible material, such as rubber or plastic, is shown as being connected in a fluid-tight joint 630 to this inlet construction 626, and this tubing communicates with a source of fluid under pressure for introducing pressurized fluid into the tubing 622 to effect a driving connection between the disc 616 and the Em scale 576, as will become apparent. The joint 630 between the tubing 628 and the inlet construction 626 may be of the type disclosed in the copending application Serial No. 789,402 referred to above.

Any suitable construction may be employed for mounting the clutch disc 616 in the position shown. For example, as best seen in FIGURE 46, a flanged bushing 632 may be connected to the forward end of the shaft 612, as by screw 634, and the hub portion of the disc 616 journalled on this bushing, as shown. Thus, with no fluid pressure in the tubing 622, the clutch disc 616 may be rotated relative to the Em scale 576 and shaft 612.

A circular opening 636 is provided in the inclined forward portion of the upper housing section 36 for exposing the Em scale 576 and providing access to the clutch disc 616, as best seen in FIGURES 1 and 6. An Em scale pointer 638 is provided on the housing section 36, approximately along the horizontal center line of the opening 636, and to the right, to indicate the position of the Em scale. A lug or detent 640 is pivotally connected at its lower end to the inside of the upper housing section 36 below the opening 636, as by the pivot pin or screw 642 (see FIGURES 3 and 6), and spring means and a stop are provided for yieldably but firmly holding this detent 640 in the position thereof shown in FIGURES 1, 2, 3 and 6. As shown, the spring means may be in the form of a tension coil spring 644 connected at one end to the detent 640 adjacent the upper end thereof, and connected at the other end thereof to a pin or post 646 mounted in stationary position on the inside of the housing section 36 adjacent to the detent 640, as best seen in FIGURES 2 and 3. The spring 644 will operate to yieldably but firmly retain the detent 640 against the stop 646. As will be apparent as the description proceeds, the detent 640 will provide a means for initially setting the Em scale 576 and clutch disc 616, and will also operate during operation of the composing machine to enable the Em scale 576 to be restored to the proper and desired position thereof, after a line has been composed. During restoring, the disc 616 and Em scale 576 will be rotated in a counterclockwise direction as viewed in FIGURE 1, and the lug 620 on the clutch disc 616 will strike against the detent 640 to complete the restoring of the Em scale. The yieldable mounting of this detent 640 will absorb any shocks, impacts or jars when it is struck by the lug 620 during restoring.

An arm 648 is shown as being attached to the Em scale shaft 612, rearwardly of the gear 610 thereon, and is rotatable with this shaft and gear. This arm 648 projects radially from the gear 610, and may be suitably secured thereto, as shown. The outer end of arm 648 is formed with a cam portion 650 for actuating a valve that will later be described as a 4 Em valve. The angular position of the valve actuating arm 648 and the position of this 4 Em valve will be arranged so that this valve will be actuated when there are approximately 4 Ems remaining in the line being composed, as will be explained in more detail hereinafter.

The teeth of the Em scale 576 are shown as being in driving engagement with a pinion 652 formed on the units wheel 578, as seen in FIGURES 43, 44. The units wheel 578 is mounted on a shaft 654 extending through stationary spaced supporting arms 656, 658 of the unit wheel stand 660, as shown in FIGURE 49. A screw 662 is threaded into the forward end of the shaft 654, and a nut 664 is screwed onto the threaded opposite or rear end of the shaft, against a collar 666. Bearings 668, 670 are provided in the arms 656, 658 respectively, and are journalled to the hub portion of the units wheel 578 and to the shaft 654, respectively, as shown. A units wheel leader in the form of a lug 672 is drivingly connected to the hub portion of the units wheel 578. As shown, the unit leader 672 extends radially from a hub 674 arranged on the shaft 654 and drivingly engaged to the hub portion of the units wheel 578, as by a tongue and groove connection, as seen in FIGURE 49. To the rear of the unit leader 672, a follower helical gear 676 is journalled on the shaft 654 as by the bearing arrangement shown, and a spacer collar 678 is arranged on the shaft 654 extending between this gear and the rear arm 656 of the unit wheel stand. A smaller helical gear 680 is arranged in driving arrangement with the follower gear 676, as seen in FIGURE 48. This gear 680 is drivingly connected to a shaft 682 which is in turn drivingly connected to the justification scale 584. As shown, the justification scale is of circularly cylindrical shape suitably drivingly connected to the shaft 682, and this shaft 682 may be suitably held in position as by being journalled in stationary bracket 684 and stand 660, as shown in FIGURES 48 and 49.

A follower pin 686 is shown in FIGURE 49 as being slidably mounted in an axially extending eccentric bore in the following gear 676. This pin is carried on a reciprocably mounted pin guide 688. The pin guide 688 is provided with an aperture encircling and of larger diameter than the collar 678, and a circularly arcuate peripheral flange 690 is formed on this guide adapted to be engaged in a transverse slot formed adjacent the rear end of pin 686 whereby this pin may be carried by the gear 676 around this flange 690. A piston rod 692 is attached at its forward end to the pin guide 690 and extends rearwardly therefrom into a cylinder 694 formed in a piston block 696. A compression spring 698 encircles the piston rod 692 in the cylinder and continuously urges this piston to move in a rearward direction, so that the pin guide 688 and piston rod 692 are normally disposed in the position thereof shown in solid lines in FIGURE 49. The spring 698 abuts against the piston head 700 of the rod 692 and also against a shoulder formed in the cylinder 694, as shown. An inlet plug 702 is shown as being threaded to the rear end of the piston block 696 and is adapted to be connected through the 4 Em valve to a source of fluid under pressure, as by flexible tubing or the like, for the introduction of pressurized fluid into the cylinder 694 to drive the piston rod 692, the pin guide 688 and the pin 686 forwardly against the action of spring 698.

A follower pin stop 704 is connected to the pin guide 688, as best seen in FIGURE 48, and provides a stop for the pin 686 during restoring operations of the machine, as will be evident as the description proceeds.

The pin 686 will normally be retracted, and in the position thereof shown in FIGURES 48, 49 during normal operation of the machine, and at approximately 4 Ems from the end of the line being composed, the 4 Em valve will be opened by actuator 648 whereby fluid under pressure will enter cylinder 694 through inlet 702 to move the rod 692 and pin 868 forwardly. The angular position of the leader 672 at this time will be such that when the pin 686 is so actuated and moved forwardly, the leader 672 will be on the right hand side of the pin 686, as viewed in FIGURE 48, and in a position to lead the pin in its counterclockwise rotating movement around the pin guide 688, as viewed in FIGURE 48, whereby the gear 676 and pin 686 can rotate in this counterclockwise direction only if the leader 672 rotates counterclockwise ahead of pin 686. In other words, the leader 672 will operate as a movable or leading stop against which the pin 686 will abut when the latter is actuated or moved forwardly and the gear 676 is driven or tends to be driven in a counterclockwise direction as viewed in FIGURE 48. This gear 676 will be so driven by the justification scale shaft 682 through the gear 680 only about 4 Ems from the end of the Em scale setting (i.e., 4 Ems from zero position on the Em scale) to the end of the line being composed, as will become apparent. A vertical driving rack 706 is drivingly engaged to a toothed or splined portion 708 on the justifying scale shaft 682. Rack 706 also functions as a piston rod slidably mounted in a cylinder 710 formed in a block 712 secured to bracket 684, as best seen in FIGURES 48-50. An inlet 714 is formed in this block 712 for the introduction of fluid under pressure into cylinder 710 to elevate the rack 706 and rotate the justification scale shaft 682, gear 680, gear 676, and pin 686. As will become apparent, the inlet 714 is connected to a source of fluid under pressure through the 4 Em valve, so as to receive pressurized fluid only from about 4 Ems from the end of the Em scale setting (or zero position thereof) to the end of the line being composed.

A restoring tension spring 716 is anchored at one end to a post 718 carried at the upper end of the rack 706, and at the other end thereof this spring is anchored to a stationary post 720 mounted on the bracket 684 beneath the block 712, as indicated in FIGURE 49.

Thus, when there is no pressurized fluid in the cylinder 710, the spring 716 will be effective to return the rack 706 downwardly to its normal or rest position, as shown in FIGURE 50, wherein the justification scale shaft 682 will be rotated so that the gear 680 thereon will rotate the follower gear 676 in a clockwise direction as viewed in FIGURE 48 to return the pin 686 therein to its normal position adjacent the stop 704, as shown in FIGURE 48. At restoring, the pin 686 will also be retracted to the full line position thereof shown in FIGURE 49 by the action of the spring 698. In other words, during restoring, there will be no fluid pressure in the cylinders 694 and 710 whereby the spring 698 will move rod 692 rearwardly and spring 716 will move rack 706 downwardly to restore the pin 686 to the position thereof shown in FIGURES 48, 49 and to restore the justification scale 584 to its zero or start position. Thus, during restoring the 4 Em valve will close and permit the cylinders 694 and 710 to be vented, as will become apparent.

A vernier 724 is arranged in stationary position above the units wheel 578, as shown in FIGURES 1, 2, 43, 44, and the units wheel is shown with scale markings thereon adapted to be moved into registry with the vernier 724. An opening or slot 726 is formed in the upper housing section 36 to permit the vernier to be read, as best seen in FIGURES 1 and 2.

The justification scale cylinder 584 will be provided with rows and columns of numbers, in the usual manner, and the upper housing section 36 includes a circularly cylindrically curved projection 728 designed to receive the justification scale cylinder. This projection 728 is provided with an elongated slot 730 therein exposing the markings or numbers in the rows on the justification scale. In an exemplary embodiment of the invention, the justification scale is designed to provide for up to thirty justification spaces in each line being composed. As indicated, the justifying scale will be coaxially drivingly connected to the justification scale shaft 682 in any appropriate manner.

Referring now to the units rack 580, this rack is slidably mounted on a rack carrier 732 pivotally mounted at its left end on a stationary pin 734 or the like, and free at the other end thereof, as best seen in FIGURES 43, 58. A tension spring 736 continuously urges the rack 580 to the left, and against a stop 738 mounted on the carrier 732. The rack 580 and carrier 732 are shown as being provided with a cooperating rail 740 and groove 742 arrangement to guide the rack in straight line reciprocating movements relative to the carrier. In their normal or unactuated condition, the unit rack carrier 732 and unit rack 580 will be disposed as indicated in FIGURE 58 wherein the rack 580 is below and out of contact with the teeth on the units wheel 578.

A unit escapement lever 744 is pivoted between the ends thereof by a pin 745 to a projection 746 on a unit rack guide 748 secured to the unit rack carrier 732, as shown. The left end of this lever 744 is designed to be actuated or moved upwardly by a piston 750 slidably mounted in a cylinder in a stationary block 752, as best seen in FIGURE 43, and an arcuate or curved leaf spring 754 is shown as being provided for urging the left end of the lever 744 downwardly. This spring 754 will be suitably anchored at its upper end in stationary position, and connected to the lever 744 at the other end thereof, with a stationary guide 755 therefor, as indicated. A stop is provided for limiting the upward movement of the left hand end of lever 744 under the action of the piston 750. This stop is shown as being in the form of the head of a screw 756 arranged to be adjusted vertically, by being screwed up or down, with a nut 758 being provided for locking it in its adjusted position, as shown. The piston 750 will be actuated by the striking of keys in the keyboard to move the left hand end of the lever 744 upwardly against the head of the screw 756.

Referring to FIGURES 43 and 44, the right hand end of lever 744 is connected to a locking or holding pawl 760 for the units wheel 578 through a linkage member 762. The locking pawl 760 is shown as being in the general form of a bell crank lever pivotally carried by a stationary pivot pin 764. The linkage member 762 is pivotally connected at either end thereof to the locking pawl 760 and to the right hand end of lever 744, as indicated. The teeth 766 on the locking pawl 760 are normally in engagement with the teeth of the units wheel 578, and this will operate to prevent movement of the units wheel 578 and Em scale 576 under the action of the constant fluid pressure in the driving cylinder 588 acting on the rack 594 therein. Structure is provided whereby the pawl 760 is continuously urged to this position, and normally held therein.

The structure for holding the locking pawl 760 in engagement with the units wheel includes a tension spring 782. This spring is anchored at one end to the vernier 724, and at the other end to the pin 784 pivoting the pawl 760 to the link 762.

Thus, it will be seen that the normal or rest positions of the lever 744, units rack 580 and locking pawl 760 will be those shown in FIGURES 43, 44 and 58.

A kick bar 768 and kick bar bracket 770 are provided for absorbing kinetic energy from opening movements of the locking pawl 760 to prevent overtravel of the locking pawl during normal operations. The kick bar 768 is provided with a somewhat elongated slot at its lower end and a stationary pin 772 extends through this slot for sliding movement of the kick bar, as will be permitted by this pin and slot arrangement, as will be apparent. A pin 774 is shown as being provided at the upper end of the kick bar 768, and this pin extends rearwardly to a position normally just above and out of engagement with the upper arcuate surface of the locking pawl 760, above teeth 766. The kick bar bracket 770 is pivoted at one end to a stationary pivot pin 776, with the other end thereof being slidably engaged to the kick bar 768. A tension spring 778 extends from the pin 774 to the kick bar bracket 770, as shown, whereby the kick bar 768 will be continuously urged downwardly to the position thereof shown in FIGURE 43. A shoulder 780 is shown on bracket 770 adjacent the kick bar 768 whereby these parts will normally be in the positions thereof shown in FIGURES 43, 44.

Thus, when the locking pawl 760 is opened, in normal line composing operations, it will contact or strike pin 774 of the kick bar 768, for energy absorption and for preventing overtravel as stated.

A justification scale pointer shaft 786 is shown as being slidably mounted above the Em scale 576 and units wheel 578 for horizontal reciprocation. The curved justification scale pointer 586 is carried on the right hand end of this shaft 786 and extends downwardly to the opening 730 in the housing projection 728. This pointer may be of any suitable construction so as to give the desired reading off the justification scale, as the pointer is moved thereacross. For example, it may be formed of a clear plastic and covered with a dark coating in the areas indicated to give the proper readings from the justification scale.

The shaft 786 is shown as being slidably supported in bearings 790, 792, and spring means are provided for continuously urging this shaft to the left. As shown, this spring 794 is in the form of flat, strip metal, coiled around a circular support 795 and suitably connected at one end to the left hand end of the shaft 786. Means are provided for intermittently moving the shaft 786 in step-by-step fashion to the right, so as to move the pointer 586 a predetermined distance across the justification scale 584 every time a justification space is indicated in the line being composed. This means is shown as including an actuating pawl 796 and a retaining or holding pawl 798. The retaining pawl 798 is mounted to the rear of the actuating pawl 796, as indicated in FIGURE 44, and is suitably pivotally mounted, with a tension spring 802 being provided for continuously urging the tooth 804 on this pawl upwardly into engagement between teeth on a ratchet section 806 on the justification scale pointer shaft 786. Thus, the pawl 798 will be continuously urged to pivot in a counterclockwise direction about its pivot point, as viewed in FIGURES 43, 44. It will be noted that the construction of this pawl 798 and the ratchet 806 is such that the shaft 786 may be moved to the right wherein the teeth on the ratchet will ride over the spring urged pawl 798, but the shaft 786 cannot be moved to the left so long as the pawl 798 is in engagement with the ratchet 806.

The actuating pawl 796 is pivoted at 800 to the upper end of an arm 808 which in turn is pivotally connected to a stationary support 810. Tension springs 812, 814 are engaged to the pawl 796 and to stationary anchoring posts, as shown, for urging the pawl 796 to pivot in a counterclockwise direction, as viewed in FIGURES 43, 44 about its pivotal connection at 800 to the arm 808 and into engagement with the ratchet 806 on the shaft 786. The lower end of arm 808 engages a piston 816 slidably arranged in a cylinder in a stationary piston block 819. Actuation of the piston 816 by the introduction of fluid under pressure into its cylinder will move the arm 808 in a clockwise direction about its pivot point 818 in the stationary support 810 whereby the actuating pawl 796 will be moved to the right, against the action of springs 812, 814, to drive the shaft 786 and pointer 586 a predetermined distance, corresponding to a justification space on the justification scale 584. Piston 816 will be actuated when a justification space is indicated during operation of the composing machine. When the pressure behind the piston 816 is relieved or vented, the tension springs 812, 814 will return the actuating pawl 796 and the arm 808 to the positions thereof shown in FIGURE 43. The retaining or holding pawl 798 will permit this step-by-step movement of the shaft 786 and pointer 586 to the right under the action of the pawl 796 and piston 816, and will hold the shaft 786 in each new position as the latter is intermittently actuated by the pawl 796, as will be evident.

A trip pin 820 is slidably mounted in a stationary guide 822, and extends therebelow to a point above the upper end of the locking pawl 760. In normal operation of the composing machine, when the locking pawl 760 is released from the units wheel 578, it will not rise sufficiently to move the pawl trip 820 against the left or rear ends of the pawls 796, 798. However, during a restoring function, the locking pawl 760 will be raised from the units wheel 578 to a sufficient height to move the pawl trip 820 upwardly against the left hand ends of the pawls 796, 798 to release the teeth of these pawls from engagement with the ratchet 806 on shaft 786 whereby the spring 794, which had been extended and partially uncoiled or unwound as the shaft 786 was moved to the right, will return the shaft 786 to the left to its starting or rest position, as shown in FIGURE 43. When the locking pawl 760 is thereafter returned to locking engagement with the units wheel 578, the springs 802, 812, 814 will bring the pawls 796, 798 back into engagement with the ratchet 806 and return the pawl trip 820 to its inactive or retracted position.

Referring to FIGURES 43, 44, and 51–58, a plurality of stop bars 824 are provided in a stationary stop bar frame or housing 826 and are mounted for individual movement toward the front of the machine to arrest the movement of the units rack 580. The stop bar housing 826 is arranged in stationary position to the rear of the right hand portion of the units rack carrier or lever 732, and a rear cover 829 is secured thereto, as by screws 831. Novel means are provided for enabling at least some of the stop bars 824 to provide two different stop positions for the units rack 580. In the exemplary arrangement shown in the drawings, there are provided nine stop bars, the first or left hand stop bar S9 defining one stop position for the units rack 580, and the remaining stop bars defining two different stop positions for the units rack, whereby the nine stop bars will be capable of indicating seventeen different set or width sizes, as will be apparent as the description proceeds.

As best seen in FIGURES 51–57, each stop bar 824 is mounted for pivotal movement in the housing 826 by means of engagement to a pivot pin 828 arranged transversely at the lower end of this housing, and a lug 830 is provided adjacent the upper end of each stop bar, extending rearwardly therefrom, for disposition in an actuating cylinder 832, there being one cylinder 832 for each stop bar, and an actuating piston 834 in each of these cylinders. An inlet 836 is provided for each of the cylinders 832, at the rear thereof, for the introduction of fluid under pressure thereinto whereby the pistons 834 therein will be actuated to press against lugs 830 and cause the stop bars 824 to be pivoted forwardly or in a counterclockwise direction about pivot pin 828, as viewed in FIGURE 52. These inlets 836 will be connected in the fluid system through aligned bores 837 in the cover 829 in a manner that will become apparent.

A generally U-shaped shift bar 838 extends across the front of the stop bars 824, intermediate their height, and is pivotally connected to the stop bar housing 826, as by pivot pins or screws 841 for pivotal movement about a horizontal axis extending transversely of the housing 826 and through the pivot pins 841. A tension spring 840 is engaged to anchoring pins on the stop bar housing 826 and shift bar 838 for continuously urging the shift bar upwardly. The shift bar 838 is designed to be actuated and pivoted downwardly by an actuating piston 842 slidably mounted in a cylinder 844 in the housing 826. An inlet 846 communicates with the upper end of this cylinder 844 and extends rearwardly through the housing 826 for connection in the fluid system, as will be referred to again hereinafter. The piston 842 may be suitably engaged to the shift bar 838, as in the manner indicated in FIGURE 52 to pivot the latter downwardly, when fluid under pressure is introduced into the upper end of the cylinder 844 through inlet 846, for example, to the position thereof indicated in FIGURE 56, wherein a surface 839 on the shift bar 838 will abut a surface 841 in the stop bar housing.

The spring 840 will return the shift bar 838 to the normal position thereof shown in FIGURES 52 and 57 when the fluid pressure in the cylinder 844 is relieved.

Each of the stop bars 824 will be of generally similar profile, for example, that indicated in FIGURES 53, 54 and 55, but the heights thereof will vary, as indicated. Two U-shaped spring posts 848, 850 are secured to the rear of the housing 826, and tension springs 852 are suitably anchored to these posts and to the stop bars 824 whereby the stop bars will be continuously urged rearwardly to the positions thereof shown in FIGURES 51 and 52 wherein the lugs 830 on each stop bar will be disposed within its respective cylinder 832, and the pistons 834 in these cylinders will be in their retracted positions. These springs 852 may be secured, for example, to the lug 856 on the rear of the stop bars, or some of them may be secured to the rear of the base portion 858 of the stop bar.

The stop bar housing 826 is shown as being of inverted, generally U-shaped configuration including spaced, depending legs 860, 862 with the stop bars disposed between these legs and extending upwardly to their respective cylinders 832. The upper front surface 864 of the housing 826, into which the cylinders 832 open, is disposed rearwardly of the upper right hand portion 868 in which the cylinder 844 is formed, as indicated.

The nine cylinders 832 and the cylinder 844 will receive fluid pressure to actuate the pistons therein in accordance with the actuation of the sizing valves in the sizing valve block 70, as will be explained in more detail hereinbelow.

Each of the stop bars 824 includes a lug 870 thereon, disposed at the same height above pin 828 and designed to be projected into the path of movement of the units rack 580 to the right, to arrest such movement. The end 872 of the units rack which will abut against these stop bar lugs is shown in FIGURES 60 and 61 as including a notch or cut-out portion 874 whereby a first stop surface 876 is provided at this end of the stop bar, and a second stop surface is provided by the shoulder 878, inwardly of surface 876. The shift bar 838 and the design of lugs 880 on the stop bars will determine whether the stop bars will be moved outwardly to a position where the lug 870 thereon will be struck by the unit rack stop surface 876 or the stop surface 878. Thus, when the shift bar 838 is in the position thereof shown in FIGURES 52 and 57, the upper portion 882 of the lug 880 of the stop bars will be in position to strike the transverse portion 884 of the shift bar 838 when the pistons 834 are actuated; whereas, when the shift bar is shifted or pivoted downwardly to the position thereof shown in FIGURE 56, when the piston 842 is actuated, it will be in a position to be struck by the lower portion 886 of the lug 880 on the stop bars, as indicated in FIGURE 56. Accordingly, it should be apparent that when the shift bar 838 is in its normal or up position, as shown in FIGURES 52, 57, the stop bars will not be moved outwardly by their pistons as great a distance as when the shift bar is in its shifted or down position, as shown in FIGURE 56.

When the shift bar 838 is in its normal or up position, as shown in FIGURES 52, 57, the stop bars designated S1, S2, S3, S4, S5, S6, S7 in FIGURE 51 may be individually moved outwardly from the stop bar frame 826, when individually actuated, so that the lugs 870 thereon will be in position to be struck by the stop surface 878 of the unit rack 580 when the latter is in engagement with and being moved by the units wheel 578. In the illustrative embodiment of the invention, and as will become apparent, the stop bar identified in FIGURE 51 as S9 will only be actuated when the shift bar 838 is in its down position, as shown in FIGURE 56, whereby the lug 870 on stop bar S9 will be in position to be struck by the stop surface 876 on the unit rack 580, when the piston for this stop bar is actuated.

The stop bar indicated as S8 in FIGURE 51 is normally disposed in a position wherein the portion 882 of its lug 880 is in engagement with the shift bar transverse piece 884 when the latter is in its normal or up position. As will be apparent, the normal or rest position for the other stop bars S1–S7 and S9 is rearwardly of this position of the stop bar S8, whereby the lugs 880 on the other stop bars will be normally disposed rearwardly of and out of contact with the shift bar transverse piece 884 when the latter is in its normal or up position. To mount stop bar S8 in this off-set or tilted position, the piston 834 in the cylinder 832 therefor is shown in FIGURE 52 as being of a greater length and extending forwardly a greater distance than the other pistons 834 for the remaining stop bars, whereby the lug 880 on the stop bar S8 will be in engagement with its piston 834 at a point forwardly of the points of engagement of the lugs 880 on the other stop bars with their pistons 834, when all these parts are in their normal or retracted positions. In this position, portion 882 of lug 880 on the stop bar S8 will be adjacent to or in contact with the shift bar transverse piece 884. Thus, the lug 870 on the stop bar S8 will normally be in a somewhat forward position to be struck by the stop surface 878 on the units rack 580, as indicated in FIGURE 52, in the event that none of the preceding stop bars S9 and S1–S7 are actuated. When the shift bar 838 is actuated to its down position, the shift bar S8 may then be actuated by its piston 834 and moved forwardly until the portion 886 of the lug 880 thereon strikes the shift bar transverse piece 884. In this position, the lug 870 on the stop bar S8 will be disposed so as to be struck by the stop surface 876 on the units rack 580.

It will be noted that all of the pistons 834 are of the same length except the piston for the stop bar S8, as discussed above, whereby all of the stop bars S9 and S1 through S7, when retracted to their normal or rest positions, will have the lugs 870 and 880 thereon in alignment, while the lugs 870 and 880 on the stop bar S8 will be disposed somewhat forwardly thereof, as indicated in FIGURE 52.

Thus, it will be seen that the nine stop bars S1 through S9 will provide a means for registering seventeen different units of width in the measuring mechanism. The cylinders 832 for these stop bars will be respectively connected to sizing valves, and the cylinder 844 for the shift bar 838 will also be connected to a sizing valve, as will be explained in more detail hereinafter. The stop bar S9 will have two positions, namely, a rest or normal position, and an actuated position wherein the shift bar 838 is in its down position and the portion 886 of lug 880 of this stop bar is in engagement therewith. The stop bars S1, S2, S3, S4, S5, S6 and S7 will have three positions, namely, a rest or normal position, a position wherein the portion 882 of lug 880 is in engagement with the shift bar 838 when the latter is in its up position, as indicated in FIGURE 57, and a position wherein the portion 886 on lug 880 strikes the shift bar 838 when the latter is in its down position thereof, as indicated in FIGURE 56. This last position is farther forward than the second or intermediate position of the S1–S7 stop bars, as will be evident. The stop bar S8 will only have two positions, one wherein the lug portion 882 is in engagement with the shift bar 838 when the latter is in its up position, and one wherein the lug portion 886 is in engagement with the shift bar, when the latter is in its down position.

In the exemplary embodiment under consideration, the one active, projected position of stop bar S9 represents 4 units of width; the normal position of stop bar S8 represents 20 units of width and its projected position, 12 units of width; the intermediate or first projected position of each of stop bars S1 through S7 (that is, when shift bar 838 is in its up position and these stop bars are projected thereagainst) represents, respectively, 13, 14, 15, 16, 17, 18 and 19 units of width; and the second projected position of each of stop bars S1 through S7 (that is, when the shift bar is in its down position and these stop bars projected thereagainst) represents, respectively, 5, 6, 7, 8, 9, 10 and 11 units of width.

In normal operation, when a regular key is struck, the piston 750 will be actuated to elevate the left hand end of the unit escapement lever 744 and push this end upwardly. This upward movement of the left end of lever 744 will initially effect a pivoting of this lever about the pivot pin 889 pivotally connecting the right hand end thereof to link 762 whereby the pivot pin 745, unit rack guide 746, unit rack 580 and unit rack carrier 732 will be elevated or pivoted about pin 734 until the teeth of the unit rack engage the teeth of the unit wheel 578, at which time further upward movement of the left hand end of lever 744 will result in a pivoting of that end of the lever in a clockwise direction around the pivot pin 745 whereby the right hand end of the lever 744 and pivot pin 889 will move downwardly in a clockwise direction, as viewed in FIGURE 58. This action pulls the linkage member 762 downwardly which in turn pivots the locking pawl 760 in a clockwise direction around its pivot pin 764, as viewed in FIGURE 58, releasing the pawl 760 from engagement with the units wheel 578. Upward movement of the left hand end of lever 744 will be limited by the stop 756. The actuated piston 750 will hold the lever 744 in this position with the unit rack 580 in engagement with the unit wheel 578 and with the locking pawl 760 released therefrom. It will be noted that the unit rack 580 is brought into engagement with the unit wheel before the locking pawl 760 is released therefrom. As previously stated, when the locking pawl 760 moves away from the units wheel 578, it will not move the pawl trip 820 against the pawls 796, 798, but such action will only occur during a restoring function.

As the locking pawl 760 is released from engagement with the units wheel 578 in the manner just described, the spring 782 will be tensioned, and the pin 774 on kick bar 768 will be struck to prevent overtravel of the locking pawl 760. With the locking pawl so released, the constant air pressure in the left hand end of the cylinder 588 will drive the rack 594 therein to the right to effect rotation of the Em scale 576 in a clockwise direction, and units wheel 578 in a counterclockwise direction, as viewed in FIGURES 43, 44, by the power transmitting means described. This rotation of the units wheel 578 effects rectilinear movement of the units rack 580 to the right against the action of its spring 736. One of the stop bars 824 will be in an actuated or projected stop position wherein the lug 870 thereon is in position to be struck by either the stop surface 876 or the stop surface 878 on the right hand end of the units rack 580. Thus, the units wheel 578 and Em scale 576 will have been moved a distance corresponding to the number of units of width to be registered to indicate the number of units of width in the line being composed that will be required for the character, space or the like represented by the key or spacer bar struck in the keyboard.

After the Em scale and units wheels have been so rotated to register the required width, the fluid pressure acting on the piston 750 will be relieved or vented, and during this venting, the spring 782 will act on the locking pawl 760 to cause this pawl to be immediately brought into engagement with the units wheel 578 and while the units rack 580 is also still in engagement therewith whereby the units wheel and Em scale will not race. In this connection, it will be noted that during this return movement of the pawl 760 and while the fluid pressure behind piston 750 is still venting, the right hand end of the unit escapement lever 744 will be immediately lifted upwardly with pin 889 by spring 782 through the pawl 760 and linkage member 762, so that pawl 760 will lock with the units wheel 578 while the units rack 580 is still in engagement therewith. Thereafter, the units rack 580 and units rack carrier 732 and the pivot pin 745 will move down to the position thereof shown in FIGURES 43, 44. Thus, during the return movement, the lever 744 will first be moved so that the right hand end thereof at pin 889 will be lifted upwardly while the pressure acting on piston 750 is being relieved or vented. During this movement, the locking pawl is brought back into locking engagement with the units wheel 578, and the units rack 580 is still in engagement with the units wheel. At this time, the spring 754 and the weight of the various parts will cause the units rack to drop out of engagement with the units wheel, whereupon the spring 736 will return the rack 580 to the left against the stop 738.

Means are provided to operate during restoring functions to enable the locking pawl 760 to be released from the units wheel and to release the pawls 796, 798 from the ratchet 806 on the justification scale pointer shaft 786, without the units rack 580 being engaged to the units wheel. As shown in FIGURES 43, 44, this means includes a restoring lever 892 mounted for pivotal movement on a stationary pivot pin 894. The left hand end of this lever 892 is normally spaced above and out of contact with the right hand end of the units rack carrier 732, and the right hand end of lever 892 is shown as including a screw 896 resting on a piston 898 reciprocably mounted in a cylinder in a stationary restoring piston block 900.

In normal operation of the measuring and justification mechanisms, that is, not during restoring, the lever 892 will be in the position thereof shown in FIGURES 43, 44 wherein it will not interfere with the upward movement of the units rack carrier 732, as discussed hereinabove. However, when the piston 898 is actuated for a restoring operation, this piston will rise in its cylinder elevating the right hand end of lever 892 and causing it to pivot in a counterclockwise direction about the pivot pin 894 as viewed in FIGURE 43. A stop 902 may be positioned above this lever 892, as shown, to limit this pivoting movement.

sired to restore the various mechanisms in the machine to their starting or initial positions, as will become apparent. When the restoring lever 892 is in the actuated
Fluid under pressure will be delivered to the cylinder in block 900 to raise the piston 898 therein when it is deposition thereof, the left hand end thereof will be in a position adjacent to and above the right hand end of carrier 732 to prevent the carrier 732 from being lifted upwardly when the left hand end of the units escapement lever 744 is moved upwardly, after the piston 750 is actuated. Thus, actuation of the lever 744 by the piston 750, when the restoring lever 892 is actuated by its piston 898 to keep the units rack carrier 732 from moving upwardly, will result in the units escapement lever 744 being pivoted in a clockwise direction about the pivot pin 745 to a greater extent. This greater pivoting movement of lever 744 about pin 745 will result in a greater downward movement of the linkage member 762 than is involved when the units rack carrier 732 is free to move upwardly. Thus, the locking pawl 760 will be pivoted to a greater extent in a clockwise direction about the pivot pin 764, and this additional movement of the locking pawl 760 will be effective to move the pawl trip pin 820 into engagement with the left ends of the pawls 796, 798 to release them from the teeth of the ratchet 806 on the justification pointer shaft 786. Thus, the spring 794 will be free to operate to restore the justification pointer shaft and pointer to the left to their initial or start position.

With the parts in this position for restoring, fluid under pressure will be delivered to the right hand end of the driving cylinder 588, as viewed in FIGURE 41, while the fluid pressure in the left hand end of this cylinder will be relieved or vented. The fluid pressure on the right hand side of the rack 594 in the driving cylinder will effect a reverse rotation of the Em scale 576 and the units wheel 578 to return them to their initial positions. In this connection, it will be noted that the locking pawl 760 and units rack 580 are both completely out of engagement with the units wheel 578 during restoring to permit the units wheel and Em scale to be rotated in reverse directions and restored to their initial positions. This reverse rotation of the Em scale and units wheel will be arrested when the lug 620 on the clutch disc 616 strikes the detent or stop 640 whereby the Em scale and units wheel will be automatically reset or restored to proper position for composing another line of the same length as the previous line.

After restoring is completed, the fluid pressure acting on the piston 898 in the restoring piston block 900 will be relieved, as will the fluid pressure acting on the piston 750 in the piston block 752 for the units escapement lever 744. The locking pawl 760 will then be returned to locking engagement with the teeth of the units wheel 578, the pawls 796, 798 will be returned to engagement with the teeth of the ratchet 806 on the justification pointer shaft 786, and the restoring lever 892 and escapement lever 744 will return to their normal or rest positions. The machine is then ready for the next line to be composed, as will be understood.

Any suitable means may be utilized for returning lever 892 to its normal position shown in FIGURES 43, 44. For example, the right end thereof may be larger and heavier than the left whereby this lever will be returned by gravity.

A locking leaf spring 890 is shown in FIGURE 58 as being carried by the lever 744 with its free end normally engaging in a tooth at the left of the units rack 580, when the latter is in its retracted position against stop 738. When the lever 744 is lifted upwardly by its piston 750, to bring the units rack into engagement with the units wheel, spring 890 will be lifted out of engagement with the units rack to permit the latter to be moved by the units wheel.

A line counter 904 is shown as being provided for automatically counting the number of lines composed. This line counter is mounted in stationary position below the justification scale 584 and is viewable through an opening 906 in the upper housing section 36. It may be of any suitable construction, as will be understood, and it is shown as including a counting arm 908 positioned to be struck by a piston 910 when the latter is actuated.

*Exemplary Layout of Matrix Case and Keys*

Figure 62:
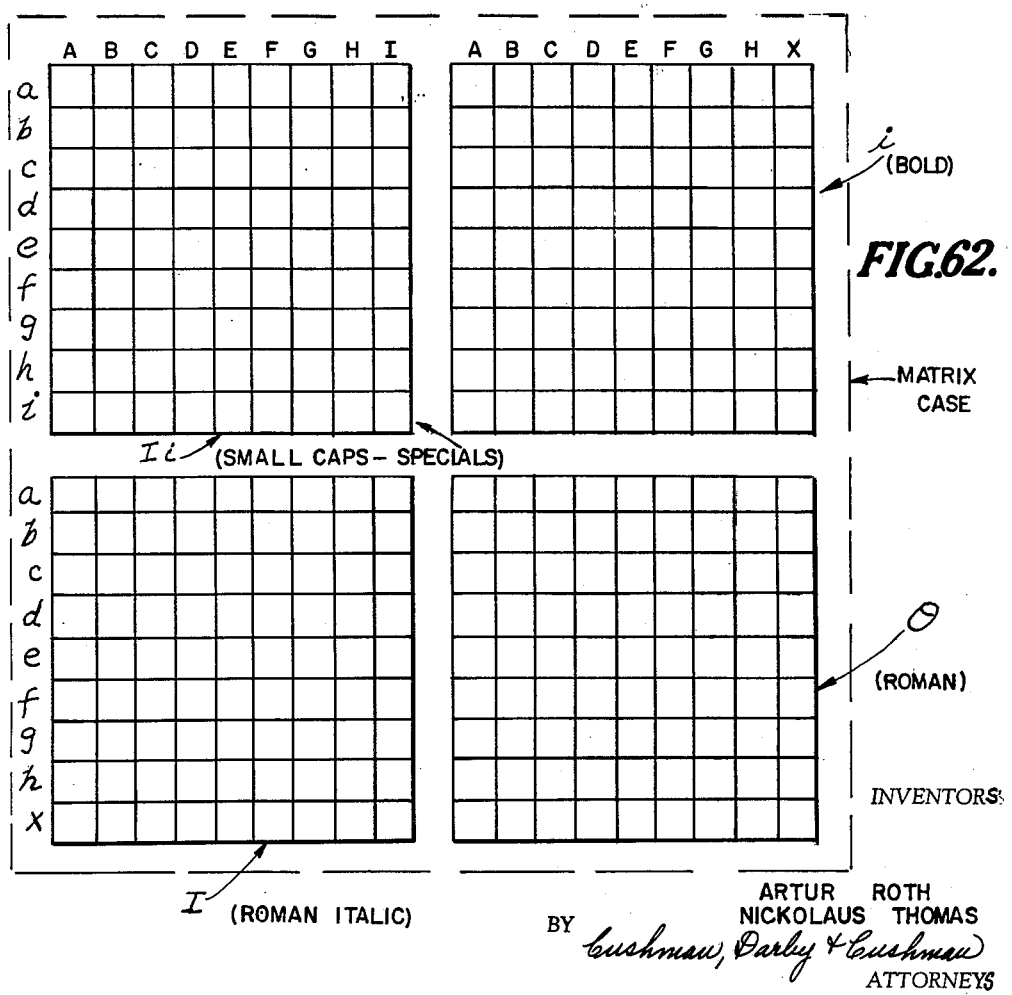
FIGURE 62 is a diagrammatic view of an exemplary matrix case layout for an 18 x 18 system of type composing and casting.

FIGURE 62 shows schematically an exemplary matrix case layout designed to be used in the 18 x 18 system of type composing and casting discussed above. Such a matrix case is discussed in the copending application entitled "Matrix Case" filed of even date herewith, and, as disclosed in that application, the matrices are arranged in four quadrants, identified in FIGURE 62 as the "iI," "I," "i" and "O" quadrants, with each quadrant containing nine rows and nine columns of characters, and with the quadrants arranged in the manner indicated. The vertical columns of matrices shown in FIGURE 62 are identified in the "iI" and "I" quadrants by the letters "A" through "I," and these columns in the "i" and "O" quadrants are identified by the letters "A" through "H" and "X." The horizontal rows of matrices in the "iI" and "i" quadrants are shown as being identified by the letters "a" through "h" and "x." These identifying letters for the rows and columns, with the exception of "X" and "x" correspond to positioning signals and punch holes produced in the composing machine and perforated control tape, as will become apparent.

The disclosure of the copending application entitled "Matrix Case" referred to above is incorporated herein to the extent that it will assist in understanding the present invention.

Figure 63:
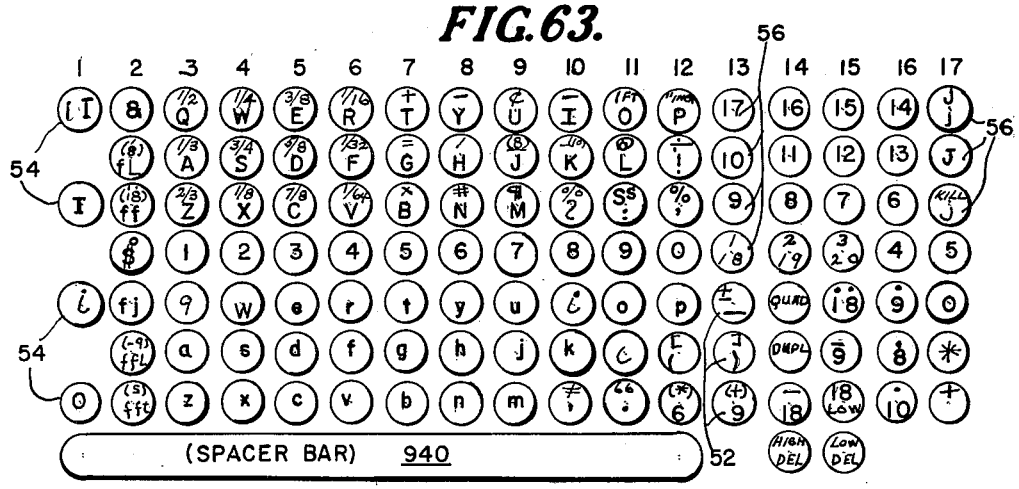
FIGURE 63 is a diagrammatic view showing an exemplary layout of keys in the keyboard.

An exemplary layout of keys is shown schematically in FIGURE 63. In this exemplary layout, it will be seen that the keys are arranged in seventeen columns identified by numbers 1 through 17. The "iI," "I," "i" and "O" shift keys 54 are shown as being arranged in the first column. Regular keys 52 are shown as being arranged in the eleven columns numbered 2 through 12, and three regular keys 52 are also shown as being arranged at the bottom of column 13. There are seven rows of regular keys in columns 2 through 12, and some of these regular keys are shown as including two characters. This indicates that the same key may be used for more than one character, depending on which shift key 54 has been struck. In other words, the same relative position in each of the four quadrants in the matrix case may not be occupied by the same character, but a different character may be arranged in that position in one of the quadrants. Likewise, the character face may differ from quadrant to quadrant, as indicated in FIGURE 62.

Special keys 56 are arranged in columns 14–17, in FIGURE 63, and also in the first four places in column 13. These special keys are provided for such purposes as justifying, killing a line, high and low quadding or deleting, and also for special characters or symbols of particular widths, etc., as will be understood. The "j" special or justifying key connects with a "j" valve in the positioning valve block 68, and also with an "O" valve in the sizing valve block 70, as will be referred to again hereinafter. Thus, this "j" key 56 will be coupled to a key bar having a lug 96 therebelow to actuate a rocker arm 60 for the "j" positioning valve bar 64, and having a lug 102 thereabove for actuating a skirt 913 on the sizing rocker 62 for the "O" sizing valve bar whereby the latter will be actuated when the "j" key 56 is depressed. When this key is struck, by itself, it will kill the line to the next preceding justifying signals, for example, to the next preceding signals produced by the "jJ" key 56 plus a number justifying key. As will be understood, a "j" perforation in the control tape will operate in the casting machine to deactivate the pump until one revolution after a "J" signal. Depression of this "j" special key, by itself, will also effect restoring, as will become apparent.

The "J" special key is connected to a key bar for actuating a positioning valve bar 64 for a "J" valve in the positioning valve block, and will yield nothing, when struck by itself.

The "jJ" key suitably connected to key bar means to open a "j" valve and a "J" valve in the positioning valve block as will be apparent. Struck by itself, this key will yield nothing.

Springs may be used on the "j," and "J" key bars to urge them and the "j" and "J" special keys to their normal, retracted positions, if desired.

Numbered justifying keys may be provided in columns 13 through 17 in the exemplary layout of keys shown in FIGURE 63. These keys will include a number thereon corresponding to the numbers on the justifying scale. When a line is to be justified, justifying numbers will be indicated on the justifying scale by the pointer therefor. These numbers will usually be for two of the numbered justifying keys. These numbered justifying keys will be connected to actuate an "X" valve, and either one positioning valve from the "a" through "i" valves in the positioning valve block, or the "i" valve and one valve from the "a" through "h" valves in the positioning valve block, the "i" valve being the one at the right hand end of the positioning valve block, as will become apparent.

Thus, during normal line justifying, the justifying scale will indicate two justifying numbers. For the first number, the operator would strike "j" special key and the numbered justifying key corresponding to the first number given by the justifying scale, and then the operator would strike the "jJ" key plus the numbered justifying key corresponding to the second number indicated by the justifying scale.

A high delete or high quad key and a low delete or low quad key are shown as being provided at the bottom of columns 14 and 15 respectively, in the section of the exemplary key layout for special keys. As shown in FIGURE 64, the high delete key 912 is carried by a lever 914 pivotally mounted on a shaft 916 arranged on the key frame assembly front portion 44. This lever 914 is connected to a shaft 918 through a linkage 920 and pusher lever 922, whereby depression of this key will effect rotation of the shaft 918 in the manner indicated, lever 922 being fixedly connected to shaft 918, and the latter being journalled in stationary blocks 924. Pusher lever 926 is arranged at the other end of shaft 918, from pusher lever 922, and these pushers are designed to actuate positioning valve bars 64. The pusher 926 is arranged to actuate the positioning valve bar provided to actuate a normally opened valve in the center of the positioning valve block, and as best seen in FIGURE 8, a spring 928 is provided for normally urging this positioning valve bar forwardly against the pusher 926. The pusher 922 on the shaft 918 is arranged to actuate two positioning valve bars, one for the "i" valve and one for the "I" valve at the right hand end of the positioning valve block, as will become apparent. Thus, when a high quad or high delete is required, a regular key 52 is also struck with the high delete key in order to give the desired number of units of width. However, the positioning valve block will receive no fluid pressure due to the actuation of the positioning valve bar by the pusher 926, whereby no positioning punches will be operated when the regular key is struck with the high delete key. Only the sizing punches are operated corresponding to the regular key struck. The "i" and "I" valves at the right end of the positioning valve block which are opened when the high delete key is struck will give position punch holes in the control tape corresponding to the position in the matrix case for the "I" column and the "i" row which will be the high quad matrix.

The low quad or low delete key 930 is shown in FIGURE 64 as being carried by a lever 932 pivotally mounted on the shaft 916. This lever is connected to a linkage member 934 and pusher lever 936, the latter being journalled on a shaft 938, as shown. The pusher 936 is designed to actuate a positioning valve bar 64 which controls "L" valve at the right hand end of the positioning valve block, as will become apparent. When a low quad or a low delete is required, this key is struck opening the "L" valve in a positioning valve block to provide an "L" punch hole in the control tape or paper. A regular key is also struck when the low quad key is struck to provide for the desired number of units of width. It will be understood that the positioning punch holes in the control tape for this regular key will be of no consequence since the low quad portion of the mold blade in the mold of the casting machine will be under the matrix for that particular regular key. The sizing punch holes in the control tape for the regular key struck with the low quad key will provide for the proper width of the low quad.

Other special keys may also be provided in columns 13–17 in the exemplary key layout shown in FIGURE 63 providing, for example, for special characters of particular size, or for special functions, as will be evident.

A spacer bar 940 is also shown in the layout of FIGURE 63. This spacer bar is arranged so as to be shifted laterally between two positions. As shown in FIGURES 7, 8 and 64a, the spacer bar 940 is mounted through lever means 941 on a shaft 942 journalled in stationary brackets 944 in the key frame assembly 42. Lever means 941 may be journalled on shaft 942, as indicated. An elongated, generally U-shaped spring member 946 is engaged to left bracket 944, as shown in FIGURE 64a, and extends laterally therefrom for releasable locking engagement in either of two grooves 948, 950 formed in the spacer bar shaft 942. Thus, the spacer bar 940 may be shifted laterally so that the locking spring 946 is either in groove 948, as shown in FIGURE 64a, or in groove 950. Pusher means 952 is shown depending from lever means 941 to be actuated or pivoted about the shaft when the spacer bar is depressed. When the spacer bar 940 is in the position thereof determined by the spring 946 engaging in groove 948, the pusher means 952 will be connected to key bar means for operating the "S" valve and the "L" valve in the positioning valve block, and "0" and "9" valves in the sizing valve block. In this position, depression of the spacer bar will provide for four unit justified spacing.

When the spacer bar is moved to the left so that the locking spring 946 engages in groove 950, the pusher means 952 will be disposed to actuate key bar means operatively connected to actuate the "L" valve in the positioning valve block, and the "0" and "2" valves in the sizing valve block. In this position, depression of the spacer bar will provide for six unit fixed spacing.

*Pneumatic System*

In the exemplary embodiment of the invention, a pneumatic system has been provided for effecting various functions and operations in response to depression of the keys and spacer bar. However, as indicated above, although this system has been found to be most efficient, satisfactory and practical, it will be understood that other equivalent systems such as a hydraulic, mechanical or electrical system may be utilized in lieu thereof.

Figure 91:
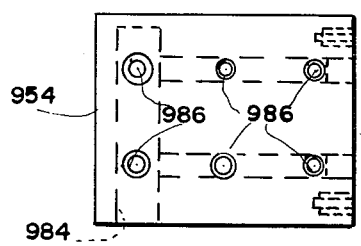
FIGURE 91 is a plan view of the manifold.
Figure 93:
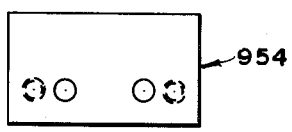
FIGURE 93 is an end elevational view of the manifold.
Figure 92:
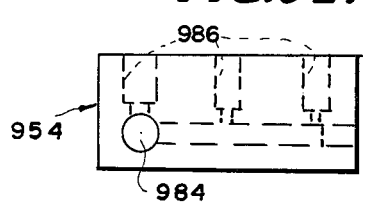
FIGURE 92 is a side elevational view of the manifold.

The exemplary pneumatic control system, the various valves and other structures therein, and their operative connections to other structures in the composing machine are illustrated in FIGURES 65a, b, c, d, 66–93. Referring to the somewhat schematic flow diagram shown in FIGURES 65a, b, c, d, the pneumatic system will be seen to include the following components: a manifold 954 having an inlet 956 communicating with a source of fluid under pressure which, for example, may be air under pressure, as indicated by numeral 958; the positioning valve block 68; the sizing valve block 70; a shift valve 960; a shift control valve 962; a paper feed valve 964; a timing valve 968; a selector valve 970; a letter spacing valve 972; a restoring valve 974; a power shift valve 976; a reset valve 978; the four Em valve 980; and another reset valve 982. The constant air manifold 954, as best seen in FIGURES 91, 92 and 93 includes an inlet port 984 communicating with line 956, and six outlet ports 986 for fluid communication with other valves shown in the pneumatic system in FIGURES 65a, b, c, d, as follows:

Line L2 extends therefrom to the left end of the sizing valve 70 to provide constant air pressure to the "0" and "9" sizing valves; line L4 extends therefrom to the paper feed valve 964 to provide constant air pressure thereto; line L6 extends therefrom to the left end of the positioning valve block to provide constant air pressure to the "i," "iI," "I" and "O" valves 348, 350, 352 and 354 respectively, which are arranged to be actuated by the shift mechanism 244, as discussed hereinabove; line L8 extends therefrom to the timing valve 968 to provide constant air pressure thereto; line L10 extends therefrom to provide constant air pressure to the power shift valve 976; and line L12 extends therefrom to provide constant air pressure to the left hand reset valve 978.

*Positioning Valve Block*

As best seen in FIGURES 65a and 66–69, the positioning valve block 68 is provided with a generally T-shaped longitudinal passageway 990 therein, with a cover 992 being secured to the rear end of the block 68, and closing the rear end of this passageway 990. The passageway 990 is divided into three pneumatically isolated sections 994, 996, 998, as by suitable sealing elements 1000, 1002, 1004, as indicated. The "i," "iI," "I" and "O" valves 348, 350, 352 and 354 are shown as being provided in the first or left hand section 994, as viewed in FIGURE 65a; valves "a" through "h," "A" through "H," "L" and valve 1006 are arranged in the intermediate or center section 996; and valves "j," "J," "i," "I," "X" and "S" are shown as being arranged in the right hand section 998. Each of these valves, except for the valve 1006 approximately at the center of the positioning valve block, is shown as being of identical construction. As best seen in FIGURE 68, all of these valves, except for valve 1006, includes an actuator pin 1008 slidably arranged in a sleeve 1010 fitted in a bore 1012 opening into the passageway 990. A compression spring 1014 urges a ball 1016 against the inner end of the sleeve 1012 to normally block communication between the passageway 990 and a passageway 1018 in the valve block leading from the bore 1012 to a bore 1020 in the cover 992. Stops 1022 are shown as being provided on the front of the positioning valve block, and extending down into a groove formed on the actuator pins 1008. The sleeve 1010 is shown as being provided with an opening 1024 therein communicating with a vent hole 1026.

Thus, it will be seen that when the valve actuator pins 1008 are moved rearwardly to move the balls 1016 into the enlarged portion of the passageway 990, the bore 1020 will be in communication with the passageway 990 through passageway 1018 and bore 1012. And, when the springs 1014 return the balls 1016 to their normal, closed positions, seating against the sleeve 1010, as shown in FIGURE 68, the bores 1020 will be vented through the passageway 1018, and the vent holes 1024, 1026, as indicated.

As previously indicated, the valve actuator pins 1008 for the "i," "iI," "I" and "O" valves 348, 350, 352 and 354 in the section 994 at the left hand end of the positioning valve block 68, as viewed in FIGURE 65a, will be in position to be actuated by the shift mechanism 244 in the manner described above. An inlet 1028 communicates with this section 994 of passageway 990 for these valves, and the line L6 from the constant air manifold 954 connects into this inlet 1028 providing constant air thereto, as indicated in FIGURE 65a. Fluid lines L14, L16, L18, L20 will connect the bores 1020 for these valves with the lifting cylinder block 186 and sliding piston block 196 for effecting shifting movements of the sizing plate frame 74 and sizing plate 72, as discussed hereinabove. The line L14 from the bore 1020 for the "i" valve 348 will lead to the cylinder 198 in the sliding piston block; the line L16 from the bore 1020 for the "iI" valve will lead to the cylinder 202 in the sliding piston block; the line L18 from the bore 1020 for the "I" valve will lead to the cylinder 200 in the sliding piston block; and the line L20 from the bore 1020 for the "O" valve will lead to the cylinder 184 in the lifting cylinder block 186.

The valve actuator pins 1008 for the "a" through "h," "A" through "H" and "L" valves will be in position to be actuated by positioning valve bars 64. The bores 1020 for these valves will be individually connected through separate fluid lines to respective passageways 568 in the cover 566 for the perforating punch block 548, to actuate the positioning punches therein. As indicated in FIGURE 65c, there will be a passageway 568 and punch 546 communicating with each of these valves, and these passageways have been similarly identified in FIGURE 65c by the letters "a" through "h," "A" through "H" and "L."

The valve 1006 in the middle of the positioning valve block includes an actuator pin 1030 slidably mounted in a bushing 1032 arranged in a bore 1034 in the positioning valve block, as shown in FIGURE 69. A hole 1036 is provided above the bore 1034 and communicating with the passageway 990, and compression spring 1014 urges ball 1016 against the sleeve 1032, whereby the hole 1036 is normally in communication with the passageway 990. A line L22 is arranged in this hole 1036 to establish communication between the middle section 996 of passageway 990 and the timing valve 968 in a manner to become apparent. Thus, it will be seen that valve 1006 is normally opened, while the other valves in the positioning valve block are normally closed.

The valve actuator pins 1008 for the "j," "J," "i," "I," "X" and "S" valves at the right hand section 998 of the positioning valve block are positioned to be actuated by positioning valve bars 64. The bores 1020 for the "i," "I," and "S" valves in this section 998 of the positioning valve block are connected to fluid lines leading to passageways 568 for their punches, designated respectively "i," "I" and "S," as indicated in FIGURE 65c. The bore 1020 for the "X" valve is connected by line L24 to the restoring valve 974, as will become apparent.

A manifold 1038 is shown as being attached to the positioning valve block 68, above the "J" and "j" valves, and includes separate passageways therein communicating with the passageways 1018 for these valves. These separate passageways terminate in bores 1040 (see FIGURE 67) whereby each of the "j" and "J" valves communicates with a bore 1020 and a bore 1040. The bores 1040 are in communication through fluid lines L26, L28 with branch fittings 1042, 1044, respectively. Line L30 leads from fitting 1042 to the piston for the "j" punch, and another line L32 leads from this fitting to the shift control valve 962. Similarly, line L34 leads from branch fitting 1044 to the piston for the "J" punch, and another line L36 leads from this fitting to the shift control valve 962. And lines L38, L40 lead from the bores 1020 for the "j" and "J" valves to the restoring valve 974, as will be apparent.

The right hand section 998 of the positioning valve block 68 is provided with an inlet 1046 communicating through line L42 with the timing valve 968, as will become apparent.

*Sizing Valve*

Referring to FIGURES 65a and 70-72, it will be seen that the sizing valve block 70 is constructed in a manner similar to the positioning valve block 68. Hence, similar reference characters will be used to identify similar parts. A longitudinal passageway 990a is provided in this valve block, and is closed by a cover 992a. Ten sizing valves numbered 0, 9 and 1-8, reading from left to right in FIGURE 65a, are arranged in the valve block, as shown. The ends of the passageway 990a are sealed, as by T-shaped members 1004a, and another similar sealing member 1002a is provided in this passageway to pneumatically isolate the 0 and 9 sizing valves from the sizing valves numbered 1 through 8. The section of this passageway 990a for the 0 and 9 valves is in communication with the line L2 from the constant air manifold 954 through an inlet 1048 whereby constant air pressure will be present in the air passage 990a for the 0 and 9 valves.

The passageways 1018a in the sizing valve block are in communication with bores 1050 in an upper cover 1052 for the sizing valve block, except that there is no bore 1050 provided for the passageway 1018a for the "9" sizing valve.

The valve actuating pins 1008a are arranged to be actuated by the sizing valve bars 66, and the bores 1020a for the sizing valves numbered 1 through 8 are individually connected by separate fluid lines to the passageways for punches in the paper perforator 548 identified respectively by numbers 1 through 8, as seen in FIGURE 65c. The upper bores 1050 for these sizing valves, numbered 1 through 8, are in separate communication through individual fluid lines with the pistons for the stop bars identified respectively as S1 through S8.

The bores 1020a for the "0" and "9" sizing valves are in communication with lines L44, L46 respectively, which, in turn, communicate with the selector valve 970.

The upper bore 1050 for the "0" sizing valve is in communication through a fluid line L14 with the actuating piston for the shift bar of the stop bar mechanism.

The section of passageway 990a for the sizing valves numbered 1 through 8 is in communication with the timing valve 968 through a line L48 and inlet 1051, as will be apparent.

*Shift Valve*

The shift valve block 960 is best seen in FIGURES 65a, 73, 74 and 75. As shown, the "i" and "I" shift valves are of similar construction to the valves in the positioning and sizing valve blocks. Hence, similar reference characters will be used to designate similar parts. The valve actuating pins 1008b of these shift valves are in position to be actuated by the shift latches of the shift mechanism, as discussed hereinabove. These valves will be normally closed, as shown, normally blocking communication between the passageway 990b therein and the passageway 1018b and bore 1020b. The passageway 990b is sealed at either end thereof by sealing elements 1004b and the bores 1020b for these valves will be in communication with fluid lines L50, L52. Line L50 leads from the "i" shift valve to the shift control valve 962 which, when opened, will permit air to pass from line L50 through line L54 leading to a branch fitting 1054. One line L56 leads from this fitting 1054 to the "i" punch piston in the perforating punch block, and the other side of fitting 1054 is in communication through line L58 with the bore 1020 for the "i" valve in section 998 at the right hand end of the positioning valve block 68, as shown in FIGURE 65a.

The line L52 leading from the bore 1020b for the "I" shift valve leads to another branch fitting 1056 which communicates through line L60 with the "I" punch piston in the perforating punch block. Another line L62 leads into the fitting 1056, this line communicating with the bore 1020 of the "I" positioning valve in the section 998 of the positioning valve block.

These fittings 1054, 1056 may be constructed so as to include a ball 1058 movable therein, as indicated in FIGURE 65c.

An inlet 1062 is shown in FIGURE 74 as communicating with the passageway 990b in the shift valve, and a line L64 leads from the timing valve 968 to this inlet 1062, as will be apparent.

*Shift Control Valve*

The shift control valve 962 is shown in FIGURES 65c and 76, and includes a bore 1064 for receiving the line L50 from the "i" shift valve. This bore opens up into a central passageway 1066 in which is slidably arranged a piston 1068 urged to the position shown by spring 1070. A stop 1072 is arranged at the bottom of this passageway for limiting the movement of the piston 1068. A bore 1074 extends laterally from the passageway 1066 and is in communication with the line L54 leading to the fitting 1054. The piston 1068 is formed with an external annular recess or groove therein whereby the bore 1074 will be vented through vent hole 1076 when the piston 1068 is in the position shown in FIGURE 76.

The shift valve 962 also includes a bore 1078 communicating with the passageway 1066, as shown, with a ball 1080 being arranged in this bore so as to be movable laterally to close the openings in sockets 1082, 1084 provided at each end of this bore, as shown. Socket 1082 is in communication with the line L32 leading from the fitting 1042, which is in turn connected through line L26 to the "j" valve in the positioning valve block, and socket 1084 is connected to line L36 leading from the fitting 1044 which in turn is in communication through line L28 with the "J" valve in the positioning valve block.

Thus, if there is no air pressure in the bore 1078 coming from either the line L32 or the line L36, the piston 1068 will be moved away from the bore 1064 when the "i" shift valve is opened and fluid under pressure is in line L50 leading therefrom. The piston 1068 will be moved a sufficient distance away from bore 1064 to establish communication between this bore and the bore 1074 whereby air under pressure will flow through line L54 and line L56 to actuate the "i" positioning punch.

However, if air pressure enters the bore 1078 from either the "j" or "J" valves, or both, in the positioning valve block, this air pressure will enter the passageway 1066 and keep the piston 1068 in the position thereof shown in FIGURE 76 and counteract any air pressure that may be in the bore 1064. The purpose for this will become apparent.

*Paper Feed Valve*

As best seen in FIGURES 65c, 77 and 78, the paper feed valve 964 includes a central bore 1086 having a piston 1088 slidably arranged therein. An inlet port 1090 opens into the piston 1088 and will be in communication through line L66 with the timing valve 968 to receive air under pressure therefrom, as will become apparent.

A valve member 1091 is slidably arranged in a bushing 1092 in the passageway 1086, and an inlet port 1094 is provided at the adjacent end of the paper feed valve. The valve 1091 is provided with a head 1096 located in this inlet, whereby the valve 1091 will be movable between a stop 1098 and the left end of the bushing 1092, as shown in FIGURE 78. The inlet 1094 will be in communication with line L4 whereby the inlet 1094 will be in constant communication with the source of fluid pressure through the manifold 954. The valve 1091 will normally be in the position thereof shown in FIGURE 78 due to this constant air pressure acting on the head 1096 thereof.

Bores 1100, 1102 extend through the paper feed valve 964 for communication with the bore in the bushing 1092. The bore 1100 will be connected to a fluid line L68 leading to the paper feed cylinder inlet 526 to deliver fluid under pressure thereto, and the bore 1102 will be connected to a fluid line L70 leading to the paper chip ejector to deliver fluid to the conduit 428 and nozzle 430.

The valve member 1091 includes an axial passageway 1104 at the right end thereof shown in FIGURE 78 and communicating with a lateral opening 1106 therein. A vent hold 1108 communicates with the passageway 1086, and the piston 1088 is shown as including a rubber or plastic sealing disc 1110 at its forward end adjacent the valve 1091.

Thus, when air from the timing valve enters the inlet 1090 through line L66, the piston 1088 will be moved to the left, as viewed in FIGURE 78, until it engages valve 1091 and moves same to the left until the head 1096 thereof strikes the stop 1098. At this time, pressurized air from the manifold 954 will flow through line L4, through the inlet 1094, around the stem of valve 1091 and out through the bores 1100, 1102 to be delivered to the paper feed cylinder and chip ejector, as will be evident. It will be noted that when the valve head 1096 is in position abutting against the stop 1098, the disc 1110 in the piston 1088 will seal the passageway 1104 in the valve 1091 whereby air from the manifold will only flow through the bore in the bushing 1092 and out the bores 1100, 1102.

While the air from the timing valve in the inlet 1090 is vented, the constant air pressure in inlet 1094 will act against the head 1096 and shoulder 1112 on the valve 1091 to tend to move this valve to the right to the position thereof shown in FIGURE 78. However, there will be a delay in this movement of valve 1091 as a result of the construction of the piston 1088. This piston is sufficiently large so that as the air is being vented from the inlet 1090, there will still be some air acting on the piston to retard its movement to the right, to the position thereof shown in FIGURE 78. This delay is important in that it prevents the pawl 518 in the paper feed mechanism from coming down and turning the ratchet wheel 486 until after all of the active perforating punches have been retracted.

After the valve 1091 has been moved back to the position thereof shown in FIGURE 78, the bores 1100, 1102 will be vented through the passageway 1104 in the valve 1091 and through the vent hole 1108, and the constant air pressure in inlet 1094 will hold the valve in this position until the piston 1088 is again actuated by air pressure from the timing valve, as discussed.

*Timing Valve*

The timing valve 968, as best seen in FIGURES 65b, 79, 80, and 81, includes a main bore 1114 communicating at its upper end with an inlet 1116 connected to the line L8 from the manifold 954 whereby there will be constant air pressure in inlet 1116. A valve 1118 is slidably mounted in a bushing 1120 in the bore 1114, and includes a head 1122 normally urged by the constant air in the inlet 1116 to seat against a circular valve seat 1124 and close off communication between the bore 1114 and the inlet 1116.

A piston 1126 is slidably arranged in the bottom of bore 1114 and will be normally disposed in the position thereof shown wherein it abuts against the selector valve 970, as best seen in FIGURE 65b, by compression spring 1128. An actuator 1130 for the valve 1118 is carried by the piston 1126, whereby when the piston is moved inwardly into the bore 1114, against the action of spring 1128 (by air pressure from the selector valve 970) the actuator 1130 will engage the valve 1118 and move same so that the head 1122 thereof will be moved away from its seat 1124 to establish communication between the inlet 1116 and the bore 1114.

The valve 1118 includes axial passageway 1132 in the lower portion thereof communicating with a lateral opening 1134 therein. The actuator 1130 is designed to seal off the free end of this passageway 1132 when moved into engagement therewith, as described, and vent holes 1136 are shown as communicating with the bore 1114 beneath the bushing 1120.

An outlet 1138 opens into the bore 1114 and will be in communication with the line L42 leading to the inlet at the right hand end of the positioning valve block 68 to deliver air under pressure to the section 998 of passageway 990 for the valves "j," "J," "i," "I," "X," "S."

Another outlet 1140 communicates with the bore 1114, as shown, and is connected to line L22 leading to the inlet 1036 approximately at the middle of the positioning valve block 68 for delivering air under pressure to the intermediate section 996 of passageway 990 for the valves "a" through "h," "A" through "H" and "L."

Another outlet 1142 opens into the bore 1114 and communicates through line L72 with the letter spacing valve 972 to deliver air under pressure thereto.

Another outlet 1144 opens into the bore 1114, as shown, and is in communication through line L66 with the inlet 1090 to the paper feed valve 964.

Another outlet 1146 opens into the bore 1114 and communicates through line L74 with the inlet of the actuating cylinder 752 for the left hand end of the unit escapement lever 744.

Another outlet 1148 opens into the bore 1114 and is in communication through line L48 with the inlet to passageway 990a in the sizing valve block 70 for delivering air under pressure for the sizing valves numbered 1 through 8.

Another outlet 1150 opens into the bore 1114 and is in communication through line L64 with the inlet to the shift valve 960 for delivering air under pressure to the passageway 990b therein.

Thus, it will be seen that when the valve 1118 is actuated so that the head 1122 thereof is moved away from the seat 1124, air under pressure will flow from the manifold 954 through these various outlets in the timing valve 968 and to the various valves and structures, and the piston 1126 will only be actuated to open the valve 1118 by either an "0" or a "9" sizing signal, or both, as will become apparent.

*Selector Valve*

The selector valve 970, as best seen in FIGURES 65b, 82 and 83, is arranged in contact with one end of the timing valve 968 and includes spaced outlet ports 1152, 1154 arranged to deliver air against the outside of the piston 1126 in the timing valve 968. A bore 1156 is arranged inwardly of these outlets and piston valves 1158, 1160 are slidably disposed in this bore with a compression spring 1162 normally urging them against bushings 1164, 1166 whereby the outlets 1152, 1154 are normally closed from communication with the bores 1172, 1176 in the bushings 1164, 1166, as shown in FIGURE 82. Vent openings 1168 are formed in this bore 1156, between the pistons 1058, 1060, as indicated, whereby air from ports 1152, 1154 may be vented around pistons 1158, 1160 and through openings 1168 when the pistons 1158, 1160 are in the positions thereof shown in FIGURE 82.

An inlet port 1170 is formed in the selector valve and is in communication through line L46 with the bore 1020a for the "9" sizing valve in the sizing valve block 70 to receive air under pressure when this sizing valve is opened. Inlet 1170 communicates with a passageway 1172 in the bushing 1164 whereby the piston 1158 is adapted to be moved to the right, to establish communication between the passageway 1172 and the outlet 1152 when the "9" sizing valve is opened, so that air under pressure will pass from the outlet 1152 against the piston 1126 in the timing valve 968 to open the valve 1118 therein, as previously described.

An inlet 1174 communicates with a passageway 1176 in the bushing 1166, and receives air under pressure from line L44 connected to the bore 1020a of the "0" sizing valve in the sizing valve block 70. Thus, when the "0" sizing valve is opened, air will flow therefrom through line L44 and inlet 1174 to force the piston 1160 to the left, as viewed in FIGURE 82, exposing outlet 1154 for flow of air under pressure therethrough to actuate the piston 1126 in the timing valve 968 and open the valve 1118 therein.

Another bore 1178 is provided in the selector valve. One end of the bore 1178 is in communication through passageway 1180 with the inlet 1170, and a piston 1182 is slidably arranged therein. A cup-shaped stop 1184 is arranged in stationary position in the bore 1178, as by the screw 1186, and a compression spring 1188 is provided between this member 1184 and the piston 1182 for normally disposing the piston 1182 in the position shown in FIGURE 82. An annular groove 1190 is formed on the piston 1182, and a vent opening 1192 extends through the selector valve body into this groove 1190 when the piston 1182 is in the position thereof shown. An outlet 1194 is provided opening into a passageway 1196 arranged to be in communication with the groove 1190 and vent opening 1192 when the piston 1182 is in the position shown. This outlet also opens into another passageway 1198 and is in communication with a line L76 leading to the punch piston identified as number 9 in the perforating punch assembly shown in FIGURE 65c.

A passageway 1200 leads from the passageway 1180 to the right hand side of the bore 1178, and a piston 1202 is slidably arranged in this part of the bore with a spring 1204 normally holding it in the position shown wherein the passageway 1200 is closed from communication with the bore 1178. An annular groove 1206 is formed in the piston 1202, and a passageway 1208 is shown in FIGURE 83 as extending from the bore 1176 in the bushing 1166, on the opposite side thereof from the inlet 1174, through the stop member 1184 for the flow of air under pressure into the bore 1178, on the left side of the piston 1202, when the "0" sizing valve is opened, as will be apparent. This air will flow through the opening 1210 in the stop member 1184 and force the piston 1202 to the right against the spring 1204 until the groove 1206 therein is in alignment with the passageway 1200 and also with a passageway 1212 leading to an outlet port 1214 communicating through line L78 with the piston 834 for the S9 stop bar 824 in the stop bar housing 826. This air pressure from the passageway 1208 acting on the piston 1202, as described, will also act on the piston 1182 to prevent the latter from being moved to the right even if pressurized air is in passageway 1180 from the "9" sizing valve.

A vent 1216 is provided at the right hand end of the bore 1172 and a passageway 1218 extends from the outlet port 1214 to the bore 1172 to vent the air pressure in line L78 when the piston 1202 is in the position thereof shown in FIGURE 82.

Thus, it will be seen that the valve 1118 in the timing valve 968 will be opened through the selector valve 970 when either the "0" or "9" sizing valve or both are opened.

If the "9" sizing valve is opened and not the "0" sizing valve, the piston 1182 will be moved to the right, as viewed in FIGURE 82, and air will flow through the outlet port 1194 to actuate the number 9 sizing punch in the perforator punch assembly, while the piston 1202 will be in the position thereof shown in FIGURE 82 so that no air will flow from passageway 1200 to the outlet 1214 for the line L78 to the S9 or 4-unit stop bar. The piston 1158 will be moved to the right to permit air to flow to the piston 1126 in the timing valve 968 to open the valve 1118 therein.

If the "0" sizing valve is opened and the "9" sizing valve is closed, air will flow through inlet 1174 into the passageway 1176 to open the piston valve 1160 for flow of air to the piston 1126 in the timing valve 968, to open valve 1118 therein, and air under pressure will also flow through passageway 1208 through the stop member 1184 and into the bore 1178 to move the piston 1202 to the right until the groove 1206 is in alignment with the passageways 1200 and 1212. Since the "9" sizing valve is not opened, there will be no flow of air through these passageways 1200, 1212 to the piston 834 for the S9 stop bar 824.

However, if both the "0" and "9" sizing valves are opened, both of the piston valves 1158, 1160 will be opened for the flow of air through the outlets 1152, 1154, and to the pistons 1182, 1202. The piston 1182 will remain in the position thereof shown in FIGURE 82, while the piston 1202 will be moved to the right so that the air in passageway 1200 can flow therearound to the passageway 1214 and then through line L78 to actuate the piston 834 for the S9 stop bar. In this connection, it will be noted that when the "0" sizing valve is opened, air under pressure will also flow from the bore 1050 for this valve and through a fluid line to the piston 842 for the shift bar 838 in the stop bar housing 826, whereby the stop bar S9 will be moved to its outermost position. This combination of the "0" and "9" sizing signals will indicate 4 units of width in the casting machine which will be represented by a fixed pin therein, and therefore, no sizing punch hole in the control tape will be necessary for this width.

After the "0" and "9" sizing valves are closed to vent the air pressure in the selector valve, the springs 1162, 1188, 1204 will return the piston valves 1158, 1160, 1182, 1202 to the positions thereof shown in FIGURE 82, and the pressure in outlets 1194, 1214 will be vented through the vent openings 1192, 1216.

Thus, it will be seen that the selector valve will operate to open the valve 1118 in the timing valve 968 when either the "0" or the "9" sizing valves, or both, are opened.

As indicated above, in the exemplary embodiment under consideration, provision is made for registering seventeen different units of widths, from four units to twenty units inclusive, and the following table indicates the sizing valves that will be opened for each of these units of widths.

TABLE

| Sizing valves: | Units of width |
|---|---|
| 0, 9 | 4 |
| 0, 1 | 5 |
| 0, 2 | 6 |
| 0, 3 | 7 |
| 0, 4 | 8 |
| 0, 5 | 9 |
| 0, 6 | 10 |
| 0, 7 | 11 |
| 0, 8 | 12 |
| 9, 1 | 13 |
| 9, 2 | 14 |
| 9, 3 | 15 |
| 9, 4 | 16 |
| 9, 5 | 17 |
| 9, 6 | 18 |
| 9, 7 | 19 |
| 9, 8 | 20 |

Thus, there will be two sizing valves opened for each of the units of widths to be registered, as will be evident.

Power Shift Valve

The power shift valve 976, as best seen in FIGURES 65b, 84, 85, 86, is provided with two concentrically arranged bores 1220, 1222 therein, with a piston 1224 being arranged in the larger bore 1220 and in engagement with spaced pistons 1226, 1228 slidably arranged in the smaller bore 1222 and suitably connected together, as indicated. A vent opening 1230 is formed at the inner end of the smaller bore 1222, and a compression spring 1232 is provided in this bore for urging the pistons to the positions thereof shown in FIGURE 85.

The line L10 from the constant air manifold 954 opens into an inlet port 1234 which normally communicates through the bore 1222 with a passageway 1236 leading to an outlet port 1238. This outlet port 1238 is connected through line L80 with the right hand reset valve 982 whereby, during normal operations, air under pressure will normally be delivered to this reset valve, as will be apparent.

An inlet port 1240 is provided in the power shift valve opening into the larger bore 1220, as shown, and this inlet port is in communication with a line L82 leading from the restoring valve 974 for the delivery of air under pressure against the piston 1224 during restoring, as will be apparent. Thus, during restoring, the piston 1224 and pistons 1226, 1228 will be moved in their bores against the action of spring 1232, for example, until the piston 1224 strikes the shoulder 1242 between these bores. At that time, the passageway 1236 will be in communication through port 1244 with the upper or left hand end of bore 1222, as viewed in FIGURE 85, and the piston 1226 will be disposed so as to seal or close the passageway 1236 whereby the air pressure in line L80 will be vented through passageway 1236, port 1244 and bore 1222 through the vent opening 1230. Also, the constant air inlet port 1234 will now be in communication through the space between the pistons 1226, 1228 with a port 1246 leading to a passageway 1248. The piston 1228 will be in a position to seal or close off a port 1250 leading from the passageway 1248 to the bore 1222 whereby air under pressure will flow through the port 1246 and passageway 1248 to outlet ports 1252, 1254. Outlet port 1252 is connected through line L84 with the letter spacing valve 972, and outlet port 1254 is connected through line L86 with the inlet at the right hand end of the main driving cylinder 588 to effect restoring.

Figure 85:
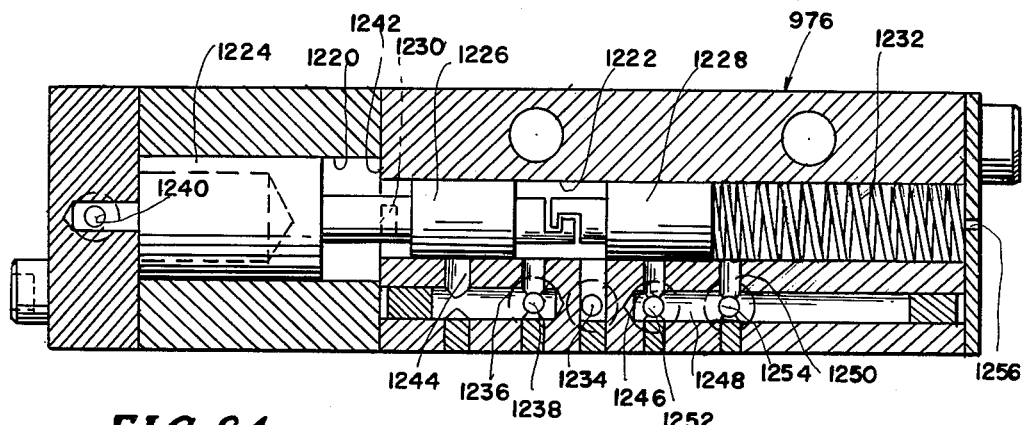
FIGURE 85 is a sectional view taken generally along line 85—85 of FIGURE 84.
Figure 84:
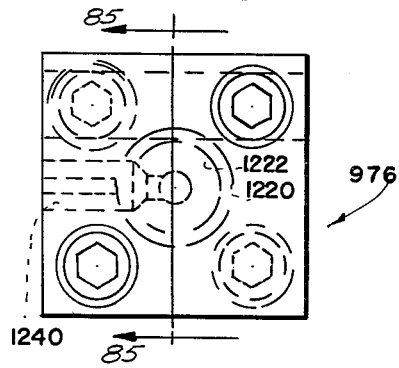
FIGURE 84 is an end elevational view of the power shift valve.
Figure 86:
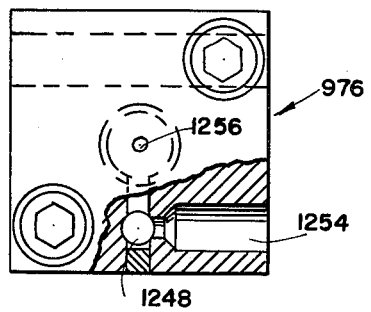
FIGURE 86 is an elevational view of the opposite end of the power shift valve.

After the restoring operation is completed, the pistons 1224, 1226, 1228 will be returned to the positions thereof shown in FIGURE 85 at which time the air pressure in lines L84, L86 will be vented through passageway 1248, port 1250, bore 1222 and vent opening 1256, and the constant air inlet port 1234 will again be in communication with the right hand reset valve 982 through the port 1236, outlet 1238 and line L80.

Restoring Valve

The restoring valve 974, as best seen in FIGURES 65b and 87, includes two main bores 1258 and 1260. A piston construction 1262 having an annular groove 1264 arranged therein is slidably arranged in the bore 1258 and a compression spring 1266 operates thereon to dispose it normally in the position thereof shown in FIGURE 87. A stationary stop pin 1268 is provided in this bore to limit the movement to the right of piston 1262 so that the groove 1264 therein will be in alignment with a passageway 1270 when air pressure acts to the right on the left hand end of piston 1262. Passageway 1270 leads to an outlet port 1272 which communicates through line L88 with the inlet of the cylinder for the actuating piston of the line counter 904. A passageway 1274 opens into the left hand side of the bore 1258 and communicates through an inlet port 1276 with the line L38 leading to the bore 1020 for the "j" valve in the positioning valve block 68. Thus, when air flows through this line L38 and passageway 1274, the piston 1262 will be moved to the right until the stop 1268 is contacted, and in this position, the passageway 1274 will be in communication with a port 1278 leading to a passageway 1280.

A passageway 1282 extends between the bores 1258, 1260 in alignment with the passageway 1270, and a passageway 1284 extends from the other side of the bore 1260 to an inlet port 1286 connected through line L40 to the bore 1020 for the "J" valve in the positioning valve block 68. Thus, when the "j" and "J" valves in the positioning valve block are opened, the groove 1264 on piston 1262 will be in position to establish communication between the passageways 1270, 1282, 1284 and air under pressure will flow through the inlet 1286, the bore 1260, and passageways 1282, 1270 to the line counter actuating cylinder through line L88, as will be evident.

A stop member 1288 is arranged within the bore 1260 in stationary position, as by the screw 1290, and a piston rod 1292 is slidable therein. Pistons 1294, 1296 are engaged to either end of this rod 1292 and are slidable in the bore 1260. A port 1298 extends from passageway 1280 into the bore 1260, and a compression spring 1300 is arranged in engagement with the piston 1296 to normally hold these pistons 1294, 1296 in the position shown. When air from the "j" line L38 enters the restoring valve, it will flow through passageway 1274, bore 1258, passageway 1280 and port 1298 to move the pistons 1294, 1296 to the right, exposing a port 1302 and closing a port 1304, both of which communicate with a passageway 1306. Outlet ports 1307, 1310 open into this passageway 1306, the port 1310 being in communication through line L82 with the power shift valve 976 to deliver air under pressure thereto when the "j" valve in the positioning valve block is opened, and the outlet port 1307 being connected through line L90 to the inlet for the cylinder in the piston block for the restoring lever 892. Vent holes 1308 may be provided opening into the bores 1258, 1260, as indicated in FIGURE 87.

An inlet 1312 is provided at the right hand end of bore 1260, communicating therewith through port 1314 and also connected by line L24 to the bore 1020 for the "X" valve in the positioning valve block. Thus, if both the "j" and "X" valves in the positioning valve block are opened, the compression spring 1300 and air from "X" valve flowing through line L24 and port 1314 will act to the left on piston 1296, and air from the "j" valve will act to the right on piston 1294, but the spring 1300 and "X" air in line 1314 will keep these pistons from moving to right under action of "j" air. However, if the "J" valve in the positioning valve block is also opened, then there is additional air pressure acting to right on piston 1296, and this will overcome the action of spring 1300 and "X" air, whereby the pistons 1294, 1296 will be moved to the right, to open the ports for flow of air through lines L82, L90 to the power shift valve 976 and the restoring lever 892.

If just the "j" valve is opened, the pistons 1294, 1296 will be moved to the right against spring 1300 to kill the line, and restore, as will be apparent.

If just the "J" valve is opened, no action will take place, as will be apparent.

Letter Spacing Valve

The letter spacing valve 972, as best seen in FIGURES 65b, 88, 89, and 90, comprises an upper section 1316 and a lower section 1318. A three-way valve is provided in the upper section 1316 including a rotatable valve member 1320 shown as being connected through pulleys 1322, 1324 and a belt 1326 to a knob 1328 accessible externally of the composing machine, as indicated in FIGURES 1 and 88, for manipulation of the valve member 1320, as will be apparent. The pulley 1324 and the knob 1328 are fixedly attached to a shaft 1330 journalled in the upper housing 36 and the pulley 1322 is fixedly connected to the valve member 1320.

The upper section 1316 includes three passageways 1332, 1334, 1336 extending from the valve member 1320 and shown as being spaced 90° apart, as best seen in FIGURE 89. The three-way valve member 1320 includes a conventional T-shaped passageway 1338 therein adapted to be moved by the valve member 1320 so as to establish communication either between the passageways 1334 and 1336, as indicated in FIGURE 89, or between the passageway 1332 and the passageway 1334, as will be apparent.

The passageway 1332 opens into a bore 1340 communicating through line L92 with the "S" valve in the right hand end of the positioning valve block 68. The passageway 1334 communicates with a line L94 leading to a branch fitting 1342 from which a first line L96 extends to the "S" punch piston in the perforator punch block, and from which fitting another line L98 extends to the inlet for the actuating cylinder for pawl 796.

The passageway 1336, as best seen in FIGURES 89, 90, opens into a bore 1344 provided in the lower section 1318 in the letter spacing valve. A bushing 1346 is arranged in this bore and slidably receives an upper piston 1348 and a lower piston 1350. Compression spring 1351 continuously urges these pistons downwardly, as indicated, and a sealing ring 1353 is arranged at the top of bore 1344, as shown.

A piston 1352 is slidably mounted in the bore 1344 below the bushing 1346, and an annular seal 1354 is carried by and around this piston. It is contemplated that suitable means be provided for continuously urging seal 1354 radially outwardly into firm frictional contact with the walls of the bore 1344 to retain the pistons 1348, 1350, 1352 in the positions shown in FIGURE 90 and against the action of spring 1351, after a restoring function. For example, the ring 1354 may be constructed so as to provide the necessary frictional force against the walls of bore 1344, as referred to, or spring means in the form of a circular ring 1356 may be provided for continuously urging sealing ring 1354 radially outwardly.

A pin 1358 spaces the pistons 1348, 1350, but will permit movement of the piston 1350 relative to or away from the piston 1348.

Line L72 from the timing valve 968 communicates with the bore 1344 through holes 1360, 1362 in the lower section 1318 and bushing 1350, as shown.

Thus, when the knob 1328 is turned so that passageway 1332 is in communication with the passageway 1334, as by turning the valve member 1320 90° in a counterclockwise direction from the position thereof shown in FIGURE 89, air may flow from the "S" valve in the positioning valve block, through the passageway 1332, the passageway 1338 in valve member 1320, and the passageway 1334 to line L94 and the branch fitting 1342 from whence it will flow to the "S" punch and the actuating cylinder for pawl 796. As previously stated, the "S" valve will be operated by the spacer bar 940 when the latter is in position to provide 4 unit justified spacing, whereby when the spacer bar is depressed, and "S" punch hole will be produced in the paper, and the pawl 796 will be actuated to move the justification scale pointer shaft 786 one space.

The valve member 1320 will be in the position thereof shown in FIGURE 89 when letter spacing operations are desired. In this position, the top of piston 1348 will be down below hole 1362 in bushing 1346, as indicated in FIGURE 65b, and air from the timing valve 968 may flow through line L72, holes 1360, 1362, bore 1344, passageway 1336, valve member 1320, and passageway 1334, from whence it will be delivered to actuate the "S" punch and pawl actuator, as will be apparent. In this position, the valve 1320 will shut off the flow of air from the "S" valve in the positioning valve block and line L92, as will be evident.

During normal letter spacing operation, the pistons 1348, 1350, 1352 will be in their lowermost positions in the bore 1344 and bushing 1346 whereby the top of piston 1348 will be down below the hole 1362 of the bushing so that the passageway 1336 will be in communication with the line L72 through hole 1360. Thus, as each key is struck, after the first key struck for the line, the timing valve 968 will open and air will flow through line L72 and the letter spacing valve 972 to be delivered to the "S" punch and the actuating cylinder for pawl 796. The same action will also take place when the spacer bar 940 is actuated. It might be noted that the "S" punch and "S" valve in the positioning valve block are not connected to the regular key 52 for the letter "S."

A passageway 1360 leads into the bottom of the bore 1344 of the letter spacing valve and receives air from the power shift valve 976 through the line L84 during restoring operations. Thus, during restoring, air from the line L84 will enter the bottom of bore 1344 to lift the pistons 1348, 1350, 1352 therein to the positions thereof shown in FIGURE 90. When the air pressure in line L84 is vented, the resiliently urged seal 1354 will hold the pistons in this position, as stated. Thus, if the valve 1320 is in the position thereof shown in FIGURE 89 for letter spacing, there will be no air delivered to the "S" punch and the actuating cylinder for pawl 796 when the first key is struck for the new line. When the first key is struck, air from the timing valve will flow through line L72 to the bore 1344 and act upwardly on piston 1348 and downwardly on the piston 1350 to move piston 1350 and piston 1352 downwardly against the holding force of the seal 1354, and when the pressure in line L72 is relieved, the spring 1351 will then move the piston 1348 down to a position where its top is below the opening 1362 providing for communication between the line L72 and the passageway 1336 for the flow of air therethrough when the next or second key is struck in the new line, and all subsequent keys. The reason for this is that the added spacing in the casting machine for each letter or character, during letter spacing, will be on the left of the letter or character. Therefore, it is essential that there be no "S" punch hole for the first character in the line, during letter spacing, otherwise the left margin for the printed matter would not be straight.

Thus, it will be seen that during letter spacing operations when the valve 1320 is in the position thereof shown in FIGURE 89, there will be no "S" punch hole in the paper for the first character in the line. However, for all subsequent characters or spaces the "S" punch and the pawl 796 will be actuated and after the line is completed, and justified, the justifying perforations at the end of the line will fit the justifying wedges in the casting machine so that when the "S" punch holes are encountered, the justifying wedges will operate to add the predetermined justification to each letter and each space between words.

During other operations, when valve member 1320 is in a position 90° counterclockwise from the position thereof shown in FIGURE 89, the passageway 1336 from the bore 1344 will be closed by the valve 1320, and no air will flow from L72 through the valve 1320. This will be the position of the letter spacing valve for normal composing operations, when letter spacing is not desired.

*Reset Valve 978*

Figure 65D:
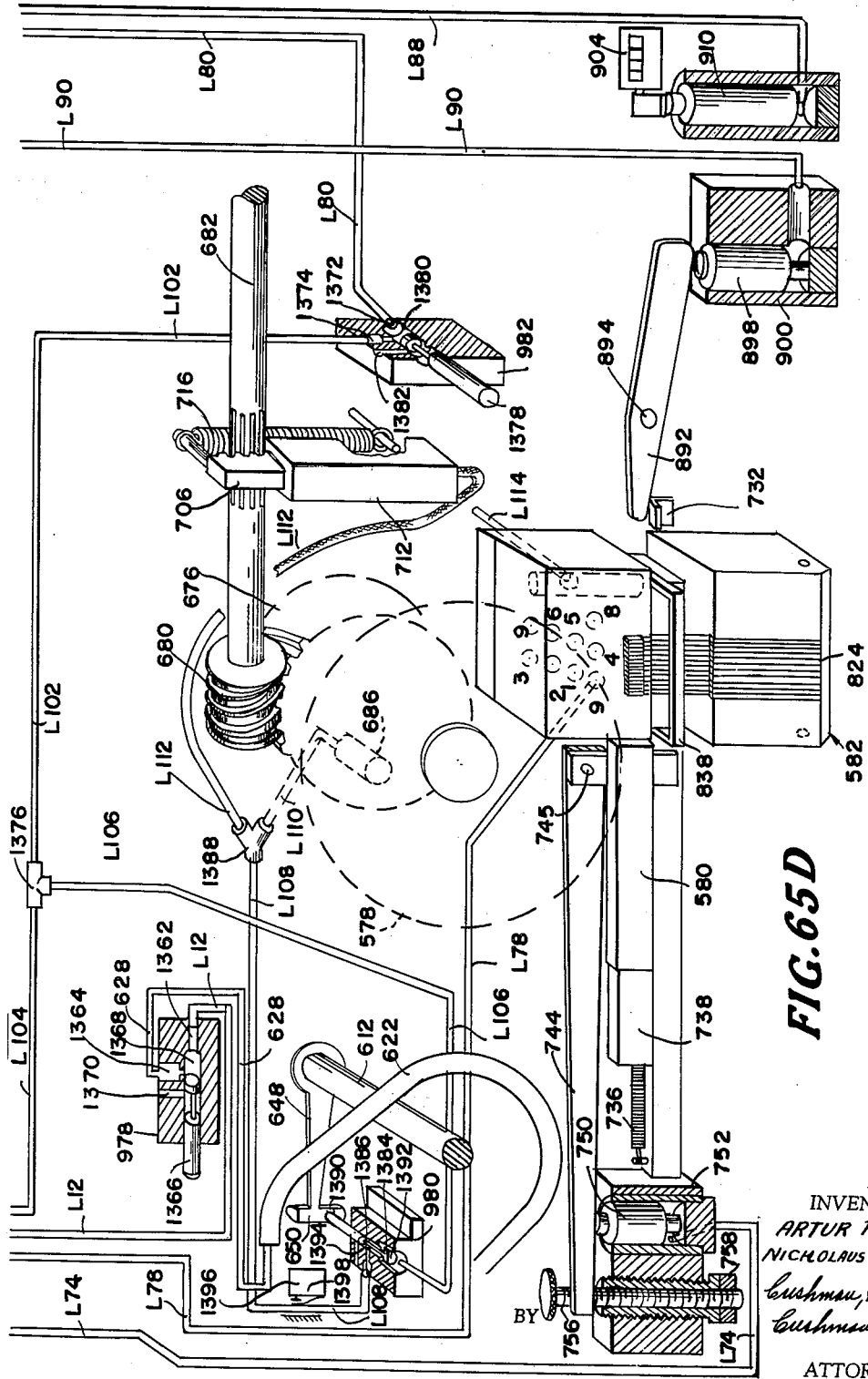

Reset valve 978, as best seen in FIGURE 65d, is provided with a port 1362 therein in communication with line L12 to receive air under pressure from the manifold 954. Port 1364 communicates with port 1362 and is also in communication with a line 628 leading to the flexible tubing 622 between the clutch disc 616 and the Em scale 576 to deliver air thereto. An actuating plunger 1366 is slidably arranged in a bore 1368 in the valve 978, and will normally be suitably held in the position thereof shown in FIGURE 65d by the pressure of the air in line L12 so that the ports 1362, 1364 are normally in fluid communication. This plunger 1366 may be moved inwardly in the bore 1368 against the inner end thereof to close off communication between the ports 1362, 1364, as during an Em scale setting operation. When the plunger is in that position, the port 1364 will be vented through the vent hole 1370, as will be evident.

*Reset Valve 982*

Reset valve 982 is shown as being similar in construction to reset valve 978. As best seen in FIGURE 65d, valve 982 includes an inlet port 1372 and an outlet port 1374, the former communicating with line L80 to receive air from the power shift valve 976, and the latter communicating through line L102 with a branch fitting 1376 from which one line L104 leads to the inlet port at the left end of the driving cylinder 588, and from which another line L106 leads to the 4 Em valve 980. A valve actuating plunger 1378 is slidably arranged in a bore 1380 in the valve 982, and will normally be held in the position thereof shown in FIGURE 65d, by the air pressure in line L80 and inlet port 1372 to establish communication between ports 1372, 1374 during normal operations.

The actuating plunger 1378 is adapted to be moved inwardly in bore 1380 against the inner end thereof to close communication between ports 1372, 1374 and in this position of plunger 1378, the line L102 will be vented through the port 1374 and vent hole 1382 as indicated.

Both the actuating plunger 1378 for this reset valve, and the actuating plunger 1366 for the reset valve 978 may be suitably arranged externally of the machine, for the convenience of the operator.

*4 Em Valve*

This valve 980, as best seen in FIGURE 65d, includes an inlet port 1384 in communication with the line L106 to receive air under pressure from the reset valve 982. An outlet port 1386 is formed in this valve 980 and communicates through line L108 with a branch fitting 1388, from which one line L110 leads to inlet 702 for the follower pin 686, and from which another line L112 leads to the inlet 714 for the actuating cylinder 710 for the rack 706 connected to the justification scale shaft 682.

An actuating plunger 1390 is slidably arranged in a bore in the 4 Em valve, and includes a head 1392 adapted to be normally urged by the pressure of the air in the line L106 and port 1384 to a position blocking or closing communication between the ports 1384, 1386. In this position, the line L108 and port 1386 will be vented through the vent hole 1394, as indicated.

The valve actuating plunger 1390 in the normal or closed position thereof extends outwardly of the valve 980 to a position wherein it is adapted to be actuated by the cam 650 on arm 648 at the rear end of the Em scale shaft 612, as shown. Thus, at approximately 4 Ems from the end of the line, the cam 650 on arm 648 will actuate the plunger 1390 to move the head 1392 thereof away from its seat and permit air to flow from the port 1384 around the head 1392 and adjacent stem of plunger 1390 to the port 1386 and line L108 to actuate the follower pin piston 686 and the justification scale shaft actuating rack 706.

A microswitch 1396 is shown as including an actuating element 1398 in engagement with line L108, and this line is preferably made of a flexible tubing so that when air under pressure is flowing therethrough, the tubing will be expanded to move the actuator 1398 and close the microswitch 1396. This switch is in circuit with a signal lamp (not shown) in the justification scale housing, so that when the switch is actuated by the expansion of the tubing L108 at about 4 Ems from the end of the line, the signal lamp will go on to indicate to the operator that about 4 Ems are left in the line.

*Operation*

Although the operation of the composing machine 20 has been referred to in the foregoing description, a more thorough explanation of exemplary operations will now be given to facilitate an understanding thereof.

The operator will first set the Em scale 576 to the proper position for the desired number of units in the lines to be composed. In setting the Em scale, the actuating plunger 1378 for the reset valve 982 will be depressed to close this valve and vent the left hand end of the driving cylinder 588 through the lines L104, L102 and the vent hole 1382. There will be no air pressure in the right hand side of the driving cylinder 588 at this time. Thus, the clutch disc 616 may be rotated by the operator, to rotate the Em scale 576 until the proper length of line is registered on the Em scale by the pointer 638. The small vernier scale 724 above the units wheel 578 will indicate the number of units, if not working with a whole Em or half Em.

After the Em scale is arranged in the proper position, the plunger 1378 for the reset valve 982 will be released whereby the air pressure in line L80 will open this valve to the position thereof shown, and the plunger 1366 for the reset valve 978 will then be depressed to close this valve whereby the air pressure in the flexible tubing 622 and line 628 will be vented through vent hole 1370 in valve 978. The clutch disc 616 will now be disengaged from the Em scale 576, and the operator will rotate the clutch disc 616 in a counterclockwise direction, as viewed in FIGURE 1, until the lug 620 thereon abuts against the spring-urged detent 640 at the bottom of the Em scale. The plunger 1366 will then be released, to be opened by air pressure in line L12 whereby the tubing 622 will be expanded to releasably lock the clutch disc 616 to the Em scale 576 in this relative position thereof.

The operator will then depress the keys and spacer bar in the composing machine in the usual manner to correspond to the material being composed. When a regular key 52 is depressed, the key bar 58 therefor will actuate the positioning rocker arms 60 and the sizing rockers 62 coupled to the lugs thereon, so that the proper positioning valve bars 64 and sizing valve bars 66 will be moved to the rear to actuate the respective valves therefor in the positioning valve block 68 and the sizing valve block 70.

As indicated above, the "0" or "9" sizing valves, or both, will be actuated when each regular key 52 is depressed. These valves are in constant communication with the source of fluid under pressure through the line L2 so that when either or both of these valves are open, air under pressure will immediately flow therethrough to the selector valve 970 through either line L44, or line L46, or both, to open the valve 1118 in the timing valve 968 as discussed above. When this valve 1118 is open, air under pressure will flow from the constant air manifold 954 through the line L8 and then through the seven lines L22, L42, L72, L48, L66, L64, L74, leading respectively to: the center section 996 of the positioning valve block 68; to the right hand end of the positioning valve block 68 in section 998; to the letter spacing valve 972; to the passageway 990a in the sizing valve block 70 for sizing valves "1" through "8"; to the paper feed valve 964; to the shift valve 960; and to the actuating piston 750 for the unit escapement lever 744.

Inasmuch as the valve 1006 in the center of the positioning valve block 68 will be normally open, air entering through line L22 will flow into the passageway 990 in section 996 for delivery through the open positioning valves therein to the respective positioning punch pistons in the perforating punch block 548 to actuate such pistons and to produce corresponding positioning perforations in the paper.

The air entering the passageway 990a in the sizing valve block 70 through the line L48 will flow through the open sizing valve from the "1" through "8" group of these valves, and then through the lines connected with the bores 1020a, 1050 for this particular valve, to be delivered respectively to the corresponding punch piston in the perforating punch block 548, and to the actuating piston 834 for the corresponding stop bar 824 in the S1 through S8 group of stop bars. In this connection, it will be noted that the stop bars 824 have been designated S1 through S8 and the pistons 834 therefor are respectively individually connected through fluid lines to the bores 1050 for the corresponding "1" to "8" sizing valves. The bore 1050 for the "0" sizing valve is connected through line L114 with the inlet 846 for the actuating piston 842 for the shift bar 838 in the stop bar housing 826, and the piston 834 for the S9 stop bar is actuated by fluid pressure coming from the "9" sizing valve through line L46, selector valve 970 and line L78, as previously described. It will also be noted that the bores 1020a for the "1" through "8" sizing valves are respectively individually connected through fluid lines directly to sizing punch pistons identified by numbers "1" through "8," as shown in FIGURE 65c. The "9" sizing punch piston is connected through line L76 to the selector valve 970 to receive air under pressure from the "9" sizing valve through line L46, provided that the "0" sizing valve is not open at the same time, as discussed above. No sizing punch hole will be necessary for indicating 4 units of width, when the "0" and "9" sizing valves are opened since this will be indicated by a fixed pin in the casting machine, as will be understood.

Accordingly, if the "0" sizing valve and one of the sizing valves from the "1" through "8" group are open, there will be a sizing punch hole in the paper or control tape corresponding to the open sizing valve from the "1" through "8" group, and the corresponding stop bar from the S1 through S8 group will be actuated or projected forwardly until the lower lug portion 886 thereof strikes the shift bar 838 which has been actuated and moved down by air pressure flowing from the bore 1050 of the "0" sizing valve through the line L114 to the piston 842.

If the "9" sizing valve is open along with the sizing valve from the "1" through "8" group, the "9" perforating punch will be actuated together with the punch from the "1" to "8" group corresponding to the other sizing valve that is open, to produce sizing perforations in the paper corresponding thereto, and the actuated stop bar in the S1 through S8 group will be projected forwardly until the portion 882 of the lug 880 thereon strikes the shift bar 838 which will be in the up position thereof (shown in FIGURE 52) due to the fact that there is no air pressure in the cylinder 844 above the actuating piston 842 for the shift bar. No air pressure will flow through line L78 to the piston 834 for the S9 stop bar due to the fact that the "0" sizing valve is not open and there is no air pressure in the line L44 to move the piston 1202 in the selector valve 970 to the right, as shown in FIGURE 82.

If the "0" and "9" sizing valves are open, the shift bar 838 will be actuated by pressure in the line L114 and cylinder 844 to be moved downwardly, and air pressure from the line L46 will flow through line L78 to actuate the piston 834 for the S9 stop bar, projecting this stop bar forwardly until the portion 886 of the lug 880 thereon strikes the shift bar 838, as indicated in FIGURE 44.

Assuming that the valve 1320 in the letter spacing valve 972 is in the position thereof shown in FIGURE 65b, air flowing in the line L72 from the timing valve 968 will not flow through valve member 1320, even though the piston 1348 is down below the hole 1362 in the bushing 1346. Thus, when the regular keys are depressed, no air will flow through the lines L94, L96 and L98 to the "S" punch and the actuating cylinder for the pawl 796.

The flow of air through the line L74 to the actuating piston 750 for the unit escapement lever 744, when the regular keys are depressed, will actuate the unit escapement lever causing the units rack 580 to be brought into engagement with the units wheel 578, and then to cause the locking pawl 760 to be released from the units wheel, but not moved away sufficiently to release the pawls 796, 798 from engagement with the ratchet 806 on the justification scale pointer shaft 786. This normal releasing of the locking pawl 760 will permit the air pressure in line L104 acting on the left hand side of the rack 594 in the driving cylinder 588 to move the rack to the right, causing clockwise rotation of the Em scale 576 and counterclockwise rotation of units wheel 578. This counterclockwise rotation of the units wheel will cause movement to the right of the units rack 580, engaged thereto, until the end 872 thereof strikes the actuated stop bar 824, as discussed hereinabove. Thus, the Em scale 576 will be rotated an amount corresponding to the number of units of width represented by the actuated stop bar 824, as will be evident.

When the regular keys are depressed, opening the timing valve 968, air under pressure will flow through the line L66 to the paper feed valve 964 as indicated, to actuate the large piston 1088 therein, which in turn will open the valve 1091 for the flow of air from line L4 through the paper feed valve and to the inlet 526 of the paper feed cylinder 524, as shown in FIGURES 36 and 65c, and also to the conduit 428 and outlet 430 of the paper chip ejector. As discussed above, there will be a predetermined delay in the return movement of the actuated piston 1088, after the operator removes his finger from the actuated key, whereby pawl 518 will not drive ratchet wheel 486 to feed the paper until after the actuated punches 546 have been retracted. In this connection, it will be noted that the springs 558 and the relative size of pistons 562 will facilitate rapid retraction of the actuated punches, and assure that they will be out of engagement with the paper by the time the pawl 518 drives the ratchet wheel 486.

As stated above, air will also flow from the timing valve 968 to the shift valve 960 through the line L64, when the regular keys are depressed, whereby if either the "i" or "I" shift valves therein, or both of them, are opened, air will flow through either line L50 or line L52, or both of them, to the "i" or "I" punch pistons in the perforating punch block 548.

It will be observed that there is no air pressure in the central section 996 of passageway 990 in the positioning valve block 68 until after the regular keys are depressed and the valve 1118 in the timing valve 968 has been opened. Likewise, there will be no air pressure in the passageway 990a for the "1" through "8" sizing valves in the sizing valve block 70 until after the regular keys have been depressed and the valve 1118 in the timing valve is opened. Accordingly, there will be minimum resistance to depression of the keys by the operator, since there will be no air pressure in these passageways at the time the keys are depressed, thereby providing a keyboard characterized by a highly desirable light, uniform touch for depression of the keys.

When the spacer bar 940 is depressed, and assuming that it is in position to give 4 unit justified spacing, and that the valve 1320 in the letter spacing valve 972 is in the position thereof shown in FIGURE 65b, the "S" and "L" valves in the positioning valve block 68 will be opened, and the "0" and "9" sizing valves in the sizing valve block 70 will also be opened, whereby the valve 1118 in the timing valve 968 will be opened. Thus, air will flow from the timing valve through line L42 to the "S" valve in the positioning valve block, through the line L92, valve 1320 in the letter spacing valve 972, and then to the "S" punch and to the actuating cylinder for the actuating pawl 796 through lines L94, L96, L98, as will be apparent. Actuation of the "S" punch will provide an "S" punch hole in the paper, indicating a justifying space, and actuation of the pawl 796 will move the justification scale pointer an amount corresponding to one space on the justification scale. Air will also flow from the "L" positioning valve to the "L" punch in the perforating punch block 548, and this will provide a punch hole in the paper for operating the mold blade, as in low quadding, as will be understood. Air will also flow from the selector valve 970 through line L78 to actuate the S9 stop bar, and the shift bar 838 will be in its down position as a result of the flow of air from the "0" sizing valve through the line L114 to the actuating cylinder 844 for the shift bar. The Em scale and units rack will thus register 4-units or width when the spacer bar is depressed, and the "S" punch hole will provide for justification, as will be understood.

If the spacer bar 940 is in position to give 6-units of fixed spacing, it will be coupled to the valve bars for the "L" positioning valve and the "0" and "2" sizing valves, as referred to above. Since there will be no justification when using fixed spacing, there will be no "S" signal and the "S" punch and the actuating pawl 796 will not be actuated.

It will be seen that by providing the arrangement of shift keys 54, it is possible to couple the regular keys 52 for indicating the same relative position in either of the four quadrants "O," "i," "I," and "iI" of the matrix case shown in FIGURE 62, as discussed hereinabove.

Thus, it will be seen that the keyboard will include a minimum number of keys capable of being operated to indicate a plurality of different characters or different character faces, simply by depressing the appropriate shift keys 54.

As discussed above, depression of the shift keys 54 will effect shifting movements of the sizing plate 72 and sizing plate frame 74 to vary the relationship between the regular keys 52 and the sizing valve bars 66 actuated thereby. As shown in FIGURE 63, certain of the regular keys 52 may be used to represent more than one character, depending on the quadrant determined by which shift key 54 has been actuated.

As previously stated, there will be no perforating punch corresponding to the "O" shift key since there will be fixed pins in the casting machine to represent this quadrant. However, if either of the "i," "I," or "iI" shift keys 54 has been actuated, the corresponding "i" or "I" shift valves, or both, will be opened for the delivery of air to the "i" and/or "I" positioning punches in the perforating punch block 548 to produce corresponding positioning holes in the control paper to effect movement of the matrix case to the proper quadrant, as will be understood.

When there are about four Ems remaining in the line being composed, the 4 Em valve 980 will be opened by the actuator 650 therefor, and air will then flow through lines L108, L110 and L112 causing: actuation of the microswitch 1398 to turn on the signal lamp in the justification scale housing; actuation of the piston 692 to move the follower pin 686 forwardly in the follower gear 676; and actuation of the rack 706 for rotating the justification scale shaft 682, as discussed hereinabove. Thus, the justification scale shaft will be rotated by rack 706 against the action of spring 716, and as permitted by the movement of the lead lug 672 in accordance with movement of the units wheel 578 to effect the necessary rotation of the justification scale 584 to indicate the proper numbered justification keys to be actuated for proper justification.

For justifying the line, the justification scale pointer normally will indicate two justification numbers, corresponding to two of the numbered justification keys in the right hand section of the keyboard for special keys 56, as discussed above. The operator will then strike the "j" key at the right hand end of the keyboard, together with the numbered justifying key corresponding to the first of the two numbers indicated by the justification scale pointer. Depression of the "j" key will open the "0" sizing valve in the sizing valve block 70 and the "j" valve in the right hand end of the positioning valve block 68 whereby air will flow through the line L26 to the shift control valve 962 and to the "j" punch. Flow of air through lines L26, L32 to the shift control valve 962 will prevent this valve from being opened in the event the "i" shift valve in the shift valve 960 is opened.

Depression of the numbered key corresponding to the first number indicated by the justification scale pointer will actuate the "X" valve in the positioning valve block, and it will also yield a positioning signal or signals, as by actuating one of the positioning valves "a" through "h," "A" through "H," and/or the "i" valve at the right hand section 998 of the positioning valve block. Actuation of the "X" valve will permit air to be delivered through the line L24 to the restoring valve 974, to prevent restoring when the first numbered justifying key is struck with the "j" key.

After the first numbered justifying key has been struck together with the "j" key at the right hand end of the keyboard, the "jJ" key at the right hand end of the keyboard will then be struck, together with the numbered justifying key corresponding to the second number indicated by the justification scale pointer. Striking the "jJ" key together with the second numbered justifying key will effect restoring and will count the line, as well as giving the second set of justifying signals for producing perforations in the paper in the following manner. Actuation of the "jJ" key will open the "j" and the "J" valves in the positioning valve block, as well as opening the "0" sizing valve in the sizing valve block. Thus, the timing valve 968 will be opened by air from the "0" sizing valve providing for a flow of air to the opened "j" and "J" valves in the positioning valve block from which air will flow through the lines L26, L28, L38 and L40, as will be apparent.

The flow of air through the lines L26 and L28 will flow through lines L30, L34 to the "j" and "J" punches, respectively, in the perforating punch block 548, and will also effect closing of the shift valve 962 to prevent any air from flowing through the "i" valve in the shift valve 960 to the "i" punch, in the event the "i" shift valve is opened. When justifying, if a punch hole were made in the paper by air flowing from the "i" shift valve in shift valve 960, this punch hole would be read in the casting machine as a positioning punch hole for the justifying wedges, which would be incorrect. The fact that the "I" shift valve in valve 960 may be opened is immaterial during justifying, since this punch hole would not interfere with the operation of the justifying wedges. In the exemplary 18 x 18 system of type composing and casting, the horizontal, or left-to-right, rows in the matrix case in FIGURE 62 will represent the justifying positions, and the vertical columns will have no effect on justifying.

The air flow through lines L38, L40 will enter the restoring valve 974 to actuate the piston valves therein so that air will flow from the "J" line L40 through the line L88 to actuate the piston for the line counter 904. Air will also flow from the restoring valve 974 through line L82 to the power shift valve 976 to move the piston valves therein so that air in line L10 from the manifold 954 will now flow to the right hand end of the driving cylinder 588 through line L86, and line L80 (which delivers air through reset valve 982, and lines L102, L104 to the left hand end of the driving cylinder 588) will be vented through the power shift valve 976. When the piston valves in the power shift valve 976 are so actuated, air will flow through the line L84 to the letter spacing valve 972 to elevate the pistons therein, sealing off communication between the line L72 from the timing valve 968, and the passageway 1336.

Actuation of the restoring valve by air flowing thereinto from lines L38, L40, as described, will also result in a delivery of air through line L90 to the actuating piston for the restoring lever 892 which will operate to hold the unit rack carrier 732 from being elevated by the actuated unit escapement lever 744. This lever 744 will be actuated when the timing valve is opened by the flow of air through line L74, and since lever 892 prevents any upward movement of the unit rack carrier 732, the locking pawl 760 will be pivoted away from the units wheel 578 a greater distance than during normal operations, whereby it will actuate the trip pin 820 to move the same against the left ends of the pawls 796, 798, thereby releasing them from engagement with the ratchet section 806 of the justification scale pointer shaft 786. Shaft 786 will thus be returned to the left to its normal position, under the action of its spring 794.

The air entering the right hand end of the driving cylinder 588 through line L86 from the power shift valve will move the rack 594 therein to the left to effect counterclockwise rotation of the Em scale 576 and clockwise rotation of the units wheel 578 until the lug 620 of the clutch disc 616 strikes the detent 640, at which time this detent will prevent further rotary movement of the Em scale and units wheel. Thus the Em scale will be accurately repositioned or restored to the same setting as for the previous line, as will be evident.

The air pressure in line L108 will be vented, after the "jJ" key is struck together with the second numbered justifying key whereby the follower pin 686 will be retracted, and the air pressure acting on the rack 706 for the justification scale shaft 682 will also be relieved, whereby the spring 716 will restore or return the justification scale shaft 682, until the pin 686 strikes the stop 704, at which time the justification scale shaft will have been reversely rotated back to its original starting or zero position. In this connection, it will be noted that the restoring rotation of the justification scale shaft 682 is not effected by air pressure but by the action of spring 716. Therefore, there will be no delay period in the pneumatic system, as would be required if air pressure were utilized to restore the justification scale, whereby the operator may proceed immediately with composing the next line, after the "jJ" key is struck together with the second numbered justifying key.

Actuation of the second numbered justifying key will open the "X" valve in the positioning valve block and will also give a positioning punch hole or punch holes in the paper corresponding to the other valve or valves actuated in the positioning valve block, as will be apparent. Air flowing from the "X" valve through the line L24 will enter the restoring valve 974, but the pressure of the air from the "j" and "J" valves entering the restoring valve through lines L38, L40 will be effective to overcome the pressure of "X" air coming from the line L24, as discussed above.

After justifying and restoring has been completed in the manner just described, the power shift valve 976 and restoring valve 974 will be returned to their normal positions, and the machine will be ready for composing the next line, as will be appreciated.

Depression of the "j" key, by itself, will effect a restoring function, and it will also kill the line to the next preceding justifying signals, as will be apparent.

When a high quad or high delete is required, the high delete key 912 will be depressed, together with a regular key 52 for the desired number of units of width. When the high delete key 912 is struck, the pusher 926 thereon will actuate the positioning valve bar for closing the valve 1006 in the center of the positioning valve block whereby no air will enter the middle section 996 of passageway 990 in the positioning valve, and no positioning signals will be given from this section of the positioning valve. The pusher 922 connected to the high delete key 912 will actuate positioning valve bars to open the "i" and "I" valves at the right hand section 998 of the positioning valve block whereby air will flow from these valves through the lines L58, L62, and lines L56, L60 to the "i" and to the "I" punches in the perforating punch block 548 to produce "i" and "I" positioning punch holes in the paper. The sizing valves connected to the regular key struck with the high delete key will be opened to open the timing valve 968 and provide the desired sizing signals.

When a low quad is required, the low quad key 930 is depressed, together with a regular key 52, for the desired width. Depression of the low delete key 930 will actuate the positioning valve bar for opening the "L" valve in section 996 of the positioning valve block for flow of air therethrough to the "L" punch in the perforating punch block 548 to provide an "L" perforation in the paper which will operate the low quad section of the mold blade in the casting machine, as will be understood. The positioning punch holes corresponding to the regular key struck with the low delete key will not have any effect in the casting machine during low quadding, and the sizing punch holes for the regular key will determine the width of the low quad, as will be understood.

As indicated above, when the member 1320 in the letter spacing valve 972 is in the position thereof shown in FIGURES 89 and 90, operation of the regular keys 52, after the first key has been struck for the line, will be effective to cause air to flow through the hole 1360, 1344 and passageway 1336 in the letter spacing valve to be delivered through the passageway 1338 in the valve member 1320 and the port 1334 for subsequent flow to the "S" punch and the actuating piston for the pawl 796. With the letter spacing valve in this position, the "S" punch and the pawl 796 will also be actuated when the spacer bar 940 is depressed. Due to the construction of the letter spacing valve, depression of the first key in the line will not result in actuation of the "S" punch or the pawl 796 inasmuch as the resiliently outwardly urged seal 1354 will operate to hold the piston 1348 in the position shown in FIGURE 90, after a restoring function, whereby the air delivered through line L72 from the timing valve when the first key is struck will operate to force the pistons 1350, 1352 downwardly against the action of the resiliently outwardly urged seal 1354 to free the piston 1348 for subsequent downward movement under the action of its spring 1351, after the pressure is relieved or vented from the bore 1344 and line L72.

Suitable means may pe provided for indicating when the valve member 1320 of the letter spacing valve is in the position thereof shown in FIGURE 89, or in a position disposed 90° therefrom in a counterclockwise direction. This means may be in the form of detents or stops or markings arranged at appropriate locations, as will be appreciated.

The various valves and other structures in the pneumatic system may be mounted at any convenient locations in the composing machine, as will be understood.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

What is claimed is:

1. In a composing machine of the character described: a series of fluid-pressure actuated positioning punches; a series of sizing or dimensioning fluid-pressure actuated punches; a group of keys mounted for depression; means connecting a source of fluid under pressure to each of said punches and including an individual fluid line for each of said punches and a normally closed valve for each of said lines; a plurality of positioning valve bars arranged to be actuated and moved when said keys are depressed, one of said bars being provided for each of said valves in each of the fluid lines extending to said positioning punches, each of said bars being operable, when actuated, to actuate its respective valve; and a plurality of sizing valve bars arranged to be actuated and moved when said keys are depressed, one of said latter bars being provided for each of said valves in each of the fluid lines extending to said sizing punches; a plurality of key bars disposed below said keys and arranged to be actuated and moved when said keys are depressed; means operatively connecting said key bars to said positioning valve bars in a predetermined order; and separate means operatively connecting said key bars to said sizing valve bars in predetermined relation, said separate means including means shiftable while in said machine to alter said predetermined relation.

2. The machine defined in claim 1 wherein said shiftable means is removably mounted in said machine, and shift keys being provided to control the movements of said shiftable means.

3. In a composing machine of the character described: a plurality of fluid-pressure actuated perforating punches; a group of keys arranged for depression; means connecting a source of fluid under pressure to each of said punches and including an individual fluid line for each of said punches; a normally closed main valve arranged for blocking communication between said source and said lines; a normally closed secondary valve in each of said lines and downstream from said main valve; and means operatively connecting said keys to said valves, said last-named means including structure operable upon actuation of any of said keys first to open a predetermined number of said secondary valves and then to open said main valve.

4. The machine defined in claim 3 wherein each of said secondary valves are one-way valves including: a movable valve element disposed in its respective fluid line, and biasing means continuously urging said elements to move in the direction of flow of pressurized fluid through said lines and to a closed position.

5. In a composing machine of the character described: a plurality of fluid pressure actuated positioning punches; a plurality of sizing or dimensioning fluid pressure actuated punches independent of said positioning punches; a group of keys arranged for depression; conduit means connecting a source of fluid under pressure to each of said punches and including an individual fluid line for each of said punches; a normally closed timing valve arranged in said conduit means for blocking communication between said source and all of said lines for said positioning punches; a normally closed secondary valve in each of said lines for said positioning punches and downstream from said timing valve; and means operable upon actuation of any of said keys first to open a predetermined number of said secondary valves for said positioning punches and then to open said timing valve.

6. In a composing machine of the character described, the combination of: a toothed units wheel; a unit rack movable into and out of engagement with said units wheel; means for rotating said wheel and moving said rack when the latter is in engagement therewith; a plurality of stop bars for arresting the movement of said rack, said stop bars normally being out of the path of movement of said rack; a multiplicity of finger-actuatable keys; means operable in response to the actuation of said keys for individually moving said stop bars from a rest position into the path of movement of said rack whereby each stop bar defines a different stop position for said rack and at least some of said stop bars into a second and different stop position for said rack.

7. The machine defined in claim 6 wherein nine stop bars are provided, eight of said stop bars defining two stop positions for said rack whereby seventeen rack stop positions will be provided by said nine stop bars.

8. In a measuring mechanism for composing machines, the combination of: a units wheel; a units rack and units rack carrier; means for moving said carrier to bring said rack into engagement with said wheel; means for rotating said wheel to move said rack; a plurality of stop bars normally out of the path of movement of said rack and arranged at progressively farther points from said rack; a multiplicity of finger-actuatable keys; means operable in response to the actuation of said keys for individually moving at least some said stop bars transversely a predetermined distance into the path of movement of said rack and at least some of said stop bars transversely a different predetermined distance into the path of movement of said rack.

9. In a machine of the character described, a plurality of keys arranged in said machine for depression, a units wheel, means continuously urging said wheel to move in a predetermined direction, releasable holding means normally engaged to said wheel and locking it against such movement, said holding means being constructed and arranged to release said wheel for movement upon depression of said keys, means including a plurality of stop bars arranged to be individually moved into positions limiting the movements of said wheel after said holding means is released, means operatively connecting said stop bars to said keys and effecting individual actuation of at least some of said stop bars when any of said keys is depressed, and means for varying the amount of movement of at least some of said stop bars when certain of said keys are depressed.

10. In a machine of the character described, a plurality of keys arranged in said machine for depression, a units wheel, means continuously urging said wheel to move in a predetermined direction, releasable holding means normally engaged to said wheel and locking it against such movement, said holding means being constructed and arranged to release said wheel for movement upon depression of any of said keys, means including a plurality of stop bars arranged to be individually moved into positions limiting the movements of said wheel after said holding means is released, means operatively connecting said stop bars to said keys and effecting individual actuation of said stop bars when said keys are depressed, and means utilizing at least some of said stop bars to optionally provide either of two limiting positions for the movements of said wheel after said holding means is released.

11. The machine defined in claim 10 and further including a plurality of punches, means coupling said punches to said keys for actuation thereof upon depression of said keys and said stop bars being movable independently of the actuation of said punches.

12. In a composing machine of the character described, the combination of: a scale mechanism advanceable for indicating the number of units left in the line being composed; a units wheel drivingly connected with said scale mechanism; a justification scale; means rotatably mounting said justification scale in said machine; means normally holding said justification scale against rotating; and mechanism for rotating said justification scale only when said scale mechanism reaches a predetermined point near the end of the line being composed; means for effecting an operative connection of said scale mechanism with said justification scale rotating mechanism to determine the extent of rotational movement imparted to said justification scale thereby in accordance with the advance of said scale mechanism.

13. The machine as defined in claim 12 wherein said mechanism operates to rotate said justification scale approximately when 4 Ems are left in the line being composed.

14. In a type composing machine of the character described, the combination of: a scale mechanism advanceable for indicating the number of units left in the line being composed; a justification scale; means operatively connected to said justification scale and continuously urging it to its zero position; an actuating mechanism for rotating said justification scale away from its zero position and against the action of said urging means, means for effecting an operative connection of said scale mechanism with said actuating mechanism to determine the extent of rotational movement imparted to said justification scale thereby in accordance with the advance of said scale mechanism.

15. The machine as defined in claim 14 wherein said actuating mechanism operates to rotate said justification scale only when said scale mechanism reaches a predetermined point near the end of the line being composed.

16. In a composing machine of the character described, the combination of: a scale mechanism for indicating the number of units left in the line being composed; a units wheel drivingly connected with said scale mechanism and movable therewith; a justification scale; means continuously urging said justification scale to its zero position; actuating mechanism for rotating said justification scale away from its zero position; and means providing for operation of said actuating mechanism only when said scale mechanism reaches a predetermined point near the end of the line being composed, and only in accordance with movements of said units wheel.

17. In a composing machine of the character described, the combination of: a scale mechanism for indicating the number of units left in the line being composed; a rotatable units wheel drivingly connected with said scale mechanism and movable therewith; a justification scale; a shaft drivingly connected to said justification scale; spring means continuously urging said shaft to rotate in one direction; a rack for rotating said shaft in the opposite direction; means for actuating said rack only when said scale mechanism reaches a predetermined point near the end of the line being composed; and means engaged to said units wheel for rotation therewith and operatively connected to said shaft only when said scale mechanism reaches said predetermined point to prevent rotation thereof in said opposite direction except in accordance with rotary movements of said units wheel.

18. In a measuring mechanism for composing machines of the character described, the combination of: a housing having a circular opening therein; a circular Em scale rotatably mounted in said housing and exposed through said opening; a disc-like member arranged concentrically with said scale, said scale and said disc-like member being formed with complementary and opposed cup-shaped portions; and fluid pressure actuated clutch means arranged for releasably drivingly connecting said disc-like member with said Em scale, said clutch means including a flexible tubing arranged between and in engagement with said cup-shaped portions and means for introducing fluid under pressure into said tubing to drivingly connect said scale to said disc-like member.

19. The structure defined in claim 18 wherein said disc-like member is arranged in said opening and includes a lug extending radially outwardly therefrom, and a detent mounted on said housing and disposed in the path of movement of said lug.

20. The structure defined in claim 19 wherein a pointer is arranged on said housing and projects into said opening, said pointer being angularly spaced from said detent.

21. In a composing machine of the character described, the combination of: perforating punch means for indicating justifying; perforating punch means for indicating sizing; a spacer bar; and means providing for adjustment of said spacer bar between a first position wherein said spacer bar is coupled to said justifying perforating punch means and to said sizing perforating punch means, and a second position wherein said spacer bar is coupled to said sizing perforating punch means and not to said justifying perforating punch means.

22. The structure defined in claim 21 and further including a justification scale and a justification scale pointer, actuating means for moving said pointer across said scale, and means for coupling said spacer bar to said actuating means only when said spacer bar is in said first position.

23. The structure defined in claim 22 and further including an Em scale, and means coupling said spacer bar to said Em scale and providing for movements of said Em scale of different amounts upon actuation of said spacer bar when the latter is in said two positions.

24. In a composing machine of the character described, the combination of: a bank of regular keys; a spacer bar; perforating punch means for justifying; a justification scale; a justification scale pointer; actuating means for moving said pointer across said scale; a letter spacing mechanism coupled to said justifying punch means and to said actuating means and including a movable member therein, said member when in a first position operatively connecting only said spacer bar with said justifying punch means and said actuating means, and said member when in a second position operatively connecting said regular keys and said spacer bar to said justifying punch means and said actuating means.

25. The structure defined in claim 24 and further including: means for restoring said justification scale pointer to its original or zero position; and means in said letter spacing mechanism operable, after a restoring operation and when said member is in said second position, to prevent said keys and said spacer bar from being operatively connected to said justifying punch means and said actuating means until after the first key is struck for the new line.

26. In a machine of the type described, the combination comprising a multiplicity of actuatable members of a number at most slightly greater than the number of matrices in a font, means operable in response to the actuation of said members for producing a distinct code signal designating each matrix in a plurality of fonts of the kind in which the width size of at least some of the matrices in one font varies from the width size of corresponding matrices in another font, and means operable in response to the actuation of said members for producing a code signal separate from but associated with each matrix signal designating the specific width size of the matrix designated by the associated matrix signal produced by such actuation.

27. The combination as defined in claim 26 wherein certain of said members are connected for actuation by a plurality of matrices keys of a number generally equal to the number of matrices in a font.

28. The combination as defined in claim 27 wherein other of said members are connected for actuation by a plurality of font shift keys.

29. The combination as defined in claim 28 wherein said matrix signal producing means comprises means operable in response to the actuation of said matrices keys for producing a font signal designating a specific one of said plurality of fonts, means operable in response to the actuation of said matrices keys for producing a matrix position signal designating a specific matrix within the font designated by the font signal produced by such actuation, and means operable in response to the actuation of said font shift keys for determining the specific font signal produced by said font signal producing means in response to the actuation of any of said matrices keys.

30. The combination as defined in claim 26 wherein said matrix signal producing means includes font punch means for producing a font signal in a tape designating a specific one of the plurality of fonts and matrix position punch means for producing a matrix position signal in a tape designating the particular matrix within the designated font.

31. The combination as defined in claim 30 wherein said matrix position punch means comprises first and second coordinate punch means for simultaneously producing two coordinate matrix position signals.

32. The combination as defined in claim 26 wherein said width size signal producing means comprises a series of movable actuating members operatively associated with a certain series of said actuatable members, the number of said series of actuating members being less than the number of said series of actuatable members, a punch for each actuating member operable to produce a perforate signal in a tape, means operable in response to the movement of each actuating member for effecting operation of the associated punch, each member of one of said series having a plurality of spaced engaging portions thereon generally corresponding in number to the number of members in the other series, each member of the other series including a movable element associated with one of the engaging portions of each member of said one series, each of said movable elements being mounted on the associated member for movement into and out of an operative position of engagement by the associated engaging portion, means movable into a plurality of positions for maintaining different predetermined movable elements in their operative position so that each actuating member with an associated movable element in operative position will be moved to operate the associated signal punch in response to the actuation of an actuatable member of the series thereof, and means operable in response to the actuation of actuatable members other than the series thereof for moving said maintaining means into any one of said plurality of positions.

33. The combination as defined in claim 32 wherein said maintaining means is removable and includes means for adjuting the same in each of said plurality of positions to vary the predetermined movable elements which are maintained in their operative positions thereby in each operative position.

34. The combination as defined in claim 32 wherein said series of actuatable members includes a series of spaced parallel key bars mounted for longitudinal shifting movement and said series of actuating members includes a series of spaced parallel sizing signal bars mounted for pivotal movement about spaced parallel axes extending transversely with respect to said key bars.

35. The combination as defined in claim 34 wherein said movable elements comprise a series of pins mounted on each of said sizing signal bars for longitudinal reciprocation in a direction perpendicular to the axis of the associated sizing signal bar.

36. The combination as defined in claim 35 wherein said maintaining means includes a removable frame mounted for movement into said plurality of positions, said frame having pin engaging element receiving means formed therein at positions corresponding to each pin in each of said plurality of positions.

37. The combination as defined in claim 26 including means for recording the total number of units represented by the widths of the matrices in an unjustified composed line, and means operable in response to the actuation of said members for advancing said recording means a number of units equal to the unit width size of the matrix designated by the associated matrix signal produced by such actuation.

38. In a machine of the type described, the combination comprising a multiplicity of finger-actuatable members of a number at most slightly greater than the number of matrices in a font, means operable in response to the actuation of said members for producing a distinct code signal designating each matrix in a plurality of fonts of the kind in which the width size of at least some of the matrices in one font varies on a unit basis from the width size of corresponding matrices in another font, means for recording the total number of units represented by the widths of the matrices in an unjustified composed line, and means operable in response to the actuation of said members for advancing said recording means a number of units equal to the unit width size of the matrix designated by the associated matrix signal produced by such actuation.

39. In a machine of the type described, the combination comprising a series of movable actuatable members, a series of movable actuating members of a number less than the number of said actuatable members, each member of one of said series having a plurality of spaced engaging portions thereon generally corresponding in number to the number of members in the other series, each member of the other series including a movable element associated with one of the engaging portions of each member of said one series, each of said movable elements being mounted on the associated member for movement into and out of an operative position of engagement by the associated engaging portion, and means for maintaining predetermined movable elements in their operative position so that each actuating member will be moved in response to the movement of any one of said actuatable members when the associated movable elements is in operative position.

40. The combination as defined in claim 39 wherein said maintaining means includes means for moving the same into a plurality of operative positions wherein different predetermined movable elements are maintained thereby in their operative positions.

41. The combination as defined in claim 40 wherein said maintaining means includes means for adjusting the same in each of said operative positions to vary the predetermined movable elements which are maintained in their operative positions thereby in each operative position.

42. The combination as defined in claim 39 wherein said maintaining means comprises a frame, means on said frame defining a plurality of projections for engaging a predetermined number of said movable elements and means mounting said frame for movement with respect to said movable elements so that the projections on said frame will effect movement of the associated movable elements into operative position.

43. The combination as defined in claim 42 wherein said projection defining means comprises a plurality of pins, and means on said frame for removably longitudinally fixedly receiving said pins in positions to move each of said movable elements.

44. The combination as defined in claim 43 wherein said means mounting said frame for movement with respect to said movable elements includes means for moving said frame into a plurality of different operative positions with respect to said movable elements.

45. The combination as defined in claim 44 wherein said frame includes means for removably longitudinally fixedly receiving said pins in positions to move each of said movable elements when said frame is in each of said plurality of operative positions.

46. The combination as defined in claim 44 wherein said frame mounting means includes means for removably receiving said frame.

47. The combination as defined in claim 46 wherein said pins include enlarged heads and said pin receiving means includes a first frame member having a multiplicity of openings therein of a size sufficient to receive said pins but to prevent passage of their heads therethrough and a second frame member operatively associated with said first frame member for movement into and out of an operative position of engagement with the heads of said pins to thereby retain any pins received in the openings of said first frame member against longitudinal movement with respect thereto.

48. The combination as defined in claim 47 wherein one of said frame members includes a pair of parallel rails, the other of said frame members being slidably mounted on said rails to effect movement of said second frame member into and out of said operative position, said rails extending in a direction perpendicular to the pins when said second frame member is in said operative position.

49. The combination as defined in claim 39 wherein said series of actuatable members includes a series of spaced parallel key bars mounted for longitudinal shifting movement and said series of actuating members includes a series of spaced parallel sizing signal bars mounted for pivotal movement about spaced parallel axes extending transversely with respect to said key bars.

50. The combination as defined in claim 49 wherein said movable elements comprise a series of pins mounted on each of said sizing signal bars for longitudinal reciprocation in a direction perpendicular to the axis of the associated sizing signal bar.

51. The combination comprising a multiplicity of finger-actuatable keys, a plurality of fluid pressure actuated members, means communicating said members in parallel with a source of fluid under pressure, a normally closed control valve for preventing communication of fluid under pressure to each member movable into an open position to permit communication of the fluid under pressure with the associated member to operate the same, and a normally closed main valve for preventing communication of fluid under pressure to each of said normally closed valves movable into an open position for permitting communication of fluid under pressure to said control valves, mechanical motion transmitting means between each of said keys and said control valves for moving a different combination of said control valves into their open position in response to actuation of any one of said keys, means operable in response to the actuation of any one of said keys for moving said main valve into its open position after the movement of the associated control valves into their open position as a result of such actuation, each of said control valves being operable when disposed in its open position to be urged into its closed position by the communication of fluid under pressure therewith whereby a greater force is applied through said motion transmitting means to return the associated key after actuation than is required to effect such actuation.

References Cited in the file of this patent
UNITED STATES PATENTS

| | | |
|---|---|---|
| Re. 22,377 | Potts | Sept. 14, 1943 |
| 654,115 | Lanston | July 17, 1900 |
| 944,405 | Bancroft et al. | Dec. 28, 1909 |
| 1,079,326 | Booth | Nov. 25, 1913 |
| 1,193,346 | Bancroft et al. | Aug. 1, 1916 |
| 1,197,032 | Kennedy | Sept. 5, 1916 |
| 1,635,748 | Groote | July 12, 1927 |
| 1,978,966 | Sprague | Oct. 30, 1934 |
| 2,159,473 | Dewhurst | May 23, 1939 |
| 2,285,206 | Indahl | June 2, 1942 |
| 2,716,452 | Schmitt | Aug. 30, 1955 |
| 2,816,609 | Rossetto et al. | Dec. 17, 1957 |
| 2,848,049 | Robbins et al. | Aug. 19, 1958 |